United States Patent
Shibata et al.

(10) Patent No.: US 8,206,798 B2
(45) Date of Patent: Jun. 26, 2012

(54) FORMED PRODUCT

(75) Inventors: Manabu Shibata, Kurashiki (JP);
Tatsuya Oshita, Kurashiki (JP); Wataru Hirose, Kurashiki (JP)

(73) Assignee: Kuraray Co., Ltd., Kurashiki-shi (JP)

( * ) Notice: Subject to any disclaimer, the term of this patent is extended or adjusted under 35 U.S.C. 154(b) by 0 days.

(21) Appl. No.: 13/127,556

(22) PCT Filed: Nov. 4, 2009

(86) PCT No.: PCT/JP2009/068838
§ 371 (c)(1),
(2), (4) Date: May 4, 2011

(87) PCT Pub. No.: WO2010/053097
PCT Pub. Date: May 14, 2010

(65) Prior Publication Data
US 2011/0210034 A1 Sep. 1, 2011

(30) Foreign Application Priority Data

Nov. 5, 2008 (JP) ................................. 2008-284452
Nov. 28, 2008 (JP) ................................. 2008-304246
Nov. 28, 2008 (JP) ................................. 2008-304247
Oct. 1, 2009 (JP) ................................. 2009-229254
Oct. 1, 2009 (JP) ................................. 2009-229255
Oct. 1, 2009 (JP) ................................. 2009-229256

(51) Int. Cl.
*B29D 22/00* (2006.01)
*B29D 23/00* (2006.01)
*B32B 1/08* (2006.01)
*B32B 27/08* (2006.01)

(52) U.S. Cl. .................... 428/35.4; 428/35.2; 206/524.6

(58) Field of Classification Search ................. 428/35.2, 428/35.4; 206/524.6
See application file for complete search history.

(56) References Cited

U.S. PATENT DOCUMENTS

| | | | |
|---|---|---|---|
| 5,804,300 A | 9/1998 | Maro et al. | |
| 7,524,900 B2 | 4/2009 | Nishiura et al. | |
| 7,763,335 B2 | 7/2010 | Oshita et al. | |
| 2009/0297741 A1 | 12/2009 | Oshita et al. | |
| 2011/0027580 A1 | 2/2011 | Hirose et al. | |

FOREIGN PATENT DOCUMENTS

| | | |
|---|---|---|
| JP | 57 30745 | 6/1982 |
| JP | 5 318550 | 12/1993 |
| JP | 09 239911 | 9/1997 |
| JP | 11 314675 | 11/1999 |
| JP | 2003 292713 | 10/2003 |
| JP | 2005 008160 | 1/2005 |
| JP | 2005 119063 | 5/2005 |
| JP | 2005 231701 | 9/2005 |
| JP | 2006 027695 | 2/2006 |
| JP | 2006 036272 | 2/2006 |
| JP | 2006 306083 | 11/2006 |
| JP | 2007 8148 | 1/2007 |
| JP | 2008 044617 | 2/2008 |
| WO | 2005 053954 | 6/2005 |
| WO | 2006 126511 | 11/2006 |
| WO | 2009 125800 | 10/2009 |

OTHER PUBLICATIONS

International Search Report issued Feb. 9, 2010 in PCT/JP09/68838 filed Nov. 4, 2009.

*Primary Examiner* — Michael C Miggins
(74) *Attorney, Agent, or Firm* — Oblon, Spivak, McClelland, Maier & Neustadt, L.L.P.

(57) ABSTRACT

The formed product of the present invention is a formed product selected from the group consisting of a vertical form fill seal pouch, a container cover and a vacuum packaging pouch. The formed product is formed using a gas barrier layered product. The gas barrier layered product includes a base, and at least one layer with gas barrier properties that is stacked on the base. The layer is formed of a composition that includes a hydrolyzed condensate of a compound (L) and a neutralized product of a polymer (X) containing a carboxyl group or a carboxylic acid anhydride group. The compound (L) includes a compound (A) that contains $M^1$ (Al, Ti or Zr) to which a hydrolyzable characteristic group is bonded and a compound (B) that contains Si to which a hydrolyzable characteristic group is bonded. At least part of —COO— group of the polymer (X) is neutralized with a metal ion having a valence of at least two. At least 80 mol % of the compound (B) is a compound expressed by a specific formula. The ratio of [the number of moles of $M^1$ in the compound (A)]/[the number of moles Si in the compound (B)] is in the range of 0.1/99.9 to 35.0/65.0.

20 Claims, No Drawings

FORMED PRODUCT

TECHNICAL FIELD

The present invention relates to a formed product selected from a vertical form fill seal pouch (for example, a vertical form fill seal pouch for packaging foods, beverages, etc. in a form such as liquid, viscous body, powder, solid bulk, or a combination of these), a container cover (for example, a cover suitable for a cup-shaped container or a tray-shaped container), and a vacuum packaging pouch (for example, a vacuum packaging pouch for packaging foods including a solid content such as corn on the cob (corns), beans, bamboo shoots, potatoes, chestnuts, etc.).

BACKGROUND ART

Pouches or containers are used today for transporting or storing various products. In such a pouch or container, the properties of the material that forms the pouch or container has a great influence on the storage stability of the content or ease of transportation thereof.

Vertical pouch form fill machines are configured to form pouches from a packaging material (multilayer material) and fill the pouches with content. The vertical pouch form fill machines have the advantage of being capable of packing various foods or beverages. In addition, the packaging material has less opportunity to be touched by human hands in the vertical pouch form fill machines, which allows sanitation and labor savings to be achieved. Therefore, the vertical pouch form fill machines are widely used. In the vertical pouch form fill machines, a multilayer material supplied from a roll of the multilayer material (packaging material) is formed into a tube in a sailor collar-like section, and then the body part of a pouch is sealed. Subsequently, the bottom part of the pouch is sealed. Next, a measured amount of content is dropped from above the pouch so as to be filled into the pouch. Then, the upper part of the pouch is sealed, the upper edge of the sealed upper part is cut, and the pouch is introduced to a discharge conveyor. In this way, the pouch form fill machines perform a series of steps from the step of forming a pouch to the step of discharging the pouch filled with content.

In the case where the content is something that is deteriorated by oxygen gas, packaging materials having oxygen barrier properties are used for the vertical form fill seal pouch. Examples thereof to be used include a multilayer material that includes a film with barrier properties, such as aluminum foil, a coextruded polyamide film with barrier properties, a polyvinylidene chloride resin film, a film composed of ethylene-vinyl alcohol copolymer (hereinafter also referred to as "EVOH"), an aluminum deposited film and an inorganic material-deposited film. However, all those barrier films each have a problem as follows.

In the case of using a packaging material including aluminum foil, it is difficult to detect foreign substances in the content with a metal detector or by visual inspection. Further, the packaging material cannot be used in a microwave oven. Furthermore, aluminum clusters remain in the incineration process after disposal, which also is a problem.

Packaging materials using a polyvinylidene chloride resin film may be insufficient in oxygen barrier properties when the content is something that undergoes significant deterioration due to oxygen gas, though they may be sufficient in oxygen barrier properties, depending on the content. Furthermore, there are cases where a toxic gas such as dioxin is generated in the incineration process, resulting in environmental pollution.

Packaging materials using an EVOH film have a problem that their oxygen barrier properties are deteriorated when the EVOH film absorbs moisture, while this film exhibits excellent oxygen barrier properties in a low humidity atmosphere.

As a gas barrier film having excellent oxygen barrier properties, there are aluminum deposited films, and inorganic material-deposited transparent films formed by depositing silicon oxide, aluminum oxide, or the like. However, when such films are used in the vertical pouch form fill process, there is a problem that the barrier performance is deteriorated due to the generation of cracks or pinholes in the gas barrier layer (inorganic material-deposited layer).

As a packaging material that solves the above-mentioned problems, there is proposed a packaging material including a base, a substrate film and a sealant layer, in which a thermoplastic resin layer is disposed between the base and the substrate film (JP 5(1993)-318550 A). JP 5 (1993)-318550 A describes that the thermoplastic resin layer suppresses the deterioration of the oxygen barrier properties and water vapor barrier properties. However, the deterioration in the barrier performance is still not sufficiently suppressed.

In the vertical pouch form fill machine, when the packaging material is formed into a tube in the sailor collar-like section, the packaging material is stretched while being bent and held in contact with the edges of the sailor collar-like section. Further, there are cases where the packaging material deforms when content is filled therein. Furthermore, the packaging material may be squeezed in some cases so that the air in the headspace of the pouch is eliminated. Thus, the packaging material to be used in the vertical pouch form fill machine is required to have properties that are less deteriorated when being subjected to the above-mentioned process.

Moreover, today, there is an increasing number of cases of harsh conditions (time, temperature, humidity and the like) during the period from pouch form filling/heat sterilization to arrival at a consumer area. For example, foods that have been filled and packed in Southeast Asia, South America, etc. are transported to Europe and the United States, Japan, etc. Therefore, a vertical form fill seal pouch that stably exhibits a high level of oxygen barrier properties even under severe conditions of transportation, etc. is desired.

Furthermore, covered containers each composed of a cover and a tray or a cup having a flange are often used today as a container for storing content such as foods. In such covered containers, not only the containers such as cups and trays but also the covers are required, depending on the type of content, to have oxygen gas barrier properties. Thus, the use of a layered product including a film with excellent oxygen gas barrier properties as the cover has been conventionally proposed. For example, a polyvinylidene chloride resin film, an EVOH film, and a deposited film in which a deposited layer of inorganic substances such as silica, alumina and aluminum is formed on a base film (hereinafter also referred to as a "deposited film") have been used as the film with excellent oxygen gas barrier properties. A cover including a polyvinylidene chloride resin film (JP 57(1982)-30745 B2) and a cover including an EVOH film (JP 9(1997)-239911 A), for example, are proposed.

Further, a cover including an inorganic material-deposited layer also has been proposed (JP 2005-8160 A). However, such a cover has a problem that gas barrier properties are easily deteriorated due to the generation of cracks in the inorganic material-deposited layer. In response to this, there has been proposed a cover for a boil-in/retort container in which an anchor coat agent layer, a deposited film of an inorganic oxide, and a gas barrier coating film that has been obtained by sol-gel method are stacked on a base film (JP 2008-044617 A). There also has been proposed a cover in which a transparent gas barrier deposited layer composed of an inorganic oxide, a gas barrier coating layer, and a heat sealing resin film are stacked on a polyester film (JP 2006-027695 A). Further, there has been proposed a cover in which an anchor coat layer, a deposited thin film layer of an inorganic oxide, a gas barrier coating layer, and a sealant layer are stacked on a biaxially stretched polyamide film (JP 2005-231701 A). In such covers, the gas barrier coating layer can prevent the inorganic material-deposited layer from cracking. However, it is still difficult to completely prevent the inorganic material-deposited layer from cracking, in these covers. Depending on the intended use, there are the cases where the inorganic material-deposited layer cracks. For example, when the content includes the air, the cover is significantly inflated in boiling sterilization at atmospheric pressure, so that the cover is easily damaged. Further, the cover tends to shrink more easily in retort sterilization at high temperature, so that the cover fixed to the flange is easily stretched and damaged particularly in the periphery of the flange.

The inventors have proposed a container cover that suppresses the deterioration of the oxygen barrier properties resulting from physical impact or deformation in processing or transportation (JP 2006-306083 A).

Meanwhile, under severe heat sterilization conditions, such as the conditions where a covered container with a content including the air is subjected to boiling sterilization at high temperature and atmospheric pressure or retort sterilization at high temperature for a long time, the oxygen barrier performance is more easily deteriorated due to the deformation of the cover. Moreover, today, there is an increasing number of cases of harsh conditions (time, temperature, humidity and the like) during the period from fill packaging/heat sterilization to arrival at a consumer area. For example, foods that have been filled and packed in Southeast Asia, South America, etc. are transported to Europe and the United States, Japan, etc. Therefore, a cover that stably exhibits a high level of oxygen barrier properties even under severe conditions of boiling sterilization, retort sterilization, transportation, etc. is desired. Furthermore, a cover capable of maintaining its appearance even if it is subjected to a treatment under severe conditions is desired.

Conventionally, vacuum packaging is widely employed as an effective method for suppressing the chemical changes and microbial changes of the content such as corn on the cob (corns), beans, bamboo shoots, potatoes, chestnuts, tea, meat, fish, confectioneries etc. so as to achieve a long shelf life. Although heat sterilization is performed after vacuum packaging in many cases, there also are cases where the vacuum packaging of the content is performed in a sterile state so that the heat sterilization is omitted. In either the cases with or without heat sterilization, it is necessary to keep the oxygen concentration inside the package low, in order to suppress the microbial changes and chemical changes after vacuum packaging over a long period. Therefore, a pouch having high oxygen barrier properties is used for vacuum packaging.

The vacuum packaging pouch having high oxygen barrier properties is formed using a multilayer material that includes an oxygen barrier film. Examples of the oxygen barrier film that have been used include a polyvinylidene chloride resin film, an EVOH film, aluminum foil, and a film having a deposited layer composed of an inorganic oxide such as silicon oxide and aluminum oxide. However, all these oxygen barrier films have a problem as described below, and are not satisfactory as an oxygen barrier film for the vacuum packaging pouch.

With further increasing attention to the environment, the amount of use of a multilayer material that includes a polyvinylidene chloride resin film or a multilayer material that includes aluminum foil is now decreasing. The multilayer material that includes aluminum foil has a problem that aluminum foil remains as residue when being incinerated after the use. Furthermore, the multilayer material that includes a polyvinylidene chloride resin film has a problem of the possibility that a toxic compound containing chlorine is generated when being incinerated after the use. Moreover, it has been pointed out that the multilayer material including aluminum foil has a problem that the state of the content cannot be checked because of its opacity, and that the content cannot be inspected with a metal detector, for example.

The multilayer materials that include a deposited layer of an inorganic oxide such as silicon oxide and aluminum oxide are transparent and have excellent gas barrier properties. However, there are cases, in the multilayer materials, where the gas barrier properties are deteriorated due to cracks or pinholes in the inorganic oxide layer that have been generated by the deformation in vacuum packaging. In other words, there are cases where the deformation of the packaging pouch corresponding to the irregularity of the content, or the bending at the border between the portion in contact with the content and the heat sealed portion causes cracks or pinholes in the inorganic oxide layer. Furthermore, there also are cases where the stretching of the packaging pouch during heat sterilization, or the vibration or drop of the pouch during transportation or handling causes cracks or pinholes in the inorganic oxide layer. As described above, the multilayer material that includes a deposited layer of an inorganic oxide has a problem that the oxygen barrier properties are deteriorated due to the generation of cracks or pinholes.

The layered product that includes an EVOH layer has excellent oxygen barrier properties. However, this layered product has a problem that the oxygen barrier properties are temporarily deteriorated, immediately after heat sterilization that is performed subsequent to the vacuum packaging.

As a container for vacuum packaging having excellent gas barrier properties, there is proposed a container formed of a layered product that is provided with a resin composition layer containing an inorganic layered compound between a heat sealing film and a base layer such as a thermoplastic film (JP 11(1999)-314675 A). However, this container has a problem of insufficient oxygen barrier performance.

Further, there is proposed a packaging material for vacuum packaging a content that is hard and has a projecting portion (JP 2005-119063 A). This packaging material is a layered product of a base layer, a straight chain low density polyethylene resin layer, a gas barrier layer and a sealant layer. Examples of the gas barrier layer mentioned therein include a deposited polyester film on which an inorganic substance (aluminum metal, aluminum oxide or silicon oxide) is deposited, a deposited nylon film, a vinylidene chloride film, an ethylene-vinyl alcohol film, aluminum foil etc. However, such materials to be used for the gas barrier layer have problems as mentioned above. Moreover, the above-mentioned structure does not provide sufficient pinhole resistance.

Further, JP 2006-036272 A discloses a vacuum packaging material that includes aluminum foil and a plastic film on which an inorganic compound is deposited. The plastic film on which an inorganic compound is deposited is used for maintaining the barrier properties even when cracks or pinholes are generated in aluminum foil. However, this vacuum packaging material uses aluminum foil and thus has a problem as mentioned above. Moreover, the plastic film on which an inorganic compound is deposited has a problem that cracks or pinholes are likely to be generated.

In order to solve the above-mentioned problems, the inventors have proposed a vacuum packaging pouch using a specific gas barrier layered product (JP 2007-008148 A).

Meanwhile, today, there is an increasing number of cases of harsh conditions (time, temperature, humidity and the like) during the period from fill packaging/heat sterilization to consumption, as has been described above. For example, foods that have been filled and packed in Southeast Asia, South America, etc. are transported to Europe and the United States, Japan, etc. Therefore, a vacuum packaging pouch that maintains higher oxygen barrier properties after the vacuum packaging/heat sterilization than conventional ones is desired. In addition, a vacuum packaging pouch capable of withstanding heat sterilization under more severe conditions is desired.

Citation List

Patent Literature

Patent Literature 1: JP 5(1993)-318550 A
Patent Literature 2: JP 57(1982)-30745 B2
Patent Literature 3: JP 9(1997)-239911 A
Patent Literature 4: JP 2005-8160 A
Patent Literature 5: JP 2008-044617 A
Patent Literature 6: JP 2006-027695 A
Patent Literature 7: JP 2005-231701 A
Patent Literature 8: JP 2006-306083 A
Patent Literature 9: JP 11(1999)-314675 A
Patent Literature 10: JP 2005-119063 A
Patent Literature 11: JP 2006-036272 A
Patent Literature 12: JP 2007-008148 A

SUMMARY OF INVENTION

Technical Problem

In view of such circumstances, it is an object of the present invention to provide a vertical form fill seal pouch capable of suppressing the property deterioration due to the pouch form filling process in a vertical pouch form fill machine and maintaining the oxygen barrier properties and appearance even under severe conditions. It is another object of the present invention to provide a container cover capable of maintaining the oxygen barrier properties and appearance even under severe conditions. It is still another object of the present invention to provide a vacuum packaging pouch capable of maintaining the quality of the content and its appearance even under severe conditions.

Solution to Problem

As a result of studies to achieve the above-mentioned objects, the inventors have found that the use of a specific gas barrier layer makes it possible to reduce the thickness of the gas barrier layer and enhance the strength thereof, without deteriorating the gas barrier properties, and further to suppress the deterioration of the gas barrier properties due to heat sterilization, vacuum packaging, transportation, etc. under severe conditions, thus allowing the above-mentioned objects to be achieved. The present invention is based on these new findings.

The formed product of the present invention is a formed product selected from the group consisting of a vertical form fill seal pouch, a container cover and a vacuum packaging pouch. The formed product is formed using a gas barrier layered product. The gas barrier layered product includes a base, and at least one layer with gas barrier properties that is stacked on the base. The layer is formed of a composition that includes a hydrolyzed condensate of at least one type of compound (L) containing a hydrolyzable characteristic group, and a neutralized product of a polymer (X) containing at least one functional group selected from a carboxyl group and a carboxylic acid anhydride group. The compound (L) includes a compound (A) and a compound (B) that contains Si to which the hydrolyzable characteristic group is bonded. The compound (A) is at least one type of compound expressed by the following Formula (I):

$$M^1 X^1_m Y^1_{n-m} \qquad (I).$$

where: $M^1$ denotes any one selected from Al, Ti and Zr; $X^1$ denotes any one selected from F, Cl, Br, I, $OR^1$, $R^2COO$, $R^3COCHCOR^4$ and $NO_3$; $Y^1$ denotes any one selected from F, Cl, Br, I, $OR^5$, $R^6COO$, $R^7COCHCOR^8$, $NO_3$ and $R^9$; $R^1$, $R^2$, $R^5$ and $R^6$ each denote a hydrogen atom or an alkyl group, independently; $R^3$, $R^4$, $R^7$, $R^8$ and $R^9$ each denote an alkyl group, independently; n is equal to the valence of $M^1$; and m denotes an integer of 1 to n.

The compound (B) includes at least one type of compound expressed by the following Formula (II):

$$Si(OR^{10})_p R^{11}_{4-p-q} X^2_q \qquad (II),$$

where: $R^{10}$ denotes an alkyl group; $R^{11}$ denotes an alkyl group, an aralkyl group, an aryl group or an alkenyl group; $X^2$ denotes a halogen atom; p and q each denote an integer of 0 to 4, independently; and $1 \leq p+q \leq 4$.

At least part of —COO— group contained in the functional group of the polymer (X) is neutralized with a metal ion having a valence of at least two. The percentage of the compound expressed by Formula (II) in the compound (B) is at least 80 mol %. The composition has the ratio of [the number of moles of $M^1$ atom derived from the compound (A)]/[the number of moles of Si atom derived from the compound (B)] in the range of 0.1/99.9 to 35.0/65.0.

Advantageous Effects of Invention

The vertical form fill seal pouch of the present invention has excellent oxygen barrier properties and suppresses the deterioration of the oxygen barrier properties resulting from deformation such as bending and stretching. Therefore, the vertical form fill seal pouch of the present invention can suppress the deterioration in the quality of the content (for example, foods) over a long period. Further, the vertical form fill seal pouch of the present invention can be used suitably as a vertical form fill seal pouch because the deterioration of the oxygen barrier properties is suppressed even when subjected to the pouch forming/filling steps in a vertical pouch form fill machine.

The cover of the present invention can maintain the oxygen barrier properties and appearance even under severe conditions.

The vacuum packaging pouch of the present invention suppresses the deterioration of the oxygen barrier properties resulting from deformation such as bending and stretching. Therefore, in the vacuum packaging pouch of the present invention, the oxygen barrier properties are hardly deteriorated due to the deformation in vacuum packaging/heat sterilization. The vacuum packaging pouch of the present invention is flexible, and easily adhered closely to foods including a solid content. Therefore, the degassing is carried out easily in vacuum packaging. Accordingly, the vacuum packaging pouch of the present invention can reduce the residual oxygen inside the vacuum packaging pouch, and thus is excellent in giving a long shelf life of foods. Further, angulated or folded portions are unlikely to occur after vacuum packaging, and therefore defects such as pinholes or cracks are unlikely to occur. Furthermore, the vacuum packaging pouch of the present invention can suppress the occurrence of pinholes resulting from the abrasion of the vacuum packaging pouches against each other, or the vacuum packaging pouches against a cardboard. Moreover, the vacuum packaging pouch of the present invention has excellent oxygen barrier properties and thus can suppress the deterioration in the quality of the content (for example, foods) over a long period. In addition, the vacuum packaging pouch of the present invention reduces the deterioration in the appearance resulting from retorting.

DESCRIPTION OF EMBODIMENTS

Embodiments of the present invention are described below. In the following descriptions, specific compounds may be described as examples of the substances that show specific functions. The present invention, however, is not limited thereto. Furthermore, materials exemplified herein can be used individually or in combination unless otherwise specified.

The formed product of the present invention is a formed product selected from the group consisting of a vertical form fill seal pouch, a container cover and a vacuum packaging pouch. The formed product is formed using a specific layered product (hereinafter also referred to as a "gas barrier layered product"). That is, at least part of the formed product is composed of the gas barrier layered product.

The vertical form fill seal pouch of the present invention is formed using the specific layered product (gas barrier layered product). That is, the vertical form fill seal pouch of the present invention includes the gas barrier layered product. It should be noted that the pouch may be formed entirely of the gas barrier layered product, or may be formed partially of a material other than the gas barrier layered product. The gas barrier layered product is used in an area, for example, of at least 50%, at least 60%, at least 70%, at least 80%, at least 90%, or 100% of the total area of the pouch in an expanded state.

In the vertical form fill seal pouch of the present invention, a vertical pouch form fill machine is used to form a pouch. Typical pouch forming/filling steps are described below.

The gas barrier layered product (material) is placed in the pouch form fill machine while being wound in the form of a roll. The layered product wound off from the roll is supplied to a sailor collar-like section and formed into a tube in the sailor collar-like section. The layered product formed into a tube is introduced from above to below. Next, the body part of the pouch is sealed, and subsequently the bottom part thereof is sealed. Then, a measured amount of content is dropped from above so as to be filled into the pouch. Subsequently, the upper part of the pouch is sealed, and the upper edge of the sealed upper part is cut. The pouch filled with the content is introduced to a discharge conveyor. In the case where the layered product is to be sterilized with hydrogen peroxide water, the layered product wound off from the roll passes through a hydrogen peroxide water bath and dryer provided between the roll and the sailor collar-like section, which thereafter is introduced into the sailor collar-like section.

The container cover of the present invention is formed using the specific layered product (gas barrier layered product). That is, the container cover of the present invention includes the gas barrier layered product. It should be noted that the cover may be formed entirely of the gas barrier layered product, or may be formed partially of a material other than the gas barrier layered product. The gas barrier layered product is used in an area of the cover, for example, of at least 50%, at least 60%, at least 70%, at least 80%, at least 90%, or 100% of the total area of the cover.

In an example, the cover of the present invention is used for a container having a flange portion. An example of the container has a concave portion (storage portion) for storing the content, and a flange portion extending in the form of a flange outwardly from the edge of the opening of the concave portion. This container can be formed by vacuum forming or air pressure forming. The cover of the present invention is bonded to the flange portion to cover the concave portion of the container such that the inside of the concave portion is sealed in an airtight manner. Preferred examples of bonding methods include bonding by heat sealing. For encapsulating content in the container, after the content is filled into the concave portion of the container, the flange portion and the cover may be heat sealed with the concave portion covered by the cover.

The vacuum packaging pouch of the present invention is formed using the specific layered product (gas barrier layered product). That is, the vacuum packaging pouch of the present invention includes the gas barrier layered product. It should be noted that the vacuum packaging pouch may be formed entirely of the gas barrier layered product, or may be formed partially of a material other than the gas barrier layered product. The gas barrier layered product is used in an area, for example, of at least 50%, at least 60%, at least 70%, at least 80%, at least 90%, or 100% of the total area of the vacuum packaging pouch in an expanded state.

The vacuum packaging pouch of the present invention is provided for use, for example, in a state where two pieces of the gas barrier layered products are stacked together, and the three sides of the outer edge thereof are heat sealed. The last one side may be heat sealed at the time of use, after the packaging pouch is filled with content and the inside of the packaging pouch is degassed. Hereinafter, the gas barrier layered product used in the present invention is described in detail.

<Gas Barrier Layered Product>

The gas barrier layered product of the present invention includes a base and at least one layer with gas barrier properties stacked on the base. The layer (hereinafter also referred to as a "gas barrier layer") is formed of a specific composition. The composition includes a hydrolyzed condensate of at least one type of compound (L) containing a hydrolyzable characteristic group, and a neutralized product of a polymer (X) containing at least one functional group selected from a carboxyl group and a carboxylic acid anhydride group. The compound (L) is at least one type of compound containing the hydrolyzable characteristic group, and typically is at least one type of compound that contains a metal atom to which the hydrolyzable characteristic group is bonded. The compound (L) includes a compound (A) and a compound (B) that contains Si to which the hydrolyzable characteristic group is bonded. Hereinafter, the at least one functional group selected from a carboxyl group and a carboxylic acid anhydride group contained in the polymer (X) may be referred to as a "functional group (F)". At least part of —COO— group contained in the functional group (F) is neutralized with a metal ion having a valence of at least two. From another aspect, the —COO— group contained in the functional group (F) forms a salt with the metal ion having a valence of at least two.

The gas barrier layer is stacked on at least one surface of the base. The gas barrier layer may be stacked only on one surface of the base or may be stacked on both surfaces of the base. The gas barrier layered product used in the present invention may include a layer other than the gas barrier layer. It should be noted that the "layer stacked on the base" include a layer stacked directly on the base and a layer stacked on the base via another member (layer).

The percentage of the total of the hydrolyzed condensate of the compound (L) and the neutralized product of the polymer (X) in the composition is, for example, at least 50 wt %, at least 70 wt %, at least 80 wt %, at least 90 wt %, at least 95 wt %, or at least 98 wt %.

<Hydrolyzed Condensate>

The composition that forms the gas barrier layer contains the hydrolyzed condensate of the compound (L). The hydrolysis of the compound (L) allows at least part of the characteristic group of the compound (L) to be substituted by a hydroxyl group. Further, the hydrolysate is condensed to form a compound to which a metal atom is bonded via oxygen. This condensation is repeated, which allows a compound that can be considered substantially as a metal oxide to be formed. In this case, in order to cause the hydrolysis and condensation, it is important that the compound (L) contain a hydrolyzable characteristic group (functional group). When such a group is not bonded to the compound (L), the hydrolysis and condensation do not occur or occur very slowly. Accordingly, in such a case, it is difficult to obtain the effects of the present invention. Si may be classified into a semimetal element in some cases but is described as a metal in this description.

The hydrolyzed condensate can be produced, for example, from a specific raw material by a technique to be used in a known sol-gel method. Examples of the raw material to be used include the compound (L), a partial hydrolysate of the compound (L), a total hydrolysate of the compound (L), a partially hydrolyzed condensate of the compound (L), a partial condensate of a total hydrolysate of the compound (L), and a combination thereof. These raw materials may be produced using a known method, or commercially available raw materials may be used. The raw material is not particularly limited. For example, a condensate to be obtained by the hydrolysis and condensation of approximately 2 to 10 molecules can be used as the raw material. Specifically, the raw material can be a linear condensate of dimer to decamer obtained by the hydrolysis and condensation of tetramethoxysilane, for example.

The compound (A) is at least one type of compound expressed by the following Formula (I):

$$M^1 X^1_m Y^1_{n-m} \quad (I),$$

where: $M^1$ denotes any one selected from Al, Ti and Zr; $X^1$ denotes any one selected from F, Cl, Br, I, $OR^1$, $R^2COO$, $R^3COCHCOR^4$ and $NO_3$; $Y^1$ denotes any one selected from F, Cl, Br, I, $OR^5$, $R^6COO$, $R^7COCHCOR^8$, $NO_3$ and $R^9$; $R^1$, $R^2$, $R^5$ and $R^6$ each denote a hydrogen atom or an alkyl group, independently; $R^3$, $R^4$, $R^7$, $R^8$ and $R^9$ each denote an alkyl group, independently; n is equal to the valence of $M^1$; and m denotes an integer of 1 to n.

$X^1$ may be identical to or different from $Y^1$. $M^1$ is preferably Al because the changes in oxygen barrier properties and appearance, such as transparency, of the gas barrier layered product to be obtained before and after being subjected to retorting can be reduced particularly. $X^1$ and $Y^1$ except $R^9$ is a hydrolyzable group. $X^1$ is preferably any one selected from Cl, $OR^1$ and $NO_3$, more preferably $OR^1$. $Y^1$ is preferably any one selected from Cl, $OR^5$ and $NO_3$, more preferably $OR^5$.

The number of carbon atoms contained in the alkyl group to be used as $R^1$, $R^2$, $R^5$ and $R^6$ is preferably at least 1 and not more than 20, more preferably at least 1 and not more than 10, and for example, at least 1 and not more than 4. $R^1$ and $R^5$ each are preferably a methyl group, an ethyl group, an isopropyl group, a n-butyl group or a t-butyl group, particularly preferably an isopropyl group or n-butyl group. The number of carbon atoms contained in the alkyl group to be used as $R^3$, $R^4$, $R^7$, $R^8$ and $R^9$ is preferably at least 1 and not more than 4, more preferably at least 1 and not more than 2. $R^3$, $R^4$, $R^7$ and $R^8$ each are preferably a methyl group or an ethyl group. $R^3COCHCOR^4$ and $R^7COCHCOR^8$ each can be coordinately bonded to $M^1$ atom via their carbonyl group. $R^9$ is preferably a methyl group or an ethyl group. It should be noted that $R^9$ generally does not have a functional group. The value of (n−m) in Formula (I) may be 0 or 1, for example.

Specific examples of the compound (A) include aluminum compounds such as aluminum chloride, aluminum triethoxide, aluminum tri-normal propoxide, aluminum triisopropoxide, aluminum tri-normal butoxide, aluminum tri-t-butoxide, aluminum triacetate, aluminum acetylacetonate and aluminum nitrate; titanium compounds such as titanium tetraisopropoxide, titanium tetra-normal butoxide, titanium tetra(2-ethylhexoxide), titanium tetramethoxide, titanium acetylacetonate and titanium ethylacetoacetate; and zirconium compounds such as zirconium tetra-normal propoxide, zirconium tetrabutoxide and zirconium tetraacetylacetonate. Preferred examples of the compound (A) include aluminum triisopropoxide and aluminum tri-normal butoxide.

The compound (B) is at least one type of Si compound that contains Si to which the hydrolyzable characteristic group is bonded. The compound (B) includes at least one type of compound expressed by the following Formula (II):

$$Si(OR^{10})_p R^{11}_{4-p-q} X^2_q \quad (II),$$

where: $R^{10}$ denotes an alkyl group; $R^{11}$ denotes an alkyl group, an aralkyl group, an aryl group or an alkenyl group; $X^2$ denotes a halogen atom; p and q each denote an integer of 0 to 4, independently; and $1 \leq p+q \leq 4$.

$OR^{10}$ and $X^2$ each are a hydrolyzable group. The alkyl group denoted by $R^{10}$ may be a methyl group, an ethyl group, a n-propyl group, an isopropyl group, a n-butyl group or a t-butyl group, and is preferably a methyl group or an ethyl group. The halogen atom denoted by $X^2$ may be a chlorine atom, a bromine atom or an iodine atom, for example, and is preferably a chlorine atom. Further, the alkyl group denoted by $R^{11}$ may be a methyl group, an ethyl group, a n-propyl group, an isopropyl group, a n-butyl group, a t-butyl group or a n-octyl group, for example. The aralkyl group denoted by $R^{11}$ may be a benzyl group, a phenethyl group or a trityl group, for example. Further, the aryl group denoted by $R^{11}$ may be a phenyl group, a naphthyl group, a tolyl group, a xylyl group or a mesityl group, for example. The alkenyl group denoted by $R^{11}$ may be a vinyl group or an allyl group, for example.

Specific examples of the compound (B) expressed by Formula (II) include tetrachlorosilane, tetrabromosilane, tetramethoxysilane, tetraethoxysilane, methyltrimethoxysilane, ethyltrimethoxysilane, octyltrimethoxysilane, phenyltrimethoxysilane, vinyltrimethoxysilane, vinyltriethoxysilane, chlorotrimethoxysilane, chlorotriethoxysilane, dichlorodimethoxysilane, dichlorodiethoxysilane, trichloromethoxysilane, trichloroethoxysilane and vinyltrichlorosilane. Preferred examples of the compound (B) expressed by Formula (II) include tetramethoxysilane and tetraethoxysilane.

The compound (B) may further include at least one type of compound expressed by the following Formula (III) in addition to the compound expressed by Formula (II). When the compound expressed by Formula (III) is contained therein, the changes in oxygen barrier properties and appearance, such as transparency, before and after boiling or before and after retorting can be reduced further.

$$Si(OR^{12})_r X^3_s Z^3_{4-r-s} \quad (III),$$

where: $R^{12}$ denotes an alkyl group; $X^3$ denotes a halogen atom; $Z^3$ denotes an alkyl group substituted by a functional group having reactivity with a carboxyl group; r and s each denote an integer of 0 to 3, independently; and $1 \leq r+s \leq 3$.

$OR^{12}$ and $X^3$ each are a hydrolyzable group. The alkyl group denoted by $R^{12}$ may be a methyl group, an ethyl group, a n-propyl group, an isopropyl group, a n-butyl group or a t-butyl group, for example, and is preferably a methyl group or an ethyl group. The halogen atom denoted by $X^3$ may be a chlorine atom, a bromine atom or an iodine atom, for example, and is preferably a chlorine atom. Examples of the functional group that has reactivity with a carboxyl group and is contained in $Z^3$ include an epoxy group, an amino group, a hydroxyl group, a halogen atom, a mercapto group, an isocyanate group, an ureide group, an oxazoline group and a carbodiimide group. Among them, an epoxy group, an amino group, an isocyanate group, an ureide group or a halogen atom is preferred, because the changes in oxygen barrier properties and appearance, such as transparency, of the gas barrier layered product to be obtained before and after retorting can be reduced particularly. The functional group may be at least one selected from an epoxy group, an amino group and an isocyanate group, for example. Examples of the alkyl group substituted by such a functional group include those exemplified for $R^{12}$.

Specific examples of the compound expressed by Formula (III) include gamma-glycidoxypropyltrimethoxysilane, gamma-glycidoxypropyltriethoxysilane, gamma-glycidoxypropyltrichlorosilane, gamma-aminopropyltrimethoxysilane, gamma-aminopropyltriethoxysilane, gamma-aminopropyltrichlorosilane, gamma-chloropropyltrimethoxysilane, gamma-chloropropyltriethoxysilane, gamma-chloropropyltrichlorosilane, gamma-bromopropyltrimethoxysilane, gamma-bromopropyltriethoxysilane, gamma-bromopropyltrichlorosilane, gamma-mercaptopropyltrimethoxysilane, gamma-mercaptopropyltriethoxysilane, gamma-mercaptopropyltrichlorosilane, gamma-isocyanatepropyltrimethoxysilane, gamma-isocyanatepropyltriethoxysilane, gamma-isocyanatepropyltrichlorosilane, gamma-ureidopropyltrimethoxysilane, gamma-ureidopropyltriethoxysilane and gamma-ureidopropyltrichlorosilane. Preferred examples of the compound expressed by Formula (III) include gamma-glycidoxypropyltrimethoxysilane, gamma-glycidoxypropyltriethoxysilane, gamma-chloropropyltrimethoxysilane, gamma-chloropropyltriethoxysilane, gamma-aminopropyltrimethoxysilane and gamma-aminopropyltriethoxysilane.

The inventors have found that the gas barrier layered product obtained using the hydrolyzed condensate of the compound (L) that includes the compound (A) and the compound (B) exhibits excellent gas barrier properties and hot-water resistance, such as boiling-water resistance and retort resistance. That is, the gas barrier layered product was found not only to have excellent gas barrier properties but also to be capable of maintaining the excellent gas barrier properties even after being subjected to boiling or retorting as well as showing no change in appearance. What is further surprising, it has been newly found that the use of the hydrolyzed condensate of the compound (L) allowed the gas barrier layered product to maintain high gas barrier properties even when the gas barrier layer had a reduced thickness, whereas the gas barrier layered product with a reduced thickness previously had an exponential decrease in gas barrier properties and thus failed to maintain excellent gas barrier properties, as mentioned above.

In both cases where the compound (B) is composed only of the compound expressed by Formula (II), and where the compound (B) includes the compound expressed by Formula (III), the ratio of [the number of moles of $M^1$ atom derived from the compound (A)]/[the number of moles of Si atom derived from the compound (B)] is required to be in the range of 0.1/99.9 to 35.0/65.0 (for example, 0.1/99.9 to 30.0/70.0, and further 0.1/99.9 to 29.9/70.1). When the above-mentioned molar ratio is in this range, a gas barrier layered product that exhibits excellent gas barrier properties and hot-water resistance, such as boiling-water resistance and retort resistance, as mentioned above, can be obtained. When the percentage of $M^1$ in the total of $M^1$ and Si is less than 0.1 mol %, the hot-water resistance may decrease, the gas barrier properties after retorting may deteriorate, and further the appearance may be impaired. Further, the percentage more than 35 mol % causes a problem that the gas barrier properties before and after retorting deteriorate. Moreover, for better gas barrier properties and retort resistance, the ratio of [the number of moles of $M^1$ atom derived from the compound (A)]/[the number of moles of Si atom derived from the compound (B)] is preferably in the range of 1.2/98.8 to 30.0/70.0, more preferably in the range of 1.9/98.1 to 30.0/70.0, further preferably in the range of 2.8/97.2 to 30.0/70.0. The above-mentioned ratio may also be in the range of 0.5/99.5 to 30.0/70.0, in the range of 1.5/98.5 to 20.0/80.0, or in the range of 2.5/97.5 to 10.0/90.0.

The inventors have found that the gas barrier layered product obtained by using the hydrolyzed condensate of the compound (L) that further includes the compound expressed by Formula (III) in addition to the compound (A) and the compound expressed by Formula (II) exhibits more excellent gas barrier properties and hot-water resistance, such as boiling-water resistance and retort resistance.

In the case where the compound (B) includes the compound expressed by Formula (III), it is preferred that the following conditions be satisfied further. That is, the ratio of [the number of moles of Si derived from the compound expressed by Formula (II)]/[the number of moles of Si derived from the compound expressed by Formula (III)] is preferably in the range of 99.5/0.5 to 80.0/20.0. This ratio exceeding 99.5/0.5 might decrease the property of showing no change in the gas barrier properties and appearance, such as transparency, before and after boiling or retorting, that is, the hot-water resistance of the gas barrier layered product to be obtained. Further, when this ratio is less than 80/20, the gas barrier properties of the gas barrier layered product might deteriorate. Further, this ratio is more preferably in the range of 98.0/2.0 to 89.9/10.1 because such a range provides better hot-water resistance and gas barrier properties to the resultant gas barrier layered product.

The percentage of the total of the compound (A) and the compound (B) in the compound (L) is, for example, at least 80 mol % and not more than 100 mol %, and may be at least 90 mol %, at least 95 mol %, at least 98 mol %, at least 99 mol %, or 100 mol %.

The percentage of the compound expressed by Formula (II) in the compound (B) (the Si compound that is the compound (L)) is at least 80 mol % and not more than 100 mol %, and may be at least 90 mol %, at least 95 mol %, at least 98 mol %, or 100 mol %, for example. In an example, the compound (B)

is composed only of the compound expressed by Formula (II), whereas in another example, the compound (B) is composed only of the compound expressed by Formula (II) and the compound expressed by Formula (III).

The number of molecules to be condensed in the hydrolyzed condensate of the compound (L) can be controlled by adjusting the conditions to be employed in the hydrolysis and condensation. For example, the number of molecules to be condensed can be controlled by adjusting the amount of water, the type and concentration of a catalyst, the hydrolysis and condensation temperature, or the like.

For better gas barrier properties of the gas barrier layered product, the composition that forms the gas barrier layer has a ratio of [the weight of the inorganic component derived from the compound (L)]/[the total of the weight of the organic component derived from the compound (L) and the weight of the organic component derived from the polymer (X)] preferably in the range of 20.0/80.0 to 80.0/20.0, more preferably in the range of 30.5/69.5 to 70/30.

The weight of the inorganic component derived from the compound (L) can be calculated from the weight of the raw material used in the preparation of the composition. That is, supposing that the compound (L), a partial hydrolysate of the compound (L), a total hydrolysate of the compound (L), a partially hydrolyzed condensate of the compound (L), a partial condensate of a total hydrolysate of the compound (L), or a combination thereof has been totally hydrolyzed and condensed to form a metal oxide, the weight of the metal oxide is regarded as the weight of the inorganic component derived from the compound (L).

The calculation of the weight of the metal oxide is described below further in detail. In the case of the compound (A) expressed by Formula (I) being free from $R^9$, the total hydrolysis and condensation of the compound (A) result in a compound with a composition expressed by the formula: $M^1O_{n/2}$. Further, in the case of the compound (A) expressed by Formula (I) containing $R^9$, the total hydrolysis and condensation of the compound (A) result in a compound with a composition expressed by the formula: $M^1O_{m/2}R^9_{n-m}$. In this compound, $M^1O_{m/2}$ is a metal oxide. $R^9$ is regarded as the organic component derived from the compound (L). The compound (B) can be also calculated in the same manner. In this case, $R^{11}$ and $Z^3$ are regarded as the organic component derived from the compound (L). The content (%) of the hydrolyzed condensate in this description is a value obtained by: dividing the weight of the metal oxide by the weight of the effective components added by the end of step (i) to be described later; and multiplying it by 100. The weight of the effective components herein means the value obtained by subtracting, from the weight of all the components added by the end of the later-mentioned step (i), the weight of the volatile components such as solvents and compounds that are produced in the process in which the above-mentioned compound (L) changes into a metal oxide.

It should be noted that, in the case where the polymer (X) is neutralized with an ion other than metal ions (e.g., ammonium ion), the weight of the ion (e.g., ammonium ion) is also added to the weight of the organic component derived from the polymer (X).

<Carboxylic Acid-containing Polymer (Polymer (X))>

The composition that forms the gas barrier layer includes a neutralized product of a polymer containing at least one functional group selected from a carboxyl group and a carboxylic acid anhydride group. Hereinafter, the polymer may be referred to as a "carboxylic acid-containing polymer". The neutralized product of the carboxylic acid-containing polymer can be obtained by neutralizing at least part of the —COO— group contained in the functional group of the carboxylic acid-containing polymer with a metal ion having a valence of at least two. The carboxylic acid-containing polymer has at least two carboxyl groups or at least one carboxylic acid anhydride group in one molecule of the polymer. Specifically, a polymer that contains at least two constitutional units each having at least one carboxyl group, such as acrylic acid units, methacrylic acid units, maleic acid units and itaconic acid units, in one molecule of the polymer can be used. It is also possible to use a polymer that contains a constitutional unit having the structure of carboxylic acid anhydride, such as a maleic anhydride unit and a phthalic anhydride unit. The carboxylic acid-containing polymer may contain one type, or two or more types of the constitutional units each having at least one carboxyl group and/or the constitutional unit having the structure of carboxylic acid anhydride (hereinafter they may be referred to collectively as a "carboxylic acid-containing unit (G)" in some cases).

Further, the gas barrier layered product having good gas barrier properties can be obtained by adjusting the content of the carboxylic acid-containing unit (G) in all of the constitutional unit(s) in the carboxylic acid-containing polymer to 10 mol % or more. This content is more preferably 20 mol % or more, further preferably 40 mol % or more, particularly preferably 70 mol % or more. In the case where the carboxylic acid-containing polymer includes both of the constitutional units each having at least one carboxyl group and the constitutional unit having the structure of carboxylic acid anhydride, the total of the contents thereof is preferably in the above-mentioned range.

Besides the carboxylic acid-containing unit (G), other constitutional units that may be contained in the carboxylic acid-containing polymer are not particularly limited. Examples thereof include at least one type of constitutional unit selected from: constitutional units derived from (meth)acrylate esters, such as a methyl acrylate unit, a methyl methacrylate unit, an ethyl acrylate unit, an ethyl methacrylate unit, a butyl acrylate unit and a butyl methacrylate unit; constitutional units derived from vinyl esters, such as a vinyl formate unit and a vinyl acetate unit; and constitutional units derived from olefins, such as a styrene unit, a p-styrenesulfonic acid unit, an ethylene unit, a propylene unit and an isobutylene unit. When the carboxylic acid-containing polymer contains two or more types of constitutional units, the carboxylic acid-containing polymer can take any one of the following forms: the form of an alternating copolymer, the form of a random copolymer, the form of a block copolymer, and in addition, the form of a tapered copolymer.

Examples of the carboxylic acid-containing polymer include polyacrylic acid, polymethacrylic acid and poly (acrylic acid/methacrylic acid). For instance, the carboxylic acid-containing polymer may be at least one type of polymer selected from polyacrylic acid and polymethacrylic acid. Furthermore, specific examples of the carboxylic acid-containing polymer that contains the above-described constitutional units other than the carboxylic acid-containing unit (G) include ethylene-maleic anhydride copolymer, styrene-maleic anhydride copolymer, isobutylene-maleic anhydride alternating copolymer, ethylene-acrylic acid copolymer and the saponified product of ethylene-ethyl acrylate copolymer.

The molecular weight of the carboxylic acid-containing polymer is not particularly limited. However, the number average molecular weight thereof is preferably at least 5,000, more preferably at least 10,000, further preferably at least 20,000, because such a range provides excellent gas barrier properties and excellent mechanical properties such as drop impact strength to the resultant gas barrier layered product.

There is no specific upper limit on the number average molecular weight of the carboxylic acid-containing polymer. However, it is generally 1,500,000 or less.

The molecular weight distribution of the carboxylic acid-containing polymer is also not particularly limited. In order to achieve good surface appearance, such as the haze, of the gas barrier layered product and good storage stability of a solution (U) to be described later, the molecular weight distribution that is indicated by the ratio of the weight-average molecular weight/the number-average molecular weight of the carboxylic acid-containing polymer is preferably in the range of 1 to 6, more preferably in the range of 1 to 5, further preferably in the range of 1 to 4.

<Neutralization (Ionization)>

The neutralized product of the carboxylic acid-containing polymer can be obtained by neutralizing at least part of the at least one functional group (functional group (F)) selected from a carboxyl group and a carboxylic acid anhydride group of the carboxylic acid-containing polymer with a metal ion having a valence of at least two. In other words, this polymer contains a carboxyl group neutralized with a metal ion having a valence of at least two.

It is important for the metal ion that neutralizes the functional group (F) to have a valence of at least two. When the functional group (F) has not been neutralized or has been neutralized only with a monovalent ion, the layered product having good gas barrier properties cannot be obtained. Specific examples of the metal ion having a valence of at least two include calcium ion, magnesium ion, divalent iron ion, trivalent iron ion, zinc ion, divalent copper ion, lead ion, divalent mercury ion, barium ion, nickel ion, zirconium ion, aluminum ion and titanium ion. For example, the metal ion having a valence of at least two may be at least one ion selected from the group consisting of calcium ion, magnesium ion, barium ion, zinc ion, iron ion and aluminum ion.

For example, at least 10 mol % (for instance, at least 15 mol %) of the —COO— group contained in the functional group (F) of the carboxylic acid-containing polymer is neutralized with the metal ion having a valence of at least two. The gas barrier layered product exhibits good gas barrier properties when the carboxyl group and/or the carboxylic acid anhydride group in the carboxylic acid-containing polymer is neutralized with the metal ion having a valence of at least two.

The carboxylic acid anhydride group is deemed to include two —COO— groups. That is, when a mol of carboxyl group and b mol of carboxylic acid anhydride group are present, the mol of —COO— group contained therein is (a+2b) mol in total. The percentage of —COO— group neutralized with the metal ion having a valence of at least two in the —COO— group contained in the functional group (F) is preferably at least 60 mol % but not more than 100 mol %, more preferably at least 70 mol %, further preferably at least 80 mol %. Higher gas barrier properties can be achieved by increasing the percentage of the neutralized —COO— group.

The degree of neutralization (the degree of ionization) of the functional group (F) can be determined by measuring the infrared absorption spectrum of the gas barrier layered product using the ATR (attenuated total reflection) method, or by removing the gas barrier layer from the gas barrier layered product and then measuring the infrared absorption spectrum thereof using the KBr method. Further, the degree of neutralization can be determined also by obtaining the value of the X-ray fluorescence intensity of the metal element that has been used for ionization using X-ray fluorescence spectrometry.

In the infrared absorption spectrum, the peak attributed to C=O stretching vibration of the carboxyl group or carboxylic acid anhydride group before the neutralization (before the ionization) is observed in the range of 1600 $cm^{-1}$ to 1850 $cm^{-1}$, while the C=O stretching vibration of the carboxyl group after the neutralization (after the ionization) is observed in the range of 1500 $cm^{-1}$ to 1600 $cm^{-1}$. Accordingly, they can be evaluated individually in the infrared absorption spectrum. Specifically, the ratio between them is determined from the maximum absorbance in the respective ranges, so that the degree of ionization of the polymer that forms the gas barrier layer of the gas barrier layered product can be calculated using a standard curve prepared beforehand. The standard curve can be prepared by measuring the infrared absorption spectrum for a plurality of standard samples each having a different degree of neutralization.

In the case where the thickness of the gas barrier layer is 1 µm or less and the base contains an ester bond, the degree of ionization cannot be calculated accurately because the peak of the ester bond in the base is detected in the infrared absorption spectrum obtained using the ATR method and the detected peak overlaps the peak of the —COO— in the carboxylic acid-containing polymer (polymer (X)) that forms the gas barrier layer. Therefore, the degree of ionization of the polymer (X) that forms the gas barrier layer with a thickness of 1 µm or less should be calculated from the results given by the X-ray fluorescence spectrometry.

Specifically, the degree of ionization of the polymer (X) that forms the gas barrier layer stacked on the base free from ester bonds is determined from the infrared absorption spectrum. Next, the layered product for which the degree of ionization has been determined is subjected to the X-ray fluorescence spectrometry to calculate the X-ray fluorescence intensity of the metal element used for the ionization. Subsequently, the calculations are performed in the same manner, for layered products that are different only in the degree of ionization. The correlation between the degree of ionization and the X-ray fluorescence intensity of the metal element used for the ionization is calculated therefrom, so that a standard curve is prepared. Then, the gas barrier layered product that uses the base containing an ester bond is subjected to the X-ray fluorescence spectrometry, and the degree of ionization is calculated from the X-ray fluorescence intensity of the metal element used for the ionization according to the above-mentioned standard curve.

<Compound (P)>

The composition that forms the gas barrier layer may include a compound (P) containing at least two amino groups. The compound (P) is a compound different from the compound (L) and the polymer (X). In the case where the composition further includes the compound (P), at least part of the —COO— group contained in the functional group (F) of the polymer (X) is neutralized and/or reacted with the compound (P). Examples of the compound (P) to be used include alkylenediamines, polyalkylene polyamines, alicyclic polyamines, aromatic polyamines and polyvinylamines. Among these, alkylenediamines are preferred in order to obtain the gas barrier layered product with better gas barrier properties.

Specific examples of the compound (P) include hydrazine, ethylenediamine, propylenediamine, hexamethylenediamine, diethylenetriamine, triethylenetetramine, diaminodiphenylmethane, 1,3-diaminocyclohexane, 1,2-diaminocyclohexane, 1,4-diaminocyclohexane, xylylenediamine, chitosan, polyallylamine and polyvinylamine. The compound (P) is preferably ethylenediamine, propylenediamine or chitosan, in order to obtain the gas barrier layered product with better gas barrier properties.

For better hot-water resistance of the gas barrier layered product, the molar ratio of [the amino groups contained in the compound (P)]/[the —COO— group contained in the functional group of the carboxylic acid-containing polymer] is preferably in the range of 0.2/100 to 20/100, more preferably in the range of 0.5/100 to 15/100, particularly preferably in the range of 1/100 to 10/100.

When the compound (P) is added to the carboxylic acid-containing polymer, the compound (P) may be neutralized with acid in advance. Examples of the acid to be used for the neutralization include hydrochloric acid, nitric acid, sulfuric acid, acetic acid and carbonic acid. In order to obtain the gas barrier layered product with better gas barrier properties, hydrochloric acid, acetic acid and carbonic acid are used preferably.

<Compound (Q)>

The composition that forms the gas barrier layer may include a compound (Q) containing at least two hydroxyl groups. In the case where the composition further includes the compound (Q), at least part of the —COO— group contained in the functional group (F) of the polymer (X) is reacted with the compound (Q) to form an ester bond. Such an embodiment allows the gas barrier properties of the gas barrier layered product after being stretched to be improved. More specifically, the addition of the compound (Q) renders the gas barrier layer unlikely to be damaged even when the gas barrier layered product is stretched. As a result, high gas barrier properties can be maintained even after the gas barrier layered product is stretched. For example, the gas barrier properties of the gas barrier layered product are made less likely to deteriorate even after the gas barrier layered product is stretched, for example, when tension is applied in processing (e.g., printing and lamination) or when a formed product filled with foods is dropped.

The compound (Q) is a compound different from the compound (L) and the polymer (X). Examples of the compound (Q) include low molecular weight compounds and high molecular weight compounds. Preferred examples of the compound (Q) include polymeric compounds such as polyvinyl alcohol, partially saponified polyvinyl acetate, ethylene-vinyl alcohol copolymer, polyethylene glycol, polyhydroxyethyl(meth)acrylate, polysaccharides such as starch and polysaccharide derivatives derived from polysaccharides such as starch.

As long as the effects of the present invention are not impaired, the composition that forms the gas barrier layer may include, if desired: inorganic acid metal salts such as carbonate, hydrochloride, nitrate, hydrogen carbonate, sulfate, hydrogen sulfate, phosphate, borate and aluminate; organic acid metal salts such as oxalate, acetate, tartrate and stearate; metal complexes such as an acetylacetonate metal complex, e.g., aluminum acetylacetonate, a cyclopentadienyl metal complex, e.g., titanocene, and a cyano metal complex; a layered clay compound; a crosslinking agent; a plasticizer; an antioxidant; an ultraviolet absorber; and a flame retardant. The composition that forms the gas barrier layer may also contain fine powder of a metal oxide, fine silica powder, etc.

<Base>

Bases made of various materials such as a thermoplastic resin film and a thermosetting resin film can be used as the base used in the gas barrier layered product. Examples of the base include: films such as thermoplastic resin films and thermosetting resin films; fiber assemblies such as fabrics and papers; wood; and films in a specific shape made of a metal oxide, or the like. Among them, thermoplastic resin films are particularly preferred as the base of the gas barrier layered product to be used for a food packaging material. Furthermore, the base may include a paper layer.

Examples of the thermoplastic resin film include films formed by processing of: polyolefin resins such as polyethylene and polypropylene; polyester resins such as polyethylene terephthalate, polyethylene-2,6-naphthalate, polybutylene terephthalate and copolymers thereof; polyamide resins such as nylon 6, nylon 66 and nylon 12; polystyrene; poly (meth)acrylic ester; polyacrylonitrile; polyvinyl acetate; polycarbonate; polyarylate; regenerated cellulose; polyimide; polyetherimide; polysulfone; polyethersulfone; polyetheretherketone; and ionomer resins. Preferred examples of the base of the layered product to be used for a food packaging material include films made of polyethylene, polypropylene, polyethylene terephthalate, nylon 6 and nylon 66. The base of the layered product to be used for food packaging materials is preferably a polyamide film (nylon film), most preferably nylon 6 and nylon 66. Nylon 6 and nylon 66 have excellent mechanical properties. Therefore, the layered product having a structure of [a multilayer film including the gas barrier layer and nylon 6 or nylon 66 as a base]/adhesive agent layer/sealant layer presents no problem in practical use in view of the mechanical properties. Such an embodiment requires only a single time of the lamination step, thus reducing the environmental load and increasing production in the lamination step. Further, the weight also can be reduced. In view of the mechanical properties, the thickness of the polyamide film as a base is preferably at least 15 μm, more preferably at least 20 μm. The thickness of the polyamide film, for example, is 50 μm or less.

In the case where the gas barrier layer is not used and the polyamide film is disposed on the top surface of the layered product, the polyamide film is deteriorated due to high temperature heat treatment such as retort sterilization, resulting in a significant deterioration in the mechanical properties of the polyamide film. However, in the case where the gas barrier layer is present on the outside of the polyamide film, the gas barrier layer prevents the deterioration of the polyamide film, thus allowing the inherent mechanical properties of the polyamide film to be maintained even after retort sterilization. Also in view of this, the polyamide film is preferably used as a base.

The thermoplastic resin film may be a stretched film or may be an unstretched film. As the thermoplastic resin film, a stretched film, particularly a biaxially stretched film, is preferred because such a film allows the gas barrier layered product to have excellent processability, for example, in printing and lamination. The biaxially stretched film may be produced using any method of simultaneous biaxial stretching, sequential biaxial stretching and tubular stretching.

The gas barrier layered product may further include an adhesive layer (H) disposed between the base and the gas barrier layer. This configuration can improve the adhesiveness between the base and the gas barrier layer. The adhesive layer (H) made of an adhesive resin can be formed by treating the surface of the base with a known anchor coating agent, or applying a known adhesive onto the surface of the base. As a result of the studies on various adhesive resins, it was found that an adhesive resin containing a urethane bond in which the percentage of the nitrogen atom (the nitrogen atom of the urethane bond) in the entire resin was in the range of 0.5 to 12 wt % was preferred. The adhesiveness between the base and the gas barrier layer can be improved particularly by using such an adhesive resin. A strong bond between the base and the gas barrier layer with the adhesive layer (H) interposed therebetween can suppress the deterioration in the gas barrier properties and appearance when the gas barrier layered product is subjected to processing such as printing and lamination.

The content of the nitrogen atom (the nitrogen atom of the urethane bond) in the adhesive resin is more preferably in the range of 2 to 11 wt %, further preferably in the range of 3 to 8 wt %.

As the adhesive resin containing a urethane bond, a two-component reactive polyurethane adhesive in which a polyisocyanate component and a polyol component are mixed together to react with each other is preferred.

The strength of the gas barrier layered product can be improved by increasing the thickness of the adhesive layer (H). However, when the thickness of the adhesive layer (H) is increased excessively, the appearance is deteriorated. The thickness of the adhesive layer (H) is preferably in the range of 0.03 µm to 0.18 µm. Such an adhesive layer can suppress the deterioration of the gas barrier properties and appearance when the gas barrier layered product is subjected to processing such as printing and lamination. In addition, the adhesive layer can improve the drop strength of the packaging material that uses the gas barrier layered product. The thickness of the adhesive layer (H) is more preferably in the range of 0.04 µm to 0.14 µm, further preferably in the range of 0.05 µm to 0.10 µm.

The total thickness of the gas barrier layer(s) included in the gas barrier layered product used in the present invention is preferably 1.0 µm or less, and for example, 0.9 µm or less. A reduction in the thickness of the gas barrier layer(s) allows the change in the size of the gas barrier layered product to be kept low in processing such as printing and lamination, and further increases the flexibility of the gas barrier layered product. Thus, it is possible to make the mechanical properties of the gas barrier layered product close to the original mechanical properties of the film used as the base. The gas barrier layered product used in the present invention allows the oxygen permeability in an atmosphere of 20° C. and 85% RH to be 1.1 $cm^3/(m^2 \cdot day \cdot atm)$ or less (for example, 1.0 $cm^3/(m^2 \cdot day \cdot atm)$ or less), even when the total thickness of the gas barrier layer(s) included in the layered product is 1.0 µm or less (for example, 0.9 µm or less). The thickness of each gas barrier layer is preferably 0.05 µm or more (for example, 0.15 µm or more) because such a gas barrier layer provides good gas barrier properties to the gas barrier layered product. The total thickness of the gas barrier layer(s) is further preferably 0.1 µm or more (for example, 0.2 µm or more). The thickness of the gas barrier layer(s) can be controlled by the concentration of the solution and the coating application method that are used for forming the gas barrier layer(s).

The layered product of the present invention may include a layer formed of an inorganic substance (hereinafter also referred to as an "inorganic layer") between the base and the gas barrier layer. The inorganic layer can be formed of an inorganic substance such as inorganic oxides. The inorganic layer can be formed by vapor phase film formation such as vapor deposition.

The inorganic substance that forms the inorganic layer is required only to have gas barrier properties against oxygen, water vapor, etc. Preferably, it is transparent. The inorganic layer can be formed using an inorganic oxide such as aluminum oxide, silicon oxide, silicon oxynitride, magnesium oxide, tin oxide, or a mixture thereof, for example. Among them, aluminum oxide, silicon oxide, and magnesium oxide can be used preferably since they have excellent barrier properties against gases such as oxygen and water vapor.

Preferred thickness of the inorganic layer varies depending on the type of inorganic oxide that forms the inorganic layer, but is generally in the range of 2 nm to 500 nm. The thickness can be selected in this range so that the gas barrier layered product has good gas barrier properties and mechanical properties. If the thickness of the inorganic layer is less than 2 nm, the inorganic layer has no reproducibility in exhibiting the barrier properties against gases such as oxygen and water vapor, and does not exhibit satisfactory gas barrier properties in some cases. If the thickness of the inorganic layer exceeds 500 nm, the gas barrier properties of the inorganic layer tend to deteriorate when the gas barrier layered product is stretched or bent. The thickness of the inorganic layer is preferably in the range of 5 to 200 nm, more preferably in the range of 10 to 100 nm.

The inorganic layer can be formed by depositing an inorganic oxide on the base. Examples of the formation method include vacuum deposition, sputtering, ion plating, chemical vapor deposition (CVD), etc. Among them, the vacuum deposition can be used preferably in view of productivity. A preferred heating method that is employed for carrying out the vacuum deposition is one of electron beam heating, resistance heating and induction heating. In order to improve the adhesiveness between the inorganic layer and the base as well as the denseness of the inorganic layer, the plasma assisted deposition or the ion beam assisted deposition may be employed in the deposition. In order to improve the transparency of the inorganic layer, reactive evaporation in which a reaction is caused, for example, by injecting oxygen gas may be employed in the deposition.

The microstructure of the gas barrier layer is not particularly limited. However, it is preferred that the gas barrier layer have the microstructure described below because in that case the deterioration of the gas barrier properties can be suppressed when the gas barrier layered product is stretched. A preferred microstructure is a sea-island structure composed of a sea phase (alpha) and an island phase (beta). The island phase (beta) is a region where the proportion of the hydrolyzed condensate of the compound (L) is higher as compared to the sea phase (alpha).

Preferably, the sea phase (alpha) and the island phase (beta) each further have a microstructure. For example, the sea phase (alpha) may further form a sea-island structure composed of a sea phase (alpha 1) that consists mainly of the neutralized product of the carboxylic acid-containing polymer, and an island phase (alpha 2) that consists mainly of the hydrolyzed condensate of the compound (L). Furthermore, the island phase (beta) may further form a sea-island structure composed of a sea phase (beta 1) that consists mainly of the neutralized product of the carboxylic acid-containing polymer, and an island phase (beta 2) that consists mainly of the hydrolyzed condensate of the compound (L). Preferably, the ratio (volume ratio) of [the island phase (beta 2)/the sea phase (beta 1)] in the island phase (beta) is larger than that of [the island phase (alpha 2)/the sea phase (alpha 1)] in the sea phase (alpha). The diameter of the island phase (beta) is preferably in the range of 30 nm to 1200 nm, more preferably in the range of 50 nm to 500 nm, further preferably in the range of 50 nm to 400 nm. The diameter of each of the island phase (alpha 2) and the island phase (beta 2) is preferably 50 nm or less, more preferably 30 nm or less, further preferably 20 nm or less.

In order to obtain a structure as mentioned above, moderate hydrolysis and condensation of the compound (L) need to occur prior to the crosslinking reaction between the compound (L) and the carboxylic acid-containing polymer. For this, it is possible to employ the methods of; using a specific compound (L) together with the carboxylic acid-containing polymer in a suitable ratio; allowing the compound (L) to be subjected to hydrolysis and condensation in advance, before mixing it with the carboxylic acid-containing polymer; and using a suitable hydrolysis-condensation catalyst, for example.

Further, it has been found that, when specific production conditions are employed, a layered region with a high proportion of the hydrolyzed condensate of the compound (L) is formed on the surface of the gas barrier layer. Hereinafter, the layer of the hydrolyzed condensate of the compound (L) formed on the surface of the gas barrier layer may be referred to as a "skin layer". The formation of the skin layer improves the water resistance of the surface of the gas barrier layer. The skin layer formed of the hydrolyzed condensate of the compound (L) gives hydrophobic properties to the surface of the gas barrier layer, and gives, to the gas barrier layered product, properties that prevent the gas barrier layers stacked in a water-wet state from adhering to each other. Further, it is surprising that, even when the skin layer having hydrophobic properties is formed on the surface of the gas barrier layer, the wettability of the surface, for example, by a printing ink is still good. The presence or absence of the skin layer on the gas barrier layer or the state of the skin layer to be formed thereon differs depending on the production conditions. As a result of diligent studies, the inventors have found that the contact angle of the gas barrier layer with water and a favorable skin layer are correlated, and a favorable skin layer is formed when the contact angle satisfies the following conditions. When the contact angle of the gas barrier layer with water is less than 20°, the skin layer cannot be formed sufficiently in some cases. In such a case, the surface of the gas barrier layer is easily swelled by water, and the layered products that have been stacked on each other in a water-wet state for a while may adhere to each other in rare cases. When the contact angle of the gas barrier layer is 20° or more, the skin layer can be formed sufficiently, so that the surface of the gas barrier layer is not swelled by water. Thus, no layers adhere. The contact angle of the gas barrier layer with water is preferably 24° or more, further preferably 26° or more. Further, when the contact angle is more than 65°, the thickness of the skin layer increases excessively, and thus the transparency of the gas barrier layered product decreases. Accordingly, the contact angle is preferably 65° or less, more preferably 60° or less, further preferably 58° or less.

In the vertical form fill seal pouch of the present invention, heat sealing is generally employed. Therefore, it is generally necessary that a heat sealable layer be disposed on a side that serves as the inner portion of the pouch or both sides that serve as the inner portion and outer portion of the pouch, in the layered product constituting the vertical form fill seal pouch of the present invention. In the case where the heat sealable layer is present only on the side that serves as the inner portion of the pouch, the body part is generally sealed with a butt seam. In the case where heat the sealable layer is present on both sides that serve as the inner portion and outer portion of the pouch, the body part is generally sealed with an envelope-like seam. A polyolefin layer (hereinafter also referred to as a "PO layer") is preferably used as the heat sealable layer.

The gas barrier layered product constituting the cover of the present invention may further include a polyolefin layer stacked on the base. For example, the polyolefin layer may be used as the layer on the side of the container among the layers that constitute the gas barrier layered product, in order to impart heat sealing properties.

Furthermore, the gas barrier layered product constituting the vacuum packaging pouch of the present invention may further include a polyolefin layer stacked on the base. For example, the polyolefin layer may be used as the layer on the side of the content among the layers that constitute the gas barrier layered product, in order to impart heat sealing properties.

It should be noted that the above-mentioned phrase "stacked on the base" include the case of being stacked on the base via another layer in addition to the case of being stacked directly on the base.

Hereinafter, a multilayer film including the base and the gas barrier layer formed on the base may be referred to as a gas barrier multilayer film. This gas barrier multilayer film also is one type of the gas barrier layered product used in the present invention. Layers for imparting various properties (for example, heat sealing properties) may be stacked on the gas barrier multilayer film. For example, the gas barrier layered product may have a structure of gas barrier multilayer film/adhesive layer/polyolefin layer, or a structure of polyolefin layer/adhesive layer/gas barrier multilayer film/adhesive layer/polyolefin layer. That is, the gas barrier layered product may include a polyolefin layer disposed on one top surface. Further, the gas barrier layered product may include a first polyolefin layer disposed on one top surface and a second polyolefin layer disposed on the other top surface. The first polyolefin layer and the second polyolefin layer may be the same, or different from each other.

The gas barrier layered product constituting the vertical form fill seal pouch may have, for example, the following structure from the layer to serve as the outer portion of the vertical form fill seal pouch toward the layer to serve as the inner portion thereof.

(1) Gas barrier multilayer film/PO layer
(2) Inorganic material-deposited film layer/gas barrier multilayer film/PO layer
(3) Gas barrier multilayer film/inorganic material-deposited film layer/PO layer
(4) Gas barrier multilayer film/polyamide layer/PO layer
(5) Inorganic material-deposited film layer/gas barrier multilayer film/polyamide layer/PO layer
(6) Gas barrier multilayer film/inorganic material-deposited film layer/polyamide layer/PO layer
(7) Polyamide layer/gas barrier multilayer film/PO layer
(8) Polyamide layer/inorganic material-deposited film layer/gas barrier multilayer film/PO layer
(9) Polyamide layer/gas barrier multilayer film/inorganic material-deposited film layer/PO layer
(10) Polyamide layer/gas barrier multilayer film/polyamide layer/PO layer
(11) Polyamide layer/inorganic material-deposited film layer/gas barrier multilayer film/polyamide layer/PO layer
(12) Polyamide layer/gas barrier multilayer film/inorganic material-deposited film layer/polyamide layer/PO layer
(13) Polyester layer/gas barrier multilayer film/PO layer
(14) Polyester layer/gas barrier multilayer film/polyamide layer/PO layer
(15) Polyester layer/inorganic material-deposited film layer/gas barrier multilayer film/PO layer
(16) Polyester layer/inorganic material-deposited film layer/gas barrier multilayer film/polyamide layer/PO layer
(17) Polyester layer/gas barrier multilayer film/inorganic material-deposited film layer/PO layer
(18) Polyester layer/gas barrier multilayer film/inorganic material-deposited film layer/polyamide layer/PO layer
(19) Gas barrier multilayer film/EVOH layer/PO layer
(20) Gas barrier multilayer film/EVOH layer/polyamide layer/PO layer
(21) PO layer/gas barrier multilayer film/PO layer
(22) PO layer/gas barrier multilayer film/polyamide layer/PO layer
(23) PO layer/polyamide layer/gas barrier multilayer film/PO layer

(24) PO layer/polyester layer/gas barrier multilayer film/PO layer
(25) PO layer/inorganic material-deposited film layer/gas barrier multilayer film/PO layer
(26) PO layer/gas barrier multilayer film/inorganic material-deposited film layer/PO layer
(27) PO layer/polyamide layer/inorganic material-deposited film layer/gas barrier multilayer film/PO layer
(28) PO layer/polyamide layer/gas barrier multilayer film/inorganic material-deposited film layer/PO layer
(29) PO layer/polyamide layer/inorganic material-deposited film layer/gas barrier multilayer film/polyamide layer/PO layer
(30) Polyamide layer/gas barrier multilayer film/inorganic material-deposited film layer/polyamide layer/PO layer
(31) PO layer/polyester layer/inorganic material-deposited film layer/gas barrier multilayer film/PO layer
(32) PO layer/polyester layer/inorganic material-deposited film layer/gas barrier multilayer film/polyamide layer/PO layer
(33) PO layer/polyester layer/gas barrier multilayer film/inorganic material-deposited film layer/PO layer
(34) PO layer/polyester layer/gas barrier multilayer film/inorganic material-deposited film layer/polyamide layer/PO layer
(35) PO layer/EVOH layer/gas barrier multilayer film/PO layer
(36) PO layer/EVOH layer/gas barrier multilayer film/polyamide layer/PO layer
(37) PO layer/gas barrier multilayer film/EVOH layer/PO layer
(38) PO layer/gas barrier multilayer film/EVOH layer/polyamide layer/PO layer
(39) Gas barrier multilayer film/polyamide layer/EVOH layer/PO layer
(40) Polyamide layer/gas barrier multilayer film/EVOH layer/PO layer
(41) Polyamide layer/gas barrier multilayer film/EVOH layer/polyamide layer/PO layer
(42) Polyamide layer/gas barrier multilayer film/polyamide layer/EVOH layer/PO layer
(43) Paper layer/PO layer/gas barrier multilayer film/PO layer
(44) Paper layer/PO layer/gas barrier multilayer film/polyamide layer/PO layer
(45) Paper layer/PO layer/polyamide layer/gas barrier multilayer film/PO layer
(46) Paper layer/PO layer/gas barrier multilayer film/EVOH layer/PO layer
(47) Paper layer/PO layer/gas barrier multilayer film/EVOH layer/polyamide layer/PO layer
(48) PO layer/paper layer/PO layer/gas barrier multilayer film/PO layer
(49) PO layer/paper layer/PO layer/gas barrier multilayer film/polyamide layer/PO layer
(50) PO layer/paper layer/PO layer/polyamide layer/gas barrier multilayer film/PO layer
(51) PO layer/paper layer/PO layer/gas barrier multilayer film/EVOH layer/PO layer
(52) PO layer/paper layer/PO layer/gas barrier multilayer film/EVOH layer/polyamide layer/PO layer Preferred examples of the structure of the gas barrier layered product constituting the vertical form fill seal pouch include a structure of gas barrier multilayer film/PO layer, and a structure of PO layer/gas barrier multilayer film/PO layer. In such a layered product, the base of the gas barrier multilayer film is preferably a polyamide film. The vertical form fill seal pouch having such a structure exhibits particularly excellent oxygen barrier properties after pouch forming, after heat sterilization, or after heat sterilization/transportation.

The gas barrier layered product constituting the cover may have, for example, the following structure from the layer to serve as the outer portion of the container toward the layer to serve as the inner portion thereof.

(1) Gas barrier multilayer film/PO layer
(2) Inorganic material-deposited film layer/gas barrier multilayer film/PO layer
(3) Gas barrier multilayer film/inorganic material-deposited film layer/PO layer
(4) Gas barrier multilayer film/polyamide layer/PO layer
(5) Inorganic material-deposited film layer/gas barrier multilayer film/polyamide layer/PO layer
(6) Gas barrier multilayer film/inorganic material-deposited film layer/polyamide layer/PO layer
(7) Polyamide layer/gas barrier multilayer film/PO layer
(8) Polyamide layer/inorganic material-deposited film layer/gas barrier multilayer film/PO layer
(9) Polyamide layer/gas barrier multilayer film/inorganic material-deposited film layer/PO layer
(10) Polyamide layer/gas barrier multilayer film/polyamide layer/PO layer
(11) Polyamide layer/inorganic material-deposited film layer/gas barrier multilayer film/polyamide layer/PO layer
(12) Polyamide layer/gas barrier multilayer film/inorganic material-deposited film layer/polyamide layer/PO layer
(13) Polyester layer/gas barrier multilayer film/PO layer
(14) Polyester layer/gas barrier multilayer film/polyamide layer/PO layer
(15) Polyester layer/inorganic material-deposited film layer/gas barrier multilayer film/PO layer
(16) Polyester layer/inorganic material-deposited film layer/gas barrier multilayer film/polyamide layer/PO layer
(17) Polyester layer/gas barrier multilayer film/inorganic material-deposited film layer/PO layer
(18) Polyester layer/gas barrier multilayer film/inorganic material-deposited film layer/polyamide layer/PO layer
(19) Gas barrier multilayer film/EVOH layer/PO layer
(20) Gas barrier multilayer film/EVOH layer/polyamide layer/PO layer
(21) PO layer/EVOH layer/gas barrier multilayer film/PO layer
(22) PO layer/EVOH layer/gas barrier multilayer film/polyamide layer/PO layer
(23) PO layer/gas barrier multilayer film/EVOH layer/PO layer
(24) PO layer/gas barrier multilayer film/EVOH layer/polyamide layer/PO layer
(25) Gas barrier multilayer film/polyamide layer/EVOH layer/PO layer
(26) Gas barrier multilayer film/polyamide layer/PO layer
(27) Polyamide layer/gas barrier multilayer film/EVOH layer/PO layer
(28) Polyamide layer/gas barrier multilayer film/EVOH layer/polyamide layer/PO layer
(29) Polyamide layer/gas barrier multilayer film/polyamide layer/EVOH layer/PO layer
(30) Paper layer/PO layer/gas barrier multilayer film/PO layer
(31) Paper layer/PO layer/gas barrier multilayer film/polyamide layer/PO layer
(32) Paper layer/PO layer/polyamide layer/gas barrier multilayer film/PO layer
(33) Paper layer/PO layer/gas barrier multilayer film/EVOH layer/PO layer

(34) Paper layer/PO layer/gas barrier multilayer film/EVOH layer/polyamide layer/PO layer
(35) PO layer/paper layer/PO layer/gas barrier multilayer film/PO layer
(36) PO layer/paper layer/PO layer/gas barrier multilayer film/polyamide layer/PO layer
(37) PO layer/paper layer/PO layer/polyamide layer/gas barrier multilayer film/PO layer
(38) PO layer/paper layer/PO layer/gas barrier multilayer film/EVOH layer/PO layer
(39) PO layer/paper layer/PO layer/gas barrier multilayer film/EVOH layer/polyamide layer/PO layer The gas barrier layered product constituting the cover particularly preferably has a structure of gas barrier multilayer film/PO layer. In this structure, a polyamide film, for example, can be used as the base of the gas barrier multilayer film. The cover having such a structure exhibits particularly excellent oxygen barrier properties after heat sterilization, or after heat sterilization/transportation.

The gas barrier layered product constituting the vacuum packaging pouch may have, for example, the following structure from the layer to serve as the outer portion in use as a vacuum packaging pouch toward the layer to serve as the inner portion therein.
(1) Gas barrier multilayer film/PO layer
(2) Inorganic material-deposited film layer/gas barrier multilayer film/PO layer
(3) Gas barrier multilayer film/inorganic material-deposited film layer/PO layer
(4) PO layer/gas barrier multilayer film/PO layer
(5) Gas barrier multilayer film/polyamide layer/PO layer
(6) Inorganic material-deposited film layer/gas barrier multilayer film/polyamide layer/PO layer
(7) Gas barrier multilayer film/inorganic material-deposited film layer/polyamide layer/PO layer
(8) Polyamide layer/gas barrier multilayer film/PO layer
(9) Polyamide layer/inorganic material-deposited film layer/gas barrier multilayer film/PO layer
(10) Polyamide layer/gas barrier multilayer film/inorganic material-deposited film layer/PO layer
(11) Polyamide layer/gas barrier multilayer film/polyamide layer/PO layer
(12) Polyamide layer/inorganic material-deposited film layer/gas barrier multilayer film/polyamide layer/PO layer
(13) Polyamide layer/gas barrier multilayer film/inorganic material-deposited film layer/polyamide layer/PO layer
(14) Polyester layer/gas barrier multilayer film/PO layer
(15) Polyester layer/inorganic material-deposited film layer/gas barrier multilayer film/PO layer
(16) Polyester layer/gas barrier multilayer film/inorganic material-deposited film layer/PO layer
(17) Gas barrier multilayer film/EVOH layer/PO layer
(18) PO layer/EVOH layer/gas barrier multilayer film/PO layer
(19) PO layer/gas barrier multilayer film/EVOH layer/PO layer
(20) Gas barrier multilayer film/EVOH layer/polyamide layer/PO layer
(21) Gas barrier multilayer film/polyamide layer/EVOH layer/PO layer
(22) Gas barrier multilayer film/polyamide layer/PO layer
(23) Polyamide layer/gas barrier multilayer film/EVOH layer/PO layer
(24) Polyamide layer/gas barrier multilayer film/EVOH layer/polyamide layer/PO layer
(25) Polyamide layer/gas barrier multilayer film/polyamide layer/EVOH layer/PO layer Particularly preferred examples of the structure of the layered product constituting the vacuum packaging pouch include gas barrier multilayer film/polyamide layer/PO layer, and polyamide layer/gas barrier multilayer film/PO layer. In these structures, a polyamide film, for example, can be used as the base of the gas barrier multilayer film. The vacuum packaging pouch that uses such a gas barrier layered product exhibits particularly excellent oxygen barrier properties after vacuum packaging, or after vacuum packaging/heat sterilization.

An adhesive layer may be provided between the respective layers that constitute the gas barrier layered product. Further, in the case where the gas barrier layer of the gas barrier layered product is formed only on one surface of the base, the gas barrier layer may be stacked on either surface of the base. That is, in the vertical form fill seal pouch and vacuum packaging pouch, the gas barrier layer may face either outwardly or inwardly of the pouch, whereas in the cover, the gas barrier layer may be provided either on the inside of the base (on the container side) or the outside thereof. The polyolefin layer, the polyamide layer, the polyester layer, the inorganic material-deposited film layer, the EVOH layer and the paper layer are described below.

As the above-mentioned polyolefin (PO) layer, a layer made of at least one type of resin selected from low density polyethylene, medium density polyethylene, high density polyethylene, straight chain (linear) low density polyethylene, polypropylene, ethylene-vinyl acetate copolymer, ethylene-alpha olefin copolymer, ionomer, ethylene-acrylic acid copolymer, ethylene-methyl acrylate copolymer, ethylene-methacrylic acid copolymer, ethylene-propylene copolymer, etc., can be used. In addition, a film obtained by extruding the above-mentioned at least one type of resin also can be used. Such a polyolefin layer may be a stretched one or an unstretched one. Preferred examples of the polyolefin layer include a layer made of low density polyethylene, straight chain (linear) low density polyethylene or polypropylene, or a sheet obtained by forming such a resin into a film. A layer or sheet made of straight chain (linear) low density polyethylene or polypropylene is more preferred. In view of the ease of the forming processability and heat resistance, any PO layer that constitutes the above-mentioned layered product is preferably made of unstretched low density polyethylene, unstretched straight chain (linear) low density polyethylene or unstretched polypropylene, further preferably made of unstretched straight chain (linear) low density polyethylene or unstretched polypropylene.

The PO layer disposed on the top surface of the content side among the layers that constitute the gas barrier layered product (that is, the most inner layer of the pouch in the vertical form fill seal pouch and the vacuum packaging pouch, and the layer on the side closest to the container in the cover) is preferably made of unstretched low density polyethylene, unstretched straight chain (linear) low density polyethylene or unstretched polypropylene.

Moreover, the above-mentioned PO layer may be made of easy peel polyolefin, particularly in the cover. A known easy peel polyolefin can be used therefor. For example, as a base resin made of polyolefin, a mixed resin obtained by polymer-blending thermoplastic resins that are incompatible or partially compatible with the base resin can be used. Examples of the polyolefin usable as the base resin include the resins mentioned above as a material for the PO layer.

Examples of the thermoplastic resin that is incompatible or partially compatible with the base resin include low density polyethylene, medium density polyethylene, high density polyethylene resin, straight chain low density polyethylene, polypropylene, polybutene, ethylene-propylene copolymer, ethylene-alpha olefin copolymer, polyethylene terephthalate, polyamide, acid copolymers such as ethylene-acrylic acid copolymer and ethylene-methacrylic acid copolymer, esterified materials such as ethylene-methyl acrylate copolymer, ethylene-ethyl acrylate copolymer and ethylene-methyl methacrylate copolymer, ethylene-vinyl acetate copolymer or the saponified product thereof, polystyrene, polymethylmethacrylate, etc., though they depend also on the type of the base resin. Further, various resins such as acid modified resins can be used in addition to the above-mentioned thermoplastic resins. These resins may be used as a single product in the same manner as the base resin, or a plurality of resins may be blended.

Preferred examples of the combination of the base resin and the thermoplastic resin that is incompatible or partially compatible with the base resin include combinations of polypropylene/polystyrene and polypropylene/polyethylene.

The thickness of the above-mentioned PO layer, though not particularly limited, is preferably in the range of 10 µm to 200 µm, more preferably in the range of 20 µm to 150 µm, in view of the mechanical strength and toughness, the impact resistance and the puncture resistance.

As the above-mentioned polyamide layer, a film obtained by extruding at least one type of resin selected from nylon 6, nylon 66, nylon 11, nylon 12, nylon 610, nylon 612 and nylon MXD6 can be used. These polyamide layers may be a stretched one or an unstretched one. Preferred examples of the polyamide layer include a film made of nylon 6 or nylon 66 (for example, a uniaxially or biaxially stretched film).

The thickness of the above-mentioned polyamide layer, though not particularly limited, is preferably in the range of 5 µm to 200 µm, more preferably in the range of 5 µm to 100 µm, in view of the mechanical strength and toughness, the impact resistance and the puncture resistance.

As the above-mentioned polyester layer, a film obtained by extruding at least one type of resin selected from polyethylene terephthalate, polyethylene naphthalate, polypropylene terephthalate, polybutylene terephthalate and polybutylene naphthalate can be used. These polyester layers may be a stretched one or an unstretched one. The polyester layer is preferably a sheet obtained by stretching polyethylene terephthalate or polyethylene naphthalate or forming it into a film.

The thickness of the above-mentioned polyester layer, though not particularly limited, is preferably in the range of 5 µm to 200 µm, more preferably in the range of 5 µm to 100 µm, in view of the mechanical strength and toughness, the impact resistance and the puncture resistance.

As the above-mentioned inorganic material-deposited film layer, a film in which an inorganic layer is deposited on a stretched film can be used. A uniaxially or biaxially stretched polyester film, polyamide film or polyolefin film, for example, can be used as the stretched film. For the inorganic layer, the above-mentioned inorganic layer can be used.

As the above-mentioned EVOH layer, a film obtained by extruding a resin obtained by saponifying ethylene-vinyl acetate copolymer can be used. Any of a uniaxially stretched film, a biaxially stretched film, and an unstretched film can be used as the EVOH layer. However, a biaxially stretched film is preferred. The thickness of the EVOH layer, though not particularly limited, is preferably in the range of 5 µm to 200 µm, more preferably in the range of 5 µm to 100 µm, in view of the gas barrier properties, the mechanical strength and toughness, the processability, etc.

Examples of the paper usable for the above-mentioned paper layer include Kraft paper, high quality paper, Simili paper, glassine paper, parchment paper, synthetic paper, white paperboard, manila board, milk carton board, cupboard, ivory paper, etc.

The polyolefin layer, the polyamide layer, the polyester layer, the inorganic material-deposited film layer, the EVOH layer and the paper layer may be laminated to another layer by a well-known method such as dry lamination, wet lamination, hot melt lamination, etc. For example, an unstretched polyolefin film, a stretched polyolefin film, an unstretched polyamide film or a stretched polyamide film may be laminated to another layer (film). Further, the polyolefin layer or the polyamide layer may be formed on another layer (film), for example, by well-known T-die extrusion. An adhesive layer may be disposed between the polyolefin layer and another layer. The adhesive layer can be formed using an anchor coating agent, an adhesive agent, an adhesive resin, or the like.

<Method for Producing The Gas Barrier Layered Product>

Hereinafter, a method for producing the gas barrier layered product used in the present invention is described. According to this method, the gas barrier layered product can be produced easily. The materials and the structure of the layered product to be employed in the production method of the present invention are the same as those described above. Hence, the same descriptions may be omitted in some cases.

The production method of the present invention includes steps (i) and (ii).

Step (i) is a step in which a layer formed of a composition including the polymer (X) and the hydrolyzed condensate of the compound (L) containing the hydrolyzable characteristic group is formed on the base. The layer is formed directly on the base, or formed on the base via another layer. The compound (L) includes the compound (A) and the compound (B). It should be noted that the reactivity of the compound (L) in the hydrolysis and condensation can be controlled by adding a compound (D) containing a carboxyl group and having a molecular weight of 100 or less to the compound (L), so that the gas barrier layered product to be obtained therefrom has good gas barrier properties and hot-water resistance. The compound (D) will be described in detail later.

The compound (A) and the compound (B), and the proportion of these compounds are the same as described for the composition that forms the gas barrier layer.

Step (ii) is a step in which the layer that has been formed in step (i) is brought into contact with a solution containing a metal ion with a valence of at least two (hereinafter, this step may be referred to as an ionization step). Step (ii) can be carried out by spraying the solution containing a metal ion with a valence of at least two on the layer that has been formed, or immersing both the base and the layer formed on the base in the solution containing a metal ion with a valence of at least two, for example. At least part of the —COO— group contained in the functional group (F) of the polymer (X) is neutralized in step (ii).

Hereinafter, step (i) is described in detail. When the carboxylic acid-containing polymer and the compound (L) that has not been hydrolyzed and condensed are mixed together, they may react with each other, thereby making it difficult to apply the solution (U). Therefore, it is exceptionally preferred that step (i) include the steps of (i-a) preparing a solution (S) that includes at least one type of compound selected from the compound (A) and the partially hydrolyzed condensate of the compound (A), and the compound (D) containing a carboxyl group and having a molecular weight of 100 or less;

(i-b) preparing a solution (T) by mixing the solution (S) with at least one type of compound selected from the compound (B) and the partially hydrolyzed condensate of the compound (B);

(i-c) forming, in the solution (T), the hydrolyzed condensate (oligomer (V)) of a plurality of the compounds (L) that include the compound (A) and the compound (B);

(i-d) preparing the solution (U) by mixing the polymer (X) with the solution (T) that has been subjected to step (i-c); and (i-e) forming a layer by coating the base with the solution (U) and drying it.

More specifically, the oligomer (V) obtained by hydrolyzing and condensing the compounds (L) is at least one metal element-containing compound selected from the partial hydrolysate of the compounds (L), the total hydrolysate of the compounds (L), the partially hydrolyzed condensate of the compounds (L), and the partial condensate of the total hydrolysate of the compounds (L). Hereinafter, such a metal element-containing compound may be referred to as a "compound (L)-based component". Step (i-a), step (i-b), step (i-c), step (i-d) and step (i-e) are more specifically described below.

Step (i-a) is a step in which the compound (A) included in the compound (L) is hydrolyzed and condensed under specific conditions. The compound (A) is hydrolyzed and condensed preferably in a reaction system that includes the compound (A), an acid catalyst, water, and if necessary, an organic solvent. Specifically, the technique that is used in a known sol-gel method can be used. In the hydrolysis and condensation, it is exceptionally preferred that the compound (D) containing a carboxyl group and having a molecular weight of 100 or less (hereinafter, referred to simply as the compound (D) in some cases) be added thereto so that the reaction can be controlled. The addition of the compound (D) can prevent gelation in the step of the hydrolysis and condensation of the compound (A).

The compound (D) is added to a metal element-containing compound that includes at least one selected from the compound (A), the partial hydrolysate of the compound (A), the total hydrolysate of the compound (A), the partially hydrolyzed condensate of the compound (A), and the partial condensate of the total hydrolysate of the compound (A) (hereinafter, this metal element-containing compound may be referred to as a "compound (A)-based component" in some cases), so that the compound (D) acts on the compound (A)-based component. Thus, the above-mentioned effects are provided. The method for adding the compound (D) is not particularly limited as long as the addition can be carried out before the compound (A)-based component gelates due to the hydrolysis and condensation reactions. However, preferred examples of the method include the following. First, the compound (D), water, and if necessary, an organic solvent are mixed to prepare an aqueous solution of the compound (D). Subsequently, the aqueous solution of the compound (D) is added to the compound (A)-based component, thereby producing the solution (S) in which the compound (D) has acted on the compound (A)-based component. Although there is no limitation on the amount of water to be mixed with the compound (D), the ratio of [the number of moles of water]/[the number of moles of the compound (D)] is preferably in the range of 25/1 to 300/1, more preferably in the range of 50/1 to 200/1, further preferably in the range of 75/1 to 150/1, in order to obtain the solution (S) that is dense and uniform.

With regard to the used amount of the compound (D), the ratio of [the number of moles of the compound (D)]/[the number of moles of the compound (A)] is preferably in the range of 0.25/1 to 30/1, more preferably in the range of 0.5/1 to 20/1, further preferably in the range of 0.75/1 to 10/1 because such ranges provide better reaction control of the compound (A) and better gas barrier properties of the gas barrier layered product.

The compound (D) is not particularly limited as long as it is a compound containing a carboxyl group and having a molecular weight of 100 or less. In order to increase the reaction probability between the compound (A) and the functional group (F) of the polymer (X) and achieve good hot-water resistance and gas barrier properties of the gas barrier layered product, acetic acid, propionic acid, hexanoic acid, and the like can be used as the compound (D), among which acetic acid is most preferred.

In step (i-b), the solution (T) is prepared. Specifically, the solution (T) can be prepared, for example, using a method in which the solution (S) and if necessary an organic solvent are added to the compound (B) that serves as a constituent component of the compound (L) and thereafter, an acid catalyst, water and if necessary, an organic solvent are added thereto.

In step (i-c), for example, hydrolysis and condensation reactions are carried out in a reaction system that includes the compound (A)-based component, the compound (B), an acid catalyst, water, and if necessary, an organic solvent. The technique that is used in a known sol-gel method can be used therefor. Thus, it is possible to obtain a solution of a metal element-containing compound that includes at least one selected from the compound (A)-based component, the compound (B), the partial hydrolysate of the compound (B), the total hydrolysate of the compound (B), the partially hydrolyzed condensate of the compound (B), and the partial condensate of the total hydrolysate of the compound (B).

The reactivity of the oligomer (V) can be controlled as well as the formation of gel can be prevented from occurring in the preparation of the oligomer (V), by performing the reaction in such steps. Therefore, gelation can be prevented from occurring when the oligomer (V) is mixed with the polymer (X).

A known acid can be used as the acid catalyst in step (i-a) and step (i-b). Examples thereof include hydrochloric acid, sulfuric acid, nitric acid, p-toluenesulfonic acid, benzoic acid, acetic acid, lactic acid, butyric acid, carbonic acid, oxalic acid and maleic acid. Among them, hydrochloric acid, sulfuric acid, nitric acid, acetic acid, lactic acid and butanoic acid are particularly preferred. A preferred used amount of the acid catalyst varies depending on the type of acid to be used. However, with respect to 1 mol of the metal atom in the compound (L), the amount of the acid catalyst is preferably in the range of $1\times10^{-5}$ to 10 mol, more preferably in the range of $1\times10^{-4}$ to 5 mol, further preferably in the range of $5\times10^{-4}$ to 1 mol. When the used amount of the acid catalyst is in this range, the gas barrier layered product with high gas barrier properties can be obtained.

The used amount of water in step (i-a) and step (i-b) varies depending on the type of compound (L). However, with respect to 1 equivalent of the hydrolyzable characteristic group in the compound (L), the used amount of water is preferably in the range of 0.05 to 10 equivalents, more preferably in the range of 0.1 to 5 equivalents, further preferably in the range of the 0.2 to 3 equivalents. When the used amount of water is in this range, the gas barrier layered product to be obtained has particularly excellent gas barrier properties. In step (i-a) and step (i-b), in the case of using a component that contains water such as hydrochloric acid, it is preferred that the used amount of water be determined in consideration of the amount of water to be introduced by the component.

Furthermore, in step (i-a) and step (i-b), an organic solvent may be used, as needed. The organic solvent to be used is not particularly limited, as long as the compound (L) can be dissolved in the solvent. For example, alcohols such as methanol, ethanol, isopropanol and normal propanol can be used suitably as the organic solvent. Alcohol having a molecular structure of the same type as the alkoxy group (an alkoxy component) contained in the compound (L) can be used more suitably. Specifically, methanol is preferred with respect to tetramethoxysilane, while ethanol is preferred with respect to tetraethoxysilane. The used amount of the organic solvent is not particularly limited. However, the used amount of the organic solvent is preferably such that the concentration of the compound (L) is 1 to 90 wt %, more preferably 10 to 80 wt %, further preferably 10 to 60 wt %.

In step (i-a), step (i-b) and step (i-c), the temperature of the reaction system to be employed for the hydrolysis and condensation of the compound (L) in the reaction system is not necessarily limited. However, the temperature of the reaction system is generally in the range of 2 to 100° C., preferably in the range of 4 to 60° C., further preferably in the range of 6 to 50° C. The reaction time varies depending on the reaction conditions such as the amount and type of the acid catalyst. However, the reaction time is generally in the range of 0.01 to 60 hours, preferably in the range of 0.1 to 12 hours, more preferably in the range of 0.1 to 6 hours. Further, the reaction may be performed in an atmosphere of various gases such as air, carbon dioxide, nitrogen and argon.

Step (i-d) is a step of preparing the solution (U) by mixing the carboxylic acid-containing polymer (=polymer (X)) with the solution (T) that contains the oligomer (V) obtained in step (i-c). The solution (U) can be prepared using the solution (T), the carboxylic acid-containing polymer, and if necessary, water and an organic solvent. For example, it is possible to employ a method of adding the solution (T) to a solution in which the carboxylic acid containing polymer has been dissolved, and mixing it. It is also possible to employ a method of adding a solution in which the carboxylic acid containing polymer has been dissolved in water or an organic solvent to the solution (T) and mixing it. In both methods, the solution (T) or the solution in which the carboxylic acid containing polymer has been dissolved to be added may be added at a time, or added at several times.

The solution in which the carboxylic acid-containing polymer has been dissolved to be used in step (i-d) can be prepared using the following method. The solvent to be used can be selected depending on the type of carboxylic acid-containing polymer. For example, in the case of a water-soluble polymer such as polyacrylic acid and polymethacrylic acid, water is preferred. In the case of a polymer such as isobutylene-maleic anhydride copolymer and styrene-maleic anhydride copolymer, water that contains an alkaline substance such as ammonia, sodium hydroxide and potassium hydroxide is preferred. Moreover, alcohols such as methanol and ethanol; ethers such as tetrahydrofuran, dioxane and trioxane; ketones such as acetone and methyl ethyl ketone; glycols such as ethylene glycol and propylene glycol; glycol derivatives such as methyl cellosolve, ethyl cellosolve and n-butyl cellosolve; glycerin; acetonitrile; dimethylformamide; dimethylsulfoxide; sulfolane; dimethoxyethane, etc. can be used in combination as long as they do not prevent the carboxylic acid-containing polymer from dissolving.

In the carboxylic acid-containing polymer contained in the solution (U), part (for example, 0.1 to 10 mol %) of the —COO— group contained in the functional group (F) may be neutralized with a monovalent ion. The degree of the neutralization of the functional group (F) with the monovalent ion is more preferably in the range of 0.5 to 5 mol %, further preferably in the range of 0.7 to 3 mol % because the gas barrier layered product having good transparency can be obtained. Examples of the monovalent ion include ammonium ion, pyridinium ion, sodium ion, potassium ion and lithium ion, among which ammonium ion is preferred.

In view of the preservation stability of the solution (U) and the application properties of the solution (U) onto the base, the solid content concentration of the solution (U) is preferably in the range of 3 wt % to 20 wt %, more preferably in the range of 4 wt % to 15 wt %, further preferably in the range of 5 wt % to 12 wt %.

In view of the preservation stability of the solution (U) and the gas barrier properties of the gas barrier layered product to be obtained, the pH of the solution (U) is preferably in the range of 1.0 to 7.0, more preferably in the range of 1.0 to 6.0, further preferably in the range of 1.5 to 4.0.

The pH of the solution (U) can be adjusted using a known method. For example, it can be adjusted by adding: an acidic compound such as hydrochloric acid, nitric acid, sulfuric acid, phosphoric acid, acetic acid, butanoic acid and ammonium sulfate; and a basic compound such as sodium hydroxide, potassium hydroxide, ammonia, trimethylamine, pyridine, sodium carbonate and sodium acetate. In this case, the use of a basic compound that introduces a monovalent cation into the solution enables part of the carboxyl group and/or carboxylic acid anhydride group in the carboxylic acid-containing polymer to be neutralized with the monovalent ion.

Step (i-e) is described. The state of the solution (U) prepared in step (i-d) changes with time and finally the solution (U) becomes a gel composition. The time required for gelation of the solution (U) depends on the composition of the solution (U). In order to apply the solution (U) steadily to a base, it is preferred that the solution (U) have such a viscosity that is stable over a long time and thereafter increases gradually. Preferably, the composition of the solution (U) is adjusted so that the solution (U) has a viscosity, measured with a Brookfield viscometer (B-type viscosity meter: 60 rpm), of 1 N·s/m$^2$ or less (more preferably 0.5 N·s/m$^2$ or less, particularly preferably 0.2 N·s/m$^2$ or less) even after the solution (U) is allowed to stand still at 25° C. for 2 days with reference to the time of addition of the entire amount of the compound (L)-based component. More preferably, the composition of the solution (U) is adjusted so that the solution (U) has a viscosity of 1 N·s/m$^2$ or less (more preferably 0.1 N·s/m$^2$ or less, particularly preferably 0.05 N·s/m$^2$ or less) even after the solution (U) is allowed to stand still at 25° C. for 10 days. Further preferably, the composition of the solution (U) is adjusted so that the solution (U) has a viscosity of 1 N·s/m$^2$ or less (more preferably 0.1 N·s/m$^2$ or less, particularly preferably 0.05 N·s/m$^2$ or less) even after the solution (U) is allowed to stand still at 50° C. for 10 days. When the viscosity of the solution (U) is in the above-mentioned ranges, the solution (U) has excellent storage stability and the gas barrier layered product to be obtained has better gas barrier properties in many cases.

In order to adjust the viscosity of the solution (U) to fall within the above-mentioned ranges, it is possible to employ the methods, for example, of: adjusting the concentration of the solid content; adjusting the pH; and adding a viscosity modifier such as carboxymethyl cellulose, starch, bentonite, tragacanth gum, stearate, alginate, methanol, ethanol, n-propanol and isopropanol.

In order to facilitate the application of the solution (U) to the base, an organic solvent that can be mixed uniformly with the solution (U) may be added to the solution (U) as long as the stability of the solution (U) is not impaired. Examples of the organic solvent that can be added include: alcohols such as methanol, ethanol, n-propanol and isopropanol; ethers such as tetrahydrofuran, dioxane and trioxane; ketones such as acetone, methyl ethyl ketone, methyl vinyl ketone and methyl isopropyl ketone; glycols such as ethylene glycol and propylene glycol; glycol derivatives such as methyl cellosolve, ethyl cellosolve and n-butyl cellosolve; glycerin; acetonitrile; dimethylformamide; dimethylacetamide; dimethylsulfoxide; sulfolane; and dimethoxyethane.

As long as the effects of the present invention are not impaired, the solution (U) may also include, if desired: inorganic acid metal salts such as carbonate, hydrochloride, nitrate, hydrogen carbonate, sulfate, hydrogen sulfate, phosphate, borate and aluminate; organic acid metal salts such as oxalate, acetate, tartrate and stearate; metal complexes such as an acetylacetonato metal complex, e.g., aluminum acetylacetonato, a cyclopentadienyl metal complex, e.g., titanocene and a cyano metal complex; a layered clay compound; a crosslinker; a compound such as the above-mentioned compound (P) containing at least two amino groups, the above-mentioned compound (Q) containing at least two hydroxyl groups and polymeric compounds other than those; a plasticizer; an antioxidant; an ultraviolet absorber; and a flame retardant. Further, the solution (U) may also contain fine powder of a metal oxide, fine silica powder, etc.

The solution (U) prepared in step (i-d) is applied to at least one surface of the base in step (i-e). Before the application of the solution (U), the surface of the base may be treated with a known anchor coating agent, or a known adhesive may be applied to the surface of the base. The method for applying the solution (U) to the base is not particularly limited and a known method can be employed. Preferred examples of the method include casting, dipping, roll coating, gravure coating, screen printing, reverse coating, spray coating, kiss coating, die coating, metering rod coating, chamber doctor coating and curtain coating.

After the application of the solution (U) to the base in step (i-e), the solvent contained in the solution (U) is removed and thereby a layered product (layered product (I)) before the ionization step can be obtained. The method for removing the solvent is not particularly limited and a known method can be used. Specifically, a method such as hot-air drying, hot roll contact drying, infrared heating or microwave heating can be used individually or in combination. The drying temperature is not particularly limited as long as it is lower than the flow initiation temperature of the base by at least 15 to 20° C., and it is also lower than the thermal decomposition initiation temperature of the carboxylic acid-containing polymer by at least 15 to 20° C. The drying temperature is preferably in the range of 70 to 200° C., more preferably in the range of 80 to 180° C., further preferably in the range of 90 to 160° C. The solvent may be removed either under normal pressure or under reduced pressure.

In the gas barrier layered product used in the present invention, a skin layer formed of the hydrolyzed condensate of the compound (L) is preferably formed on the surface of the gas barrier layer. Further, as has been described above, an excessive thickness of the skin layer deteriorates the transparency of the gas barrier layered product, which is therefore not preferred. A method for forming a skin layer with an appropriate thickness is described below. According to a result of diligent studies by the inventors, the occurrence or non-occurrence of the formation of a skin layer and the state of the formation of the skin layer depend on the reactivity of the hydrolyzed condensate of the compound (L), the composition of the compound (L), the solvent used for the solution (U), the drying speed of the solution (U) after being applied to the base, and the like. For example, it is possible to increase the contact angle of water with respect to the surface of the gas barrier layer (that is, to form an appropriate skin layer) by measuring the contact angle and increasing the reaction time in step (i-a) and step (i-c) on the condition that the contact angle is below the predetermined range mentioned above. Conversely, when the contact angle exceeds the predetermined range, the reaction time in step (i-a) and step (i-c) should be shortened, thereby decreasing the contact angle.

The layered product (I) obtained by the above-mentioned steps is brought into contact with a solution (hereinafter also referred to as a "solution (IW)" in some cases) containing a metal ion with a valence of at least two, in step (ii) (ionization step). Thus, a gas barrier layered product (layered product (II)) is obtained. The ionization step may be carried out at any stage, as long as the effects of the present invention are not impaired. The ionization step can be carried out, for example, before or after the layered product is processed into a specific shape, or after the layered product that has been processed into a specific shape is filled with content and then is sealed.

The solution (IW) can be prepared by dissolving, in a solvent, a compound (polyvalent metal compound) that releases the metal ion with a valence of at least two upon dissolution. The solvent to be used for preparing the solution (IW) is desirably water but may be a mixture of water and an organic solvent that can be mixed with water. Examples of such an organic solvent include: alcohols such as methanol, ethanol, n-propanol and isopropanol; ethers such as tetrahydrofuran, dioxane and trioxane; ketones such as acetone, methyl ethyl ketone, methyl vinyl ketone and methyl isopropyl ketone; glycols such as ethylene glycol and propylene glycol; glycol derivatives such as methyl cellosolve, ethyl cellosolve and n-butyl cellosolve; glycerin; acetonitrile; dimethylformamide; dimethylacetamide; dimethylsulfoxide; sulfolane; and dimethoxyethane.

As a polyvalent metal compound, it is possible to use a compound that releases the metal ion (that is, the metal ion with a valence of at least two), which has been exemplified in relation to the gas barrier layered product used in the present invention. Examples thereof include: calcium acetate, calcium hydroxide, barium hydroxide, calcium chloride, calcium nitrate, calcium carbonate, magnesium acetate, magnesium hydroxide, magnesium chloride, magnesium carbonate, iron(II) acetate, iron(II) chloride, iron(III) acetate, iron(III) chloride, zinc acetate, zinc chloride, copper(II) acetate, copper(III) acetate, lead acetate, mercury(II) acetate, barium acetate, zirconium acetate, barium chloride, barium sulfate, nickel sulfate, lead sulfate, zirconium chloride, zirconium nitrate, aluminum sulfate, potassium alum ($KAl(SO_4)_2$) and titanium(IV) sulfate. Only one of the polyvalent metal compounds may be used or two or more of them may be used in combination. Preferred examples of the polyvalent metal compound include calcium acetate, calcium hydroxide, magnesium acetate and zinc acetate. These polyvalent metal compounds may be used in the form of a hydrate.

The concentration of the polyvalent metal compound in the solution (IW) is not particularly limited, but is preferably in the range of $5\times10^{-4}$ wt % to 50 wt %, more preferably in the range of $1\times10^{-2}$ wt % to 30 wt %, further preferably in the range of 1 wt % to 20 wt %.

When the layered product (I) is brought into contact with the solution (IW), the temperature of the solution (IW) is not particularly limited. However, the higher the temperature, the higher the ionization rate of the carboxyl group-containing polymer. The temperature is, for example, in the range of 30 to 140° C., and is preferably in the range of 40 to 120° C., more preferably in the range of 50 to 100° C.

Desirably, after the layered product (I) is brought into contact with the solution (IW), the residual solvent in the layered product is removed. The method for removing the solvent is not particularly limited. A known method can be used. Specifically, one of drying methods such as hot-air drying, hot roll contact drying, infrared heating and microwave heating can be used individually, or two or more of them can be used in combination. The temperature at which the solvent is removed is not particularly limited as long as it is lower than the flow initiation temperature of the base by at least 15 to 20° C., and it is also lower than the thermal decomposition initiation temperature of the carboxylic acid-containing polymer by at least 15 to 20° C. The drying temperature is preferably in the range of 40 to 200° C., more preferably in the range of 60 to 150° C., further preferably in the range of 80 to 130° C. The solvent may be removed either under normal pressure or under reduced pressure.

In order not to impair the appearance of the surface of the gas barrier layered product, it is preferred that the excess of the polyvalent metal compound that has deposited on the surface of the layered product be removed before or after the removal of the solvent. As a method for removing the polyvalent metal compound, washing with a solvent capable of dissolving the polyvalent metal compound is preferred. A solvent that can be used for the solution (IW) can be employed as the solvent capable of dissolving the polyvalent metal compound. It is preferred that the same solvent as used for the solution (IW) be used.

The production method of the present invention may further include a step of heat treating the layer formed in step (i) at a temperature of 120 to 240° C., after step (i) and before and/or after step (ii). That is, the layered product (I) or (II) may be heat treated. The heat treatment can be carried out at any stage after the solvent of the applied solution (U) has been removed almost completely. However, the gas barrier layered product with good surface appearance can be obtained by heat treating the layered product before being subjected to the ionization step (that is, the layered product (I)). The temperature of the heat treatment is preferably in the range of 120° C. to 240° C., more preferably in the range of 140° C. to 240° C., further preferably in the range of 160° C. to 220° C. The heat treatment can be carried out in an atmosphere of air, nitrogen, argon, etc.

In the production method of the present invention, the layered product (I) or (II) may be irradiated with ultraviolet rays. The ultraviolet irradiation may be carried out anytime after the removal of the solvent in the applied solution (U) has been almost completed. The method of the ultraviolet irradiation is not particularly limited. A known method can be used. The wavelength of the ultraviolet rays to be employed for the irradiation is preferably in the range of 170 to 250 nm, more preferably in the range of 170 to 190 nm and/or in the range of 230 to 250 nm. Furthermore, instead of the ultraviolet irradiation, irradiation with radiation of electron beams, gamma rays, or the like may be carried out.

Only either one of the heat treatment and the ultraviolet irradiation may be carried out, or both may be used in combination. The heat treatment and/or the ultraviolet irradiation can cause the layered product to exert a higher level of the gas barrier performance in some cases.

The surface of the base may be subjected to a treatment (such as a treatment with an anchor coating agent, or coating with an adhesive) before the application of the solution (U) for the purpose of disposing the adhesive layer (H) between the base and the gas barrier layer. In this case, it is preferred that an aging process of allowing the base with the solution (U) applied thereon to stand at a relatively low temperature for a long time be carried out after step (i) (the application of the solution (U)) but before the above-mentioned heat treatment and step (ii) (ionization step). The temperature of the aging process is preferably in the range of 30 to 200° C., more preferably in the range of 30 to 150° C., further preferably in the range of 30 to 120° C. The duration of the aging process is preferably in the range of 0.5 to 10 days, more preferably in the range of 1 to 7 days, further preferably in the range of 1 to 5 days. The adhesiveness between the base and the gas barrier layer is further improved due to such an aging process. It is preferred that the above-mentioned heat treatment (heat treatment at 120° C. to 240° C.) further be carried out after this aging process.

The vertical form fill seal pouch of the present invention can be formed, for example, by forming the above-mentioned gas barrier layered product into a pouch with a vertical pouch form fill machine.

The vertical form fill seal pouch of the present invention has high oxygen barrier properties. In addition, the oxygen barrier properties of the vertical form fill seal pouch of the present invention are less likely to be deteriorated due to transportation and heat sterilization such as boiling sterilization and retort sterilization. Further, the vertical form fill seal pouch of the present invention has no adverse effects on the environment at the time of disposal. Furthermore, the content of the vertical form fill seal pouch of the present invention can be easily inspected.

Examples of the content of the vertical form fill seal pouch of the present invention include sauces such as tomato sauce and meat sauce, processed foods such as curry roux and soup, ketchup, mayonnaise, green horseradish paste, mustard, dressing, liquid diet for infants, etc., pet foods, rice, yogurt, fruits in syrup, fruit jelly, miso, zenzai, etc. In particular, the vertical form fill seal pouch of the present invention is preferably used for packaging a viscous food with a weight of 1 kg or more that is subjected to retort sterilization at high temperature for a long time.

The vertical form fill seal pouch of the present invention may have a total thickness of the gas barrier layer(s) of 1 µm or less, and an oxygen permeability before retorting of 1.0 $cm^3/(m^2 \cdot day \cdot atm)$ or less. Further, the vertical form fill seal pouch of the present invention may have a total thickness of the gas barrier layer(s) of 1 µm or less, and an oxygen permeability after retorting at 135° C. for 60 minutes of 1.5 $cm^3/(m^2 \cdot day \cdot atm)$ or less. The measurement conditions for the oxygen permeability will be described in EXAMPLES.

The cover of the present invention can be formed, for example, by cutting the above-mentioned gas barrier layered product into a specific shape.

The cover of the present invention has high oxygen barrier properties, and the oxygen barrier properties thereof does not depend on the humidity. Further, it suppresses the deterioration of the oxygen barrier properties resulting from transportation or heat sterilization such as boiling sterilization and retort sterilization. Moreover, the cover of the present invention has fewer adverse effects on the environment. The cover of the present invention can be used as a cover for a covered container with a content, such as processed foods of meat, e.g., meatballs and hamburger patties, processed foods of vegetables, e.g., bamboo shoots and cooked beans, wild vegetables, processed foods of marine products, liquid diet for infants, etc., pet foods, rice, yogurt, fruits in syrup, fruit jelly, pudding, miso, zenzai, etc. The cover of the present invention can prevent alteration of the content over a long period. The cover of the present invention can be used suitably as a cover for a covered container, for example, of processed foods of meat or pet foods that is occasionally subjected to retort sterilization at high temperature for a long time.

The container cover of the present invention may have a total thickness of the gas barrier layer(s) of 1 µm or less, and an oxygen permeability before retorting of 0.7 $cm^3/$ ($m^2 \cdot day \cdot atm$) or less. Further, the container cover of the present invention may have a total thickness of the gas barrier layer(s) of 1 μm or less, and an oxygen permeability after retorting at 135° C. for 60 minutes of 1.1 $cm^3/(m^2 \cdot day \cdot atm)$ or less. The measurement conditions for the oxygen permeability will be described in EXAMPLES.

The vacuum packaging pouch of the present invention can be produced by forming the above-mentioned gas barrier layered product into a pouch using a common pouch forming method. The form and size of the vacuum packaging pouch are selected corresponding to the intended use. As a typical example, two pieces of rectangular gas barrier layered products are first stacked together, and then three sides of their outer edges are heat sealed to form a pouch. Next, it is filled with content, and thereafter the inside of the packaging pouch is degassed, followed by heat sealing of the last side. Thus, the vacuum packaging pouch can be obtained.

The vacuum packaging pouch of the present invention suppresses the deterioration of the oxygen barrier properties resulting from the deformation of the packaging pouch, such as folding, bending, stretching, etc. in vacuum packaging. Further, the vacuum packaging pouch of the present invention suppresses the deterioration of the oxygen barrier properties resulting from the deformation such as stretching and bending in heat sterilization that is performed subsequent to the vacuum packaging. Therefore, the vacuum packaging pouch of the present invention exhibits excellent oxygen barrier properties still after vacuum packaging and heat sterilization. Moreover, it is possible to check the state of the content in use of the vacuum packaging pouch of the present invention. The advantageous effects of the vacuum packaging pouch of the present invention over conventional barrier materials are significant when the content includes a solid content. Examples of such a content include corn on the cob, bamboo shoots, potatoes, pickles, tea, peanuts, beans, coffee beans, cheese, meat, hamburger patties, sausages, fish and confectioneries. The vacuum packaging pouch of the present invention also may be used for an application in which foods including a solid content is vacuum packed and subjected to heat sterilization.

The vacuum packaging pouch of the present invention may have a total thickness of the gas barrier layer(s) of 1 μm or less, and an oxygen permeability before retorting of 0.8 $cm^3/(m^2 \cdot day \cdot atm)$ or less. Further, the vacuum packaging pouch of the present invention may have a total thickness of the gas barrier layer(s) of 1 μm or less, and an oxygen permeability after retorting at 135° C. for 60 minutes of 1.0 $cm^3/(m^2 \cdot day \cdot atm)$ or less. The measurement conditions for the oxygen permeability will be described in EXAMPLES.

EXAMPLES

Hereinafter, the present invention is described further in detail with reference to the examples. The present invention, however, is not limited to these examples. In the following examples, there are cases where only the material name is indicated and the term "layer" is omitted in the description of the layer structure of a layered product.

<Production and Evaluation of Gas Barrier Layered Products and Laminates>

The gas barrier layered products and laminates mentioned below were produced and evaluated. The evaluation was performed using the following methods (1) to (9).

(1) Oxygen Barrier Properties Before Retorting

The oxygen permeability was measured using an oxygen permeability tester ("MOCON OX-TRAN 2/20", manufactured by Modern Controls, Inc.). The oxygen permeability ($cm^3/(m^2 \cdot day \cdot atm)$) was measured under conditions of a temperature of 20° C., an oxygen pressure of 1 atm and a career gas pressure of 1 atm. Nitrogen gas containing 2 vol % of hydrogen gas was used as a carrier gas. At this time, humidity was adjusted to 85% RH, and the humidity on the oxygen supply side was the same as that on the career gas side. In the case of the layered product in which the gas barrier layer was formed on only one surface of the base, the layered product was placed so that the gas barrier layer faced the oxygen supply side while the base faced the carrier gas side.

(2) Oxygen Barrier Properties after 10% Elongation but Before Retorting

First, the layered product was cut out into 30 cm×21 cm. Next, the cut layered product was stretched at 10% in an atmosphere of 23° C. and 50% RH using a manual stretching device, which was kept for 5 minutes in the stretched state. Thereafter, the oxygen permeability was measured in the same manner as above.

(3) Contact Angle

The layered product was subjected to humidity conditioning in an atmosphere of a temperature of 20° C. and a humidity of 65% RH for 24 hours. Thereafter, 2 μL of water was dropped on the gas barrier layer using an automatic contact angle meter (DM500, manufactured by Kyowa Interface Science Co., Ltd.) in an atmosphere of a temperature of 20° C. and a humidity of 65% RH. Then, the contact angle of the gas barrier layer with water was measured using a method according to Japanese Industrial Standards (JIS)-R3257.

(4) Tensile Strength and Elongation, and Young's Modulus

The layered product was subjected to humidity conditioning in an atmosphere of a temperature of 23° C. and a humidity of 50% RH for 24 hours. Thereafter, the layered product was cut out into 15 cm×15 mm in the MD direction and the TD direction. The tensile strength and elongation, and Young's modulus of the thus cut layered product were measured in an atmosphere of a temperature of 23° C., and a humidity of 50% RH using a method according to JIS-K7127.

(5) Dry Heat Shrinkage Ratio

The layered product was cut out into 10 cm×10 cm, the length of which in the MD and TD was measured with a slide caliper. The layered product was allowed to stand in a dryer to be heated at 80° C. for 5 minutes, and then its length in the MD and TD after heating was measured. Thereafter, the dry heat shrinkage ratio (%) was calculated from the following formula:

$$\text{Dry heat shrinkage ratio (\%)} = 100 \times (l_b - l_a)/l_b,$$

where $l_b$ denotes the length before heating, and $l_a$ denotes the length after heating.

(6) Neutralization Degree (Ionization Degree) of Carboxyl Group with Metal Ion

<Calculation of Ionization Degree Using FT-IR>

Polyacrylic acid with a number average molecular weight of 150,000 was dissolved in distilled water, and the carboxyl group was neutralized with a predetermined amount of sodium hydroxide. The resultant aqueous solution of the neutralized product of the polyacrylic acid was applied to a base to the same thickness as the gas barrier layer of the layered product for which the degree of ionization was to be determined, followed by drying. The base used herein was a stretched polyamide film (with a thickness of 15 μm, EMBLEM ON-BC (product name), manufactured by Unitika Ltd., which may hereinafter be abbreviated as "OPA") having a surface coated with a two-component anchor coating agent (TAKELAC 626 (product name) and TAKENATE A50 (product name), manufactured by MITSUI TAKEDA CHEMICALS INC., which may hereinafter be abbreviated as "AC").

Thus, standard samples of the layered product (the layer formed of the neutralized product of polyacrylic acid/AC/OPA) were produced. The neutralization degrees of the carboxyl group of the standard samples were 0, 25, 50, 75, 80, and 90 mol %. With respect to these samples, the infrared absorption spectrum was measured using a Fourier transform infrared spectrophotometer (Spectrum One, manufactured by PerkinElmer, Inc.) in the mode of ATR (attenuated total reflection). Then, the ratio of the maximum absorbance was calculated from the two peaks attributed to the stretching vibration of C=O contained in the layer formed of the neutralized product of polyacrylic acid, i.e. the peak observed in the range of 1600 cm$^{-1}$ to 1850 cm$^{-1}$ and the peak observed in the range of 1500 cm$^{-1}$ to 1600 cm$^{-1}$. Using the calculated ratio and the degree of ionization of each standard sample, a standard curve 1 was plotted.

The peaks of the stretching vibration of C=O in the gas barrier layer were measured using a Fourier transform infrared spectrophotometer (Spectrum One, manufactured by PerkinElmer, Inc.) in the mode of ATR (attenuated total reflection) for the layered product that used a stretched polyamide film (OPA) as a base. The peak attributed to the stretching vibration of C=O of the carboxyl group in the carboxylic acid-containing polymer before ionization was observed in the range of 1600 cm$^{-1}$ to 1850 cm$^{-1}$. Further, the stretching vibration of C=O of the carboxyl group after ionization was observed in the range of 1500 cm$^{-1}$ to 1600 cm$^{-1}$. Then, the ratio therebetween was calculated from the maximum absorbance in the respective ranges. Subsequently, the degree of ionization was determined using the ratio and the above-mentioned standard curve 1.

<Calculation of Ionization Degree Using X-ray Fluorescence>

Standard samples each having a different ionization degree were fabricated for the layered product that used the aforementioned OPA as a base, according to the measurement results of FT-IR. Specifically, 11 types of standard samples each having a different ionization degree (ion: calcium ion) by approximately 10 mol % varying from 0 to 100 mol % were fabricated. For each sample, the X-ray fluorescence intensity of calcium element was measured using a wavelength dispersive X-ray fluorescence spectrometer (ZSX mini II, manufactured by Rigaku Corporation) and a standard curve 2 was plotted from the degree of ionization determined in advance using FT-IR. The degree of ionization with calcium ion was calculated using the thus obtained standard curve 2 for each of the layered products that had been fabricated under various conditions.

Also in the cases where other metals (such as magnesium ion, zinc ion, etc.) were used for ionization, the same method as above was employed for plotting a standard curve 2 to calculate the degree of ionization.

Also for layered products using a base other than OPA (such as PET), the standard curve 2 obtained from the measurement of the X-ray fluorescence intensity was used to calculate the degree of ionization.

(7) Weight of Hydrolyzed Condensate and the Polymer (X)

The total of the weight of the inorganic component derived from the compound (L), the weight of the organic component derived from the compound (L) and the weight of the organic component derived from the polymer (X) was calculated using the above-mentioned method.

(8) Oxygen Barrier Properties after Retorting

Two pieces of laminate (size: 12 cm×12 cm) were fabricated. Then, the two pieces were stacked together so that each unstretched polypropylene film (RXC-18 (product name), with a thickness of 50 μm, manufactured by TOHCELLO CO., LTD., which may hereinafter be abbreviated as "CPP") was present inside, and three sides of the laminate were heat sealed with 5 mm from each edge. 80 g of distilled water was poured between the two pieces of laminate that had been heat sealed and then the remaining fourth side was heat sealed in the same manner. Thus, a pouch containing the distilled water therein was produced.

Next, the pouch was put into a retort sterilizer (Flavor Ace RCS-60, manufactured by HISAKA WORKS, LTD.) to be subjected to retorting at 120° C. and 0.15 MPa, for 30 minutes. After retorting, heating was stopped. The pouch was taken out from the retort sterilizer at the time when the temperature inside the retort sterilizer reached 60° C. Thereafter, the pouch was allowed to stand in a room at 20° C. and 65% RH for 1 hour. Thereafter, the heat sealed portions were cut off by scissors, and the laminate was brought into light contact with a paper towel to remove the water remaining on the surface thereof. Thereafter, the pouch was allowed to stand in a desiccator that had been adjusted to 20° C. and 85% RH for at least one day. The oxygen barrier properties after retorting were evaluated by measuring the oxygen permeability of the laminate that had been subjected to retorting in this way.

The oxygen permeability was measured using the oxygen permeability tester ("MOCON OX-TRAN 2/20", manufactured by Modern Controls, Inc.). Specifically, the layered product was placed therein so that the gas barrier layer faced the oxygen supply side while the CPP faced the carrier gas side. Then, the oxygen permeability (cm$^3$/(m$^2$·day·atm)) was measured in an atmosphere of a temperature of 20° C., a humidity on the oxygen supply side of 85% RH, a humidity on the carrier gas side of 85% RH, an oxygen pressure of 1 atm and a career gas pressure of 1 atm.

(9) Appearance after Retorting

First, a pouch was produced in the same manner as one that had been used for determining the oxygen barrier properties after retorting. This pouch was subjected to retorting at 135° C. and 0.25 MPa, for 60 minutes. After retorting, heating was stopped. The pouch was taken out from the retort sterilizer at the time when the internal temperature reached 60° C. Thereafter, the pouch was allowed to stand in a room at 20° C. and 65% RH for 1 hour. Then, the appearance was observed and determined as "very good (S)" in the case of no haze being observed as before retorting, "good (A)" in the case of slight haze being observed but no problem in practical use, and "poor (B)" in the case of obvious haze being observed as compared to before retorting.

<Layered Product (1)>

Polyacrylic acid (PAA) with a number average molecular weight of 150,000 was dissolved in distilled water, and thereby a PAA aqueous solution with a solid content concentration of 13 wt % was obtained. Subsequently, a 13% ammonia aqueous solution was added to this PAA aqueous solution so that 1 mol % of the carboxyl group in PAA should be neutralized. Thus, an aqueous solution of a partially neutralized product of PAA was obtained.

60 parts by weight of acetic acid and 1800 parts by weight of distilled water were mixed to produce an acetic acid aqueous solution, to which 204 parts by weight of aluminum isopropoxide (AIP) (AIP/acetic acid/distilled water=1/1/100 (molar ratio)) was added under stirring. Thereafter, it was heated at 80° C. for 1 hour. Thus, an AIP aqueous solution (S1) with a concentration of 9.88 wt % was obtained.

Subsequently, a mixed solution (U1) was prepared so that the molar ratio of Al/Si was 1.2/98.8, and the weight ratio of [the inorganic component derived from tetramethoxysilane (TMOS) and AIP]/[the partially neutralized product of PAA] was 40.2/59.8. Specifically, first, 50 parts by weight of TMOS was dissolved in 50 parts by weight of methanol, and 8.5 parts by weight of the above-mentioned 9.88 wt % AIP aqueous solution (S1) was added thereto. Subsequently, 3.3 parts by weight of distilled water and 8.2 parts by weight of 0.1 N hydrochloric acid were added thereto so that the amount of water should be 1.95 molar equivalents with respect to TMOS. Then, the resultant solution was subjected to hydrolysis and condensation reactions at 10° C. for 1 hour. Thus, a mixed solution (T1) was obtained. Subsequently, the mixed solution (T1) was diluted with 425 parts by weight of distilled water and 222 parts by weight of methanol, and thereafter 228 parts by weight of the aqueous solution of the partially neutralized product of PAA (concentration: 13 wt %) was rapidly added thereto under stirring. Thus, the mixed solution (U1) with a solid content concentration of 5 wt % was obtained.

Furthermore, a stretched polyethylene terephthalate film (with a thickness of 12 µm, Lumirror P60 (product name), manufactured by Toray Industries, Inc., which may hereinafter be abbreviated as "PET") was coated with a two-component anchor coating agent (1 part by weight of TAKELAC A-626 (product name) and 2 parts by weight of TAKENATE A-50 (product name), manufactured by MITSUI TAKEDA CHEMICALS INC.) that had been dissolved in 67 parts by weight of ethyl acetate, followed by drying. Thus, a base (AC (0.1 µm)/PET (12 µm)) having an anchor coat layer was produced. This anchor coat layer of the base was coated with the mixed solution (U1) using a bar coater to a thickness of 0.4 µm after drying. This was dried at 120° C. for 5 minutes. Subsequently, the opposite surface of the base was also coated in the same manner. The resultant layered product was aged at 40° C. for 3 days. Next, the layered product was subjected to heat treatment at 180° C. for 5 minutes using a dryer. Then, the layered product was immersed in a 2 wt % calcium acetate aqueous solution (85° C.) for 12 seconds, and thereafter was dried at 110° C. for 1 minute. Thus, a layered product (1) having a structure of gas barrier layer (0.4 µm)/AC (0.1 µm)/PET (12 µm)/AC (0.1 µm)/gas barrier layer (0.4 µm) was obtained.

<Layered Product (2)>

An aqueous solution of the partially neutralized product of PAA and an AIP aqueous solution were prepared in the same manner as in the layered product (1). Subsequently, a mixed solution (U2) was prepared so that the molar ratio of Al/Si was 30.1/69.9, and the weight ratio of [the inorganic component derived from TMOS and AIP]/[the partially neutralized product of PAA] was 25.5/74.5. Specifically, first, 50 parts by weight of TMOS was dissolved in 50 parts by weight of methanol, and 293 parts by weight of a 9.88 wt % AIP aqueous solution (S2) was added thereto. Subsequently, 3.3 parts by weight of distilled water and 8.2 parts by weight of 0.1 N hydrochloric acid were added thereto so that the amount of water should be 1.95 molar equivalents with respect to TMOS. Then, the resultant solution was subjected to hydrolysis and condensation reactions at 10° C. for 1 hour. Thus, a mixed solution (T2) was obtained. Subsequently, the mixed solution (T2) was diluted with 850 parts by weight of distilled water and 405 parts by weight of methanol, and thereafter 607 parts by weight of the aqueous solution of the partially neutralized product of PAA (concentration: 13 wt %) was rapidly added thereto under stirring. Thus, the mixed solution (U2) with a solid content concentration of 5 wt % was obtained.

Using the mixed solution (U2), coating, heat treatment, ionization and drying were carried out in the same manner as in the layered product (1). Thus, a layered product (2) was obtained.

<Layered Product (3)>

An aqueous solution of the partially neutralized product of PAA and an AIP aqueous solution were prepared in the same manner as in the layered product (1). A mixed solution (U3) was prepared, while only the reaction time was changed.

Specifically, first, 50 parts by weight of TMOS was dissolved in 50 parts by weight of methanol, and 8.5 parts by weight of a 9.88 wt % AIP aqueous solution (S3) was added thereto. Subsequently, 3.3 parts by weight of distilled water and 8.2 parts by weight of 0.1 N hydrochloric acid were added thereto so that the amount of water should be 1.95 molar equivalents with respect to TMOS. Then, the resultant solution was subjected to hydrolysis and condensation reactions at 10° C. for 5 hours. Thus, a mixed solution (T3) was obtained. Subsequently, the mixed solution (T3) was diluted with 425 parts by weight of distilled water and 222 parts by weight of methanol, and thereafter 228 parts by weight of the aqueous solution of the partially neutralized product of PAA (concentration: 13 wt %) was rapidly added thereto under stirring. Thus, the mixed solution (U3) with a solid content concentration of 5 wt % was obtained. Using the mixed solution (U3), coating, heat treatment, ionization and drying were carried out in the same manner as in the layered product (1). Thus, a layered product (3) was obtained.

<Layered Product (4)>

A mixed solution (U4) was prepared using titanium tetraisopropoxide (TIP) instead of AIP. Specifically, 1200 parts by weight of acetic acid and 1800 parts by weight of distilled water were mixed to produce an acetic acid aqueous solution, to which 284 parts by weight of TIP (TIP/acetic acid/distilled water=1/20/100 (molar ratio)) was added under stirring. Thereafter, it was heated at 80° C. for 1 hour. Thus, a TIP aqueous solution (S4) with a concentration of 8.6 wt % was obtained. Subsequently, 50 parts by weight of TMOS was dissolved in 50 parts by weight of methanol, and 13.5 parts by weight of the TIP aqueous solution (S4) was added thereto. Subsequently, 3.3 parts by weight of distilled water and 8.2 parts by weight of 0.1 N hydrochloric acid were added thereto so that the amount of water should be 1.95 molar equivalents with respect to TMOS. Then, the resultant solution was subjected to hydrolysis and condensation reactions at 10° C. for 5 hours. Thus, a mixed solution (T4) was obtained. Subsequently, the mixed solution (U4) with a solid content concentration of 5 wt % was obtained with the same composition and in the same manner as in the layered product (1).

Using the mixed solution (U4), coating, heat treatment, ionization and drying were carried out in the same manner as in the layered product (1). Thus, a layered product (4) was obtained.

<Layered Product (5)>

A mixed solution (U5) was prepared using zirconium tetraisopropoxide (ZIP) instead of AIP. Specifically, 1200 parts by weight of acetic acid and 1800 parts by weight of distilled water were mixed to produce an acetic acid aqueous solution, to which 327 parts by weight of ZIP (ZIP/acetic acid/distilled water=1/20/100 (molar ratio)) was added under stirring. Thereafter, it was heated at 80° C. for 1 hour. Thus, a ZIP aqueous solution (S5) with a concentration of 9.8 wt % was obtained. Subsequently, 50 parts by weight of TMOS was dissolved in 50 parts by weight of methanol, and 13.6 parts by weight of the above-mentioned 9.8 wt % ZIP aqueous solution (S5) was added thereto. Subsequently, 3.3 parts by weight of distilled water and 8.2 parts by weight of 0.1 N hydrochloric acid were added thereto so that the amount of water should be 1.95 molar equivalents with respect to TMOS. Then, the resultant solution was subjected to hydrolysis and condensation reactions at 10° C. for 5 hours. Thus, a mixed solution (T5) was obtained. Subsequently, the mixed solution (U5) with a solid content concentration of 5 wt % was obtained with the same composition and in the same manner as in the layered product (1).

Using the mixed solution (U5), coating, heat treatment, ionization and drying were carried out in the same manner as in the layered product (1). Thus, a layered product (5) was obtained.

<Layered Product (6)>

An aqueous solution of the partially neutralized product of PAA and an AIP aqueous solution were prepared in the same manner as in the layered product (1). Then, a mixed solution (U6) was prepared at the same starting material ratio as in the layered product (3) except that the weight ratio of [the inorganic component derived from TMOS and AIP]/[the partially neutralized product of PAA] was adjusted to 30.2/69.8. Specifically, first, a mixed solution (T6) was prepared with the same composition and in the same manner as in the mixed solution (T3) of the layered product (3). Then, the mixed solution (T6) was diluted with 567 parts by weight of distilled water and 283 parts by weight of methanol, and thereafter 354 parts by weight of the aqueous solution of the partially neutralized product of PAA (concentration: 13 wt %) was rapidly added thereto under stirring. Thus, the mixed solution (U6) with a solid content concentration of 5 wt % was obtained.

Using the mixed solution (U6), coating, heat treatment, ionization and drying were carried out in the same manner as in the layered product (1). Thus, a layered product (6) was obtained.

<Layered Product (7)>

An aqueous solution of the partially neutralized product of PAA and an AIP aqueous solution were prepared in the same manner as in the layered product (1). Then, a mixed solution (U7) was prepared at the same starting material ratio as in the layered product (6) except that the molar ratio of Al/Si was adjusted to 1.9/98.1. Specifically, 50 parts by weight of TMOS was dissolved in 50 parts by weight of methanol, and 13.2 parts by weight of a 9.88 wt % AIP aqueous solution (S7) was added thereto. Subsequently, 3.3 parts by weight of distilled water and 8.2 parts by weight of 0.1 N hydrochloric acid were added thereto so that the amount of water should be 1.95 molar equivalents with respect to TMOS. Then, the resultant solution was subjected to hydrolysis and condensation reactions at 10° C. for 5 hours. Thus, a mixed solution (T7) was obtained. Subsequently, the mixed solution (U7) with a solid content concentration of 5 wt % was obtained with the same composition and in the same manner as in the layered product (6).

Using the mixed solution (U7), coating, heat treatment, ionization and drying were carried out in the same manner as in the layered product (1). Thus, a layered product (7) was obtained.

<Layered Product (8)>

An aqueous solution of the partially neutralized product of PAA and an AIP aqueous solution were prepared in the same manner as in the layered product (1). Then, a mixed solution (U8) was prepared at the same starting material ratio as in the layered product (6) except that the molar ratio of Al/Si was adjusted to 2.8/97.2. Specifically, 50 parts by weight of TMOS was dissolved in 50 parts by weight of methanol, and 19.8 parts by weight of a 9.88 wt % AIP aqueous solution (S8) was added thereto. Subsequently, 3.3 parts by weight of distilled water and 8.2 parts by weight of 0.1 N hydrochloric acid were added thereto so that the amount of water should be 1.95 molar equivalents with respect to TMOS. Then, the resultant solution was subjected to hydrolysis and condensation reactions at 10° C. for 5 hours. Thus, a mixed solution (T8) was obtained. Subsequently, the mixed solution (U8) with a solid content concentration of 5 wt % was obtained with the same composition and in the same manner as in the layered product (6).

Using the mixed solution (U8), coating, heat treatment, ionization and drying were carried out in the same manner as in the layered product (1). Thus, a layered product (8) was obtained.

<Layered Product (9)>

An aqueous solution of the partially neutralized product of PAA and an AIP aqueous solution were prepared in the same manner as in the layered product (1). Then, a mixed solution (U9) was prepared at the same starting material ratio as in the layered product (2), that is, the molar ratio of Al/Si was 30/70 and the weight ratio of [the inorganic component derived from TMOS and AIP]/[the partially neutralized product of PAA] was 25.5/74.5. Specifically, first, 50 parts by weight of TMOS was dissolved in 50 parts by weight of methanol, and 293 parts by weight of a 9.88 wt % AIP aqueous solution (S9) was added thereto. Subsequently, 3.3 parts by weight of distilled water and 8.2 parts by weight of 0.1 N hydrochloric acid were added thereto so that the amount of water should be 1.95 molar equivalents with respect to TMOS. Then, the resultant solution was subjected to hydrolysis and condensation reactions at 10° C. for 5 hours. Thus, a mixed solution (T9) was obtained. Subsequently, the resultant mixed solution (T9) was diluted with 850 parts by weight of distilled water and 405 parts by weight of methanol, and thereafter 607 parts by weight of the aqueous solution of the partially neutralized product of PAA (concentration: 13 wt %) was rapidly added thereto under stirring. Thus, the mixed solution (U9) with a solid content concentration of 5 wt % was obtained.

Using the mixed solution (U9), coating, heat treatment, ionization and drying were carried out in the same manner as in the layered product (1). Thus, a layered product (9) was obtained.

<Layered Product (10)>

An aqueous solution of the partially neutralized product of PAA and an AIP aqueous solution were prepared in the same manner as in the layered product (1). Then, a mixed solution (U10) was prepared so that the molar ratio of Al/Si was 0.1/99.9 and the weight ratio of [the inorganic component derived from TMOS and AIP]/[the partially neutralized product of PAA] was 80.0/20.0. Specifically, first, 50 parts by weight of TMOS was dissolved in 50 parts by weight of methanol, and 0.7 part by weight of a 9.88 wt % AIP aqueous solution (S10) was added thereto. Subsequently, 3.3 parts by weight of distilled water and 8.2 parts by weight of 0.1 N hydrochloric acid were added thereto so that the amount of water should be 1.95 molar equivalents with respect to TMOS. Then, the resultant solution was subjected to hydrolysis and condensation reactions at 10° C. for 5 hours. Thus, a mixed solution (T10) was obtained. Subsequently, the mixed solution (T10) was diluted with 212 parts by weight of distilled water and 131 parts by weight of methanol, and thereafter 38 parts by weight of the aqueous solution of the partially neutralized product of PAA (concentration: 13 wt %) was rapidly added thereto under stirring. Thus, the mixed solution (U10) with a solid content concentration of 5 wt % was obtained.

Using the mixed solution (U10), coating, heat treatment, ionization and drying were carried out in the same manner as in the layered product (1). Thus, a layered product (10) was obtained.

<Layered Product (11)>

An aqueous solution of the partially neutralized product of PAA and an AIP aqueous solution were prepared in the same manner as in the layered product (1). Then, a mixed solution (U11) was prepared so that the molar ratio of Al/Si was 29.9/70.1 and the weight ratio of [the inorganic component derived from TMOS and AIP]/[the partially neutralized product of PAA] was 36.9/63.1. Specifically, first, 50 parts by weight of TMOS was dissolved in 50 parts by weight of methanol, and 290 parts by weight of a 9.88 wt % AIP aqueous solution (S11) was added thereto. Subsequently, 3.3 parts by weight of distilled water and 8.2 parts by weight of 0.1 N hydrochloric acid were added thereto so that the amount of water should be 1.95 molar equivalents with respect to TMOS. Then, the resultant solution was subjected to hydrolysis and condensation reactions at 10° C. for 5 hours. Thus, a mixed solution (T11) was obtained. Subsequently, the mixed solution (T11) was diluted with 567 parts by weight of distilled water and 283 parts by weight of methanol, and thereafter 354 parts by weight of the aqueous solution of the partially neutralized product of PAA (concentration: 13 wt %) was rapidly added thereto under stirring. Thus, the mixed solution (U11) with a solid content concentration of 5 wt % was obtained.

Using the mixed solution (U11), coating, heat treatment, ionization and drying were carried out in the same manner as in the layered product (1). Thus, a layered product (11) was obtained.

<Layered Product (12)>

An aqueous solution of the partially neutralized product of PAA and an AIP aqueous solution were prepared in the same manner as in the layered product (1). Then, a mixed solution (U12) was prepared so that the molar ratio of Al/Si was 0.1/99.9 and the weight ratio of [the inorganic component derived from TMOS and AIP]/[the partially neutralized product of PAA] was 70.0/30.0. Specifically, first, 50 parts by weight of TMOS was dissolved in 50 parts by weight of methanol, and 0.7 part by weight of a 9.88 wt % AIP aqueous solution (S12) was added thereto. Subsequently, 3.3 parts by weight of distilled water and 8.2 parts by weight of 0.1 N hydrochloric acid were added thereto so that the amount of water should be 1.95 molar equivalents with respect to TMOS. Then, the resultant solution was subjected to hydrolysis and condensation reactions at 10° C. for 5 hours. Thus, a mixed solution (T12) was obtained. Subsequently, the mixed solution (T12) was diluted with 243 parts by weight of distilled water and 144 parts by weight of methanol, and thereafter 65 parts by weight of the aqueous solution of the partially neutralized product of PAA (concentration: 13 wt %) was rapidly added thereto under stirring. Thus, the mixed solution (U12) with a solid content concentration of 5 wt % was obtained.

Using the mixed solution (U12), coating, heat treatment, ionization and drying were carried out in the same manner as in the layered product (1). Thus, a layered product (12) was obtained.

<Layered Product (13)>

An aqueous solution of the partially neutralized product of PAA and an AIP aqueous solution were prepared in the same manner as in the layered product (1). Then, a mixed solution (U13) was prepared so that the molar ratio of Al/Si was 3.0/97.0 and the weight ratio of [the inorganic component derived from TMOS and AIP]/[the partially neutralized product of PAA] was 20.0/80.0. Specifically, first, 50 parts by weight of TMOS was dissolved in 50 parts by weight of methanol, and 20.8 parts by weight of a 9.88 wt % AIP aqueous solution (S13) was added thereto. Subsequently, 3.3 parts by weight of distilled water and 8.2 parts by weight of 0.1 N hydrochloric acid were added thereto so that the amount of water should be 1.95 molar equivalents with respect to TMOS. Then, the resultant solution was subjected to hydrolysis and condensation reactions at 10° C. for 5 hours. Thus, a mixed solution (T13) was obtained. Subsequently, the mixed solution (T13) was diluted with 868 parts by weight of distilled water and 412 parts by weight of methanol, and thereafter 623 parts by weight of the aqueous solution of the partially neutralized product of PAA (concentration: 13 wt %) was rapidly added thereto under stirring. Thus, the mixed solution (U13) with a solid content concentration of 5 wt % was obtained.

Using the mixed solution (U13), coating, heat treatment, ionization and drying were carried out in the same manner as in the layered product (1). Thus, a layered product (13) was obtained.

<Layered Product (14)>

An aqueous solution of the partially neutralized product of PAA and an AIP aqueous solution were prepared in the same manner as in the layered product (1). Then, a mixed solution (U14) was prepared so that the molar ratio of Al/Si was 3.0/97.0 and the weight ratio of [the inorganic component derived from TMOS and AIP]/[the partially neutralized product of PAA] was 80.0/20.0. Specifically, first, 50 parts by weight of TMOS was dissolved in 50 parts by weight of methanol, and 21.0 parts by weight of a 9.88 wt % AIP aqueous solution (S14) was added thereto. Subsequently, 3.3 parts by weight of distilled water and 8.2 parts by weight of 0.1 N hydrochloric acid were added thereto so that the amount of water should be 1.95 molar equivalents with respect to TMOS. Then, the resultant solution was subjected to hydrolysis and condensation reactions at 10° C. for 5 hours. Thus, a mixed solution (T14) was obtained. Subsequently, the mixed solution (T14) was diluted with 214 parts by weight of distilled water and 132 parts by weight of methanol, and thereafter 39 parts by weight of the aqueous solution of the partially neutralized product of PAA (concentration: 13 wt %) was rapidly added thereto under stirring. Thus, the mixed solution (U14) with a solid content concentration of 5 wt % was obtained.

Using the mixed solution (U14), coating, heat treatment, ionization and drying were carried out in the same manner as in the layered product (1). Thus, a layered product (14) was obtained.

<Layered Product (15)>

An aqueous solution of the partially neutralized product of PAA and an AIP aqueous solution were prepared in the same manner as in the layered product (1). Then, a mixed solution (U15) was prepared so that the molar ratio of Al/Si was 3.0/97.0 and the weight ratio of [the inorganic component derived from TMOS and AIP]/[the partially neutralized product of PAA] was 70.0/30.0. Specifically, first, 50 parts by weight of TMOS was dissolved in 50 parts by weight of methanol, and 21.1 parts by weight of a 9.88 wt % AIP aqueous solution (S15) was added thereto. Subsequently, 3.3 parts by weight of distilled water and 8.2 parts by weight of 0.1 N hydrochloric acid were added thereto so that the amount of water should be 1.95 molar equivalents with respect to TMOS. Then, the resultant solution was subjected to hydrolysis and condensation reactions at 10° C. for 5 hours. Thus, a mixed solution (T15) was obtained. Subsequently, the mixed solution (T15) was diluted with 245 parts by weight of distilled water and 145 parts by weight of methanol, and thereafter 67 parts by weight of the aqueous solution of the partially neutralized product of PAA (concentration: 13 wt %) was rapidly added thereto under stirring. Thus, the mixed solution (U15) with a solid content concentration of 5 wt % was obtained.

Using the mixed solution (U15), coating, heat treatment, ionization and drying were carried out in the same manner as in the layered product (1). Thus, a layered product (15) was obtained.

<Layered Product (16)>

An aqueous solution of the partially neutralized product of PAA and an AIP aqueous solution were prepared in the same manner as in the layered product (1). Then, a mixed solution (U16) was prepared so that the molar ratio of Al/Si was 2.9/97.1, and the weight ratio of [the inorganic component derived from TMOS and AIP]/[the partially neutralized product of PAA] was 10.2/89.8. Specifically, first, 50 parts by weight of TMOS was dissolved in 50 parts by weight of methanol, and 20.3 parts by weight of a 9.88 wt % AIP aqueous solution (S16) was added thereto. Subsequently, 3.3 parts by weight of distilled water and 8.2 parts by weight of 0.1 N hydrochloric acid were added thereto so that the amount of water should be 1.95 molar equivalents with respect to TMOS. Then, the resultant solution was subjected to hydrolysis and condensation reactions at 10° C. for 5 hours. Thus, a mixed solution (T16) was obtained. Subsequently, the mixed solution (T16) was diluted with 1700 parts by weight of distilled water and 769 parts by weight of methanol, and thereafter 1366 parts by weight of the aqueous solution of the partially neutralized product of PAA (concentration: 13 wt %) was rapidly added thereto under stirring. Thus, the mixed solution (U13) with a solid content concentration of 5 wt % was obtained.

Using the mixed solution (U16), coating, heat treatment, ionization and drying were carried out in the same manner as in the layered product (1). Thus, a layered product (16) was obtained.

<Layered Product (17)>

An aqueous solution of the partially neutralized product of PAA and an AIP aqueous solution were prepared in the same manner as in the layered product (1). Then, a mixed solution (U17) was prepared so that the molar ratio of Al/Si was 3.0/97.0 and the weight ratio of [the inorganic component derived from TMOS and AIP]/[the partially neutralized product of PAA] was 90.2/9.8. Specifically, first, 50 parts by weight of TMOS was dissolved in 50 parts by weight of methanol, and 21.3 parts by weight of a 9.88 wt % AIP aqueous solution (S17) was added thereto. Subsequently, 3.3 parts by weight of distilled water and 8.2 parts by weight of 0.1 N hydrochloric acid were added thereto so that the amount of water should be 1.95 molar equivalents with respect to TMOS. Then, the resultant solution was subjected to hydrolysis and condensation reactions at 10° C. for 5 hours. Thus, a mixed solution (T17) was obtained. Subsequently, the mixed solution (T17) was diluted with 189 parts by weight of distilled water and 121 parts by weight of methanol, and thereafter 17 parts by weight of the aqueous solution of the partially neutralized product of PAA (concentration: 13 wt %) was rapidly added thereto under stirring. Thus, the mixed solution (U17) with a solid content concentration of 5 wt % was obtained.

Using the mixed solution (U17), coating, heat treatment, ionization and drying were carried out in the same manner as in the layered product (1). Thus, a layered product (17) was obtained.

<Layered Product (18)>

An aqueous solution of the partially neutralized product of PAA and an AIP aqueous solution were prepared in the same manner as in the layered product (1). Subsequently, a mixed solution (U18) was prepared so that the molar ratio of TMOS/gamma-glycidoxypropyltrimethoxysilane (GPTMOS) was 99.5/0.5, the molar ratio of Al/Si was 2.8/97.2, and the weight ratio of [the inorganic component derived from TMOS, AIP and GPTMOS]/[the organic component of GPTMOS and the partially neutralized product of PAA] was 30.5/69.5. Specifically, first, 49.6 parts by weight of TMOS and 0.4 part by weight of GPTMOS were dissolved in 50 parts by weight of methanol, and 19.6 parts by weight of a 9.88 wt % AIP aqueous solution (S18) that had been prepared in the same manner as in the layered product (1) was added thereto. Then, 3.3 parts by weight of distilled water and 8.2 parts by weight of 0.1 N hydrochloric acid were added thereto so that the amount of water should be 1.95 molar equivalents with respect to the total of TMOS and GPTMOS. Then, the resultant solution was subjected to hydrolysis and condensation reactions at 10° C. for 5 hours. Thus, a mixed solution (T18) was obtained. Subsequently, the mixed solution (T18) was diluted with 566 parts by weight of distilled water and 283 parts by weight of methanol, and thereafter 352 parts by weight of the aqueous solution of the partially neutralized product of PAA (concentration: 13 wt %) was rapidly added thereto under stirring. Thus, the mixed solution (U18) with a solid content concentration of 5 wt % was obtained.

Using the mixed solution (U18), coating, heat treatment, ionization and drying were carried out in the same manner as in the layered product (1). Thus, a layered product (18) was obtained.

<Layered Product (19)>

A mixed solution (U19) was obtained at the same starting material ratio as in the layered product (18) except that the molar ratio of TMOS/GPTMOS was adjusted to 80.0/20.0. Specifically, first, 36.0 parts by weight of TMOS and 14.0 parts by weight of GPTMOS were dissolved in 50 parts by weight of methanol, and 19.8 parts by weight of a 9.88 wt % AIP aqueous solution (S19) was added thereto. Then, 3.0 parts by weight of distilled water and 7.4 parts by weight of 0.1 N hydrochloric acid were added thereto so that the amount of water should be 1.95 molar equivalents with respect to the total of TMOS and GPTMOS. Then, the resultant solution was subjected to hydrolysis and condensation reactions at 10° C. for 5 hours. Thus, a mixed solution (T19) was obtained. Subsequently, the mixed solution (T19) was diluted with 520 parts by weight of distilled water and 302 parts by weight of methanol, and thereafter 267 parts by weight of the aqueous solution of the partially neutralized product of PAA (concentration: 13 wt %) was rapidly added thereto under stirring. Thus, the mixed solution (U19) with a solid content concentration of 5 wt % was obtained.

Using the mixed solution (U19), coating, heat treatment, ionization and drying were carried out in the same manner as in the layered product (1). Thus, a layered product (19) was obtained.

<Layered Product (20)>

An aqueous solution of the partially neutralized product of PAA and an AIP aqueous solution were prepared in the same manner as in the layered product (1). Subsequently, a mixed solution (U20) was prepared so that the molar ratio of TMOS/GPTMOS was 89.9/10.1, the molar ratio of Al/Si was 3.1/96.9, and the weight ratio of [the inorganic component derived from TMOS, AIP and GPTMOS]/[the organic component of GPTMOS and the partially neutralized product of PAA] was 31.5/68.5. Specifically, first, 42.6 parts by weight of TMOS and 7.4 parts by weight of GPTMOS were dissolved in 50 parts by weight of methanol, and 20.6 parts by weight of a 9.88 wt % AIP aqueous solution (S20) was added thereto. Then, 3.2 parts by weight of distilled water and 7.8 parts by weight of 0.1 N hydrochloric acid were added thereto so that the amount of water should be 1.95 molar equivalents with respect to the total of TMOS and GPTMOS. Then, the resultant solution was subjected to hydrolysis and condensation reactions at 10° C. for 5 hours. Thus, a mixed solution (T20) was obtained. Subsequently, the mixed solution (T20) was diluted with 542 parts by weight of distilled water and 302 parts by weight of methanol, and thereafter 293 parts by weight of the aqueous solution of the partially neutralized product of PAA (concentration: 13 wt %) was rapidly added thereto under stirring. Thus, the mixed solution (U20) with a solid content concentration of 5 wt % was obtained.

Using the mixed solution (U20), coating, heat treatment, ionization and drying were carried out in the same manner as in the layered product (1). Thus, a layered product (20) was obtained.

<Layered Product (21)>

A mixed solution (U21) was obtained at the same starting material ratio as in the layered product (18) except that the molar ratio of TMOS/GPTMOS was adjusted to 98.0/2.0. Specifically, first, 48.5 parts by weight of TMOS and 1.5 parts by weight of GPTMOS were dissolved in 50 parts by weight of methanol, and 19.2 parts by weight of a 9.88 wt % AIP aqueous solution (S21) was added thereto. Then, 3.3 parts by weight of distilled water and 8.1 parts by weight of 0.1 N hydrochloric acid were added thereto so that the amount of water should be 1.95 molar equivalents with respect to the total of TMOS and GPTMOS. Then, the resultant solution was subjected to hydrolysis and condensation reactions at 10° C. for 5 hours. Thus, a mixed solution (T21) was obtained. Subsequently, the mixed solution (T21) was diluted with 562 parts by weight of distilled water and 285 parts by weight of methanol, and thereafter 345 parts by weight of the aqueous solution of the partially neutralized product of PAA (concentration: 13 wt %) was rapidly added thereto under stirring. Thus, the mixed solution (U21) with a solid content concentration of 5 wt % was obtained.

Using the mixed solution (U21), coating, heat treatment, ionization and drying were carried out in the same manner as in the layered product (1). Thus, a layered product (21) was obtained.

<Layered Product (22)>

A mixed solution (U22) was obtained at the same starting material ratio as in the layered product (18) except that the molar ratio of TMOS/GPTMOS was adjusted to 99.9/0.1. Specifically, first, 49.9 parts by weight of TMOS and 0.1 part by weight of GPTMOS were dissolved in 50 parts by weight of methanol, and 21.0 parts by weight of a 9.88 wt % AIP aqueous solution (S22) was added thereto. Then, 3.3 parts by weight of distilled water and 8.1 parts by weight of 0.1 N hydrochloric acid were added thereto so that the amount of water should be 1.95 molar equivalents with respect to the total of TMOS and GPTMOS. Then, the resultant solution was subjected to hydrolysis and condensation reactions at 10° C. for 5 hours. Thus, a mixed solution (T22) was obtained. Subsequently, the mixed solution (T22) was diluted with 567 parts by weight of distilled water and 283 parts by weight of methanol, and thereafter 354 parts by weight of the aqueous solution of the partially neutralized product of PAA (concentration: 13 wt %) was rapidly added thereto under stirring. Thus, the mixed solution (U22) with a solid content concentration of 5 wt % was obtained.

Using the mixed solution (U22), coating, heat treatment, ionization and drying were carried out in the same manner as in the layered product (1). Thus, a layered product (22) was obtained.

<Layered Product (23)>

A mixed solution (U23) was obtained at the same starting material ratio as in the layered product (18) except that the molar ratio of TMOS/GPTMOS was adjusted to 70.0/30.0. Specifically, first, 30.0 parts by weight of TMOS and 20.0 parts by weight of GPTMOS were dissolved in 50 parts by weight of methanol, and 17.9 parts by weight of a 9.88 wt % AIP aqueous solution (S23) was added thereto. Then, 2.9 parts by weight of distilled water and 7.0 parts by weight of 0.1 N hydrochloric acid were added thereto so that the amount of water should be 1.95 molar equivalents with respect to the total of TMOS and GPTMOS. Then, the resultant solution was subjected to hydrolysis and condensation reactions at 10° C. for 5 hours. Thus, a mixed solution (T23) was obtained. Subsequently, the mixed solution (T23) was diluted with 500 parts by weight of distilled water and 310 parts by weight of methanol, and thereafter 229 parts by weight of the aqueous solution of the partially neutralized product of PAA (concentration: 13 wt %) was rapidly added thereto under stirring. Thus, the mixed solution (U23) with a solid content concentration of 5 wt % was obtained.

Using the mixed solution (U23), coating, heat treatment, ionization and drying were carried out in the same manner as in the layered product (1). Thus, a layered product (23) was obtained.

<Layered Product (24)>

For producing a layered product (24), a mixed solution (U24) obtained with the same composition and in the same manner as in the mixed solution (U21) of the layered product (21) was used. Coating and heat treatment were carried out in the same manner as in the layered product (1). Thus, a layered product was produced. This layered product was immersed in a 0.1 wt % calcium acetate aqueous solution (85° C.) for 12 seconds to be ionized, and thereafter was dried in the same manner as in the layered product (1). Thus, the layered product (24) was obtained.

<Layered Product (25)>

For producing a layered product (25), a mixed solution (U25) obtained with the same composition and in the same manner as in the mixed solution (U21) of the layered product (21) was used. Coating and heat treatment were carried out in the same manner as in the layered product (1). Thus, a layered product was produced. This layered product was immersed in a 0.2 wt % calcium acetate aqueous solution (85° C.) for 6 seconds to be ionized, and thereafter was dried in the same manner as in the layered product (1). Thus, the layered product (25) was obtained.

<Layered Product (26)>

For producing a layered product (26), a mixed solution (U26) obtained with the same composition and in the same manner as in the mixed solution (U21) of the layered product (21) was used. Coating and heat treatment were carried out in the same manner as in the layered product (1). Thus, a layered product was produced. This layered product was immersed in a 0.2 wt % calcium acetate aqueous solution (85° C.) for 12 seconds to be ionized, and thereafter was dried in the same manner as in the layered product (1). Thus, the layered product (26) was obtained.

<Layered Product (27)>

For producing a layered product (27), a mixed solution (U27) obtained with the same composition and in the same manner as in the mixed solution (U21) of the layered product (21) was used. Coating and heat treatment were carried out in the same manner as in the layered product (1). Thus, a layered product was produced. This layered product was immersed in a 2 wt % magnesium acetate aqueous solution (85° C.) for 12 seconds to be ionized, and thereafter was dried in the same manner as in the layered product (1). Thus, the layered product (27) was obtained.

<Layered Product (28)>

For producing a layered product (28), a mixed solution (U28) obtained with the same composition and in the same manner as in the mixed solution (U21) of the layered product (21) was used. Coating and heat treatment were carried out in the same manner as in the layered product (1). Thus, a layered product was obtained. This layered product was immersed in a 2 wt % zinc acetate aqueous solution (85° C.) for 12 seconds to be ionized, and thereafter was dried in the same manner as in the layered product (1). Thus, the layered product (28) was obtained.

<Layered Product (29)>

An aqueous solution of the partially neutralized product of PAA and an AIP aqueous solution were prepared in the same manner as in the layered product (1). Furthermore, an ethylene diamine (EDA) hydrochloride aqueous solution was obtained by dissolving EDA in 1 N hydrochloric acid so that the molar ratio of EDA/HCl was 1/2. A mixed solution (U29) was prepared at the same starting material ratio as in the layered product (7) except that the EDA hydrochloride aqueous solution was added so that the equivalent ratio of [the amino groups in EDA]/[the carboxyl group in PAA] should be 1.9/100. Specifically, first, a mixed solution (T29) prepared with the same composition and in the same manner as in the mixed solution (T7) of the layered product (7) was diluted with 567 parts by weight of distilled water and 283 parts by weight of methanol, and thereafter 354 parts by weight of the aqueous solution of the partially neutralized product of PAA (concentration: 13 wt %) was rapidly added thereto under stirring. Further, 12.7 parts by weight of the EDA hydrochloride aqueous solution was added, so that the mixed solution (U29) with a solid content concentration of 5 wt % was obtained.

Using the mixed solution (U29), coating, heat treatment, ionization and drying were carried out in the same manner as in the layered product (1). Thus, a layered product (29) was obtained.

<Layered Product (30)>

An aqueous solution of the partially neutralized product of PAA and an AIP aqueous solution were prepared in the same manner as in the layered product (1). Furthermore, polyvinyl alcohol (PVA117, manufactured by KURARAY CO., LTD., which may hereinafter be abbreviated as "PVA") was added to distilled water to a concentration of 10 wt %, which then was heated at 85° C. for 3 hours. Thus, a PVA aqueous solution was obtained.

A mixed solution (U27) was obtained at the same starting material ratio as in the layered product (7) except that the PVA aqueous solution was added so that the equivalent ratio of [hydroxyl groups in PVA]/[carboxyl group in PAA] should be 18.2/100. Specifically, first, a mixed solution (T30) prepared with the same composition and in the same manner as in the mixed solution (T7) of the layered product (7) was diluted with 567 parts by weight of distilled water and 283 parts by weight of methanol, and thereafter 354 parts by weight of the aqueous solution of the partially neutralized product of PAA (concentration: 13 wt %) was rapidly added thereto under stirring. Further, 51 parts by weight of the above-mentioned 10 wt % PVA aqueous solution was added, so that the mixed solution (U30) with a solid content concentration of 5 wt % was obtained.

Using the mixed solution (U30), coating, heat treatment, ionization and drying were carried out in the same manner as in the layered product (1). Thus, a layered product (30) was obtained.

<Layered Product (31)>

A mixed solution (U31) was prepared at the same starting material ratio as in the layered product (21) except that propionic acid was used as an acid in the preparation of an AIP aqueous solution. Specifically, 74 parts by weight of propionic acid and 1800 parts by weight of distilled water were mixed to produce a propionic acid aqueous solution, to which 204 parts by weight of AIP (AIP/propionic acid/distilled water=1/1/100 (molar ratio)) was added under stirring. Thereafter, it was heated at 80° C. for 1 hour. Thus, an AIP aqueous solution (S31) with a concentration of 9.82 wt % was obtained. A mixed solution (U31) was obtained with the same composition and in the same manner as in the mixed solution (U21) of the layered product (18) except that this AIP aqueous solution (S31) was used.

Using the mixed solution (U31), coating, heat treatment, ionization and drying were carried out in the same manner as in the layered product (1). Thus, a layered product (31) was obtained.

<Layered Product (32)>

A mixed solution (U32) was prepared at the same starting material ratio as in the layered product (21) except that hexanoic acid was used as an acid in the preparation of an AIP aqueous solution. Specifically, 116 parts by weight of hexanoic acid and 1800 parts by weight of distilled water were mixed to produce a hexanoic acid aqueous solution, to which 204 parts by weight of AIP (AIP/hexanoic acid/distilled water=1/1/100 (molar ratio)) was added under stirring. Thereafter, it was heated at 80° C. for 1 hour. Thus, an AIP aqueous solution (S32) with a concentration of 9.62 wt % was obtained. A mixed solution (U32) was obtained with the same composition and in the same manner as in the mixed solution (U21) of the layered product (21) except that this AIP aqueous solution (S32) was used.

Using the mixed solution (U32), coating, heat treatment, ionization and drying were carried out in the same manner as in the layered product (1). Thus, a layered product (32) was obtained.

<Layered Product (33)>

For producing a layered product (33), a mixed solution (U33) obtained with the same composition and in the same manner as in the mixed solution (U21) of the layered product (21) was used. Coating, heat treatment, ionization and drying were carried out in the same manner as the layered product (1) except that the gas barrier layer was formed only on one surface of the base. Thus, the layered product (33) was obtained.

<Layered Product (34)>

For producing a layered product (34), a mixed solution (U34) obtained with the same composition and in the same manner as in the mixed solution (U8) of the layered product (8) was used. Coating, heat treatment, ionization and drying were carried out in the same manner as in the layered product (1) except that a stretched polyamide film (OPA) was used as the base. Thus, the layered product (34) was obtained.

<Layered Product (35)>

For a layered product (35), a mixed solution (U35) obtained with the same composition and in the same manner as in the mixed solution (U21) of the layered product (21) was used. Coating, heat treatment, ionization and drying were carried out in the same manner as in the layered product (34). Thus, the layered product (35) was obtained.

<Layered Product (36)>

For a layered product (36), a mixed solution (U36) obtained with the same composition and in the same manner as in the mixed solution (U8) of the layered product (8) was used. Coating, heat treatment, ionization and drying were carried out in the same manner as in the layered product (34). Thus, a layered product (36) was obtained.

<Layered Product (37)>

A layered product (37) was produced under the same conditions as in the layered product (35) except that the base was changed. For producing the layered product (37), a stretched polyamide film (with a thickness of 25 μm, EMBLEM ON (product name), manufactured by Unitika Ltd., which may hereinafter be abbreviated as "$OPA_{25}$") was used as the base.

<Layered Product (38)>

For a layered product (38), a mixed solution (U38) obtained with the same composition and in the same manner as in the mixed solution (U21) of the layered product (21) was used. Coating, heat treatment, ionization and drying were carried out in the same manner as in the layered product (34) except that the gas barrier layer was formed only on one surface of the base. Thus, a layered product (38) was obtained.

<Layered Product (39)>

For producing a layered product (39), a mixed solution (T39) was prepared so that the molar ratio of TMOS/GPTMOS was 89.9/10.1, and the weight ratio of [the inorganic component derived from TMOS and GPTMOS]/[the organic component of GPTMOS and the partially neutralized product of PAA] was 31.5/68.5. Specifically, first, 46 parts by weight of TMOS and 8 parts by weight of GPTMOS were dissolved in 50 parts by weight of methanol. Then, 3.2 parts by weight of distilled water and 7.8 parts by weight of 0.1 N hydrochloric acid were added thereto so that the amount of water should be 1.95 molar equivalents with respect to the total of TMOS and GPTMOS and the pH was 2 or less. Then, the resultant solution was subjected to hydrolysis and condensation reactions at 10° C. for 5 hours. Thus, a mixed solution (T39) was obtained.

Subsequently, an aqueous solution of the partially neutralized product of PAA was prepared in the same manner as in the layered product (1). Then, the mixed solution (T36) was diluted with 61 parts by weight of distilled water, and thereafter 308 parts by weight of the aqueous solution of the partially neutralized product of PAA (concentration: 13 wt %) was rapidly added thereto under stirring. Thus, the mixed solution (U39) with a solid content concentration of 13 wt % was obtained.

Furthermore, a stretched polyethylene terephthalate film (the above-mentioned "PET") was coated with a two-component anchor coating agent (1 part by weight of TAKELAC A-626 (product name) and 2 parts by weight of TAKENATE A-50 (product name), manufactured by MITSUI TAKEDA CHEMICALS INC.) that had been dissolved in 67 parts by weight of ethyl acetate, followed by drying. Thus, a base (AC (0.1 μm)/PET (12 μm)) having an anchor coat layer was produced. This anchor coat layer of the base was coated with the mixed solution (U39) using a bar coater to a thickness of 1.0 μm after drying. This was dried at 120° C. for 5 minutes. Both surfaces of the base were coated in the same manner, so that a layered product was obtained. This layered product was aged at 40° C. for 3 days. Subsequently, the layered product was subjected to heat treatment at 180° C. for 5 minutes using a dryer. Then, the layered product was immersed in a 2 wt % calcium acetate aqueous solution (85° C.) for 12 seconds, and thereafter was dried at 50° C. for 5 minutes. Thus, the layered product (39) having a structure of gas barrier layer (1.0 μm)/AC (0.1 μm)/PET (12 μm)/AC (0.1 μm)/gas barrier layer (1.0 μm) was obtained.

<Layered Product (40)>

For producing a layered product (40), a mixed solution (U40) obtained with the same composition and in the same manner as in the mixed solution (U39) of the layered product (39) was used. Coating, heat treatment, ionization and drying were carried out in the same manner as in the layered product (1) except that OPA was used as the base. Thus, the layered product (40) was obtained.

<Layered Product (41)>

A mixed solution (U41) was obtained in the same manner as in the layered product (39) except that the solid content concentration was adjusted to 5 wt %. First, a mixed solution (T41) prepared with the same composition and in the same manner as in the mixed solution (T39) of the layered product (39) was diluted with 542 parts by weight of distilled water and 293 parts by weight of methanol, and thereafter 308 parts by weight of the aqueous solution of the partially neutralized product of PAA (concentration: 13 wt %) was rapidly added thereto under stirring. Thus, the mixed solution (U41) with a solid content concentration of 5 wt % was obtained.

Using the mixed solution (U41), coating, heat treatment, ionization and drying were carried out in the same manner as in the layered product (1). Thus, a layered product (41) was obtained.

<Layered Product (42)>

For producing a layered product (42), a mixed solution (U42) obtained with the same composition and in the same manner as in the mixed solution (U41) of the layered product (41) was used. Coating, heat treatment, ionization and drying were carried out in the same manner as in the layered product (34). Thus, the layered product (42) was obtained.

<Layered Product (43)>

An aqueous solution of the partially neutralized product of PAA and an AIP aqueous solution were prepared in the same manner as in the layered product (1). Then, a mixed solution (U43) was prepared without the addition of TMOS and GPTMOS so that the weight ratio of [the inorganic component derived from AIP]/[the partially neutralized product of PAA] was 1.0/99.0. Specifically, 100 parts by weight of the aqueous solution of the partially neutralized product of PAA (concentration: 5 wt %) was rapidly added to 2.1 parts by weight of a 9.88 wt % AIP aqueous solution (S43). Thus, the mixed solution (U43) was obtained.

Using the mixed solution (U43), coating, heat treatment, ionization and drying were carried out in the same manner as in the layered product (1). Thus, a layered product (43) was obtained.

<Layered Product (44)>

An aqueous solution of the partially neutralized product of PAA was prepared in the same manner as in the layered product (1). A mixed solution (U44) was prepared so that the weight ratio of [the inorganic component derived from titanium lactate]/[the partially neutralized product of PAA] was 0.9/99.1. Specifically, 1.6 parts by weight of an isopropyl alcohol solution of titanium lactate (concentration: 10 wt %) was added to 100 parts by weight of the aqueous solution of the partially neutralized product of PAA (concentration: 5 wt %). Thus, the mixed solution (U44) was obtained.

Using the mixed solution (U44), coating, heat treatment, ionization and drying were carried out in the same manner as in the layered product (1). Thus, a layered product (44) was obtained.

<Layered Product (45)>

A mixed solution (U45) was prepared at the same starting material ratio as in the layered product (3) except that the molar ratio of Al/Si was 40.4/59.6 and the weight ratio of [the inorganic component derived from TMOS and AIP]/[the partially neutralized product of PAA] was adjusted to 40.3/59.7. Specifically, first, 50 parts by weight of TMOS was dissolved in 50 parts by weight of methanol, and 461 parts by weight of a 9.88 wt % AIP aqueous solution (S45) was added thereto.

Subsequently, 3.3 parts by weight of distilled water and 8.2 parts by weight of 0.1 N hydrochloric acid were added thereto so that the amount of water should be 1.95 molar equivalents with respect to TMOS. Then, the resultant solution was subjected to hydrolysis and condensation reactions at 10° C. for 5 hours. Thus, a mixed solution (T45) was obtained. Subsequently, the mixed solution (T45) was diluted with 567 parts by weight of distilled water and 283 parts by weight of methanol, and thereafter 354 parts by weight of the aqueous solution of the partially neutralized product of PAA (concentration: 13 wt %) was rapidly added thereto under stirring. Thus, the mixed solution (U45) with a solid content concentration of 5 wt % was obtained.

Using the mixed solution (U45), coating, heat treatment, ionization and drying were carried out in the same manner as in the layered product (1). Thus, a layered product (45) was obtained.

<Layered Product (46)>

A mixed solution (U46) was prepared at the same starting material ratio as in the layered product (3) except that the molar ratio of Al/Si was adjusted to 0.06/99.94, and the weight ratio of [the inorganic component derived from TMOS and AIP]/[the partially neutralized product of PAA] was adjusted to 70.0/30.0. Specifically, first, 50 parts by weight of TMOS was dissolved in 50 parts by weight of methanol, and 0.4 part by weight of a 9.88 wt % AIP aqueous solution (S46) was added thereto. Subsequently, 3.3 parts by weight of distilled water and 8.2 parts by weight of 0.1 N hydrochloric acid were added thereto so that the amount of water should be 1.95 molar equivalents with respect to TMOS. Then, the resultant solution was subjected to hydrolysis and condensation reactions at 10° C. for 5 hours. Thus, a mixed solution (T46) was obtained. Subsequently, the mixed solution (T46) was diluted with 243 parts by weight of distilled water and 144 parts by weight of methanol, and thereafter 65 parts by weight of the aqueous solution of the partially neutralized product of PAA (concentration: 13 wt %) was rapidly added thereto under stirring. Thus, the mixed solution (U46) with a solid content concentration of 5 wt % was obtained.

Using the mixed solution (U46), coating, heat treatment, ionization and drying were carried out in the same manner as in the layered product (1). Thus, a layered product (46) was obtained.

<Layered Product (47)>

A mixed solution (U47) was prepared at the same starting material ratio as in the layered product (46), while only the reaction time was changed.

Specifically, first, 50 parts by weight of TMOS was dissolved in 50 parts by weight of methanol, and 0.4 part by weight of a 9.88 wt % AIP aqueous solution (S47) was added thereto. Subsequently, 3.3 parts by weight of distilled water and 8.2 parts by weight of 0.1 N hydrochloric acid were added thereto so that the amount of water should be 1.95 molar equivalents with respect to TMOS. Then, the resultant solution was subjected to hydrolysis and condensation reactions at 10° C. for 1 hour. Thus, a mixed solution (T47) was obtained. Subsequently, the mixed solution (T47) was diluted with 243 parts by weight of distilled water and 144 parts by weight of methanol, and thereafter 65 parts by weight of the aqueous solution of the partially neutralized product of PAA (concentration: 13 wt %) was rapidly added thereto under stirring. Thus, the mixed solution (U47) with a solid content concentration of 5 wt % was obtained.

Using the mixed solution (U47), coating, heat treatment, ionization and drying were carried out in the same manner as in the layered product (1). Thus, a layered product (47) was obtained.

<Layered Product (48)>

For producing a layered product (48), a mixed solution (U48) obtained with the same composition and in the same manner as in the mixed solution (U21) of the layered product (21) was used. Coating and heat treatment were carried out in the same manner as in the layered product (1). Thus, the layered product (48) was produced.

<Evaluation Results of Layered Products>

Thus produced layered products were evaluated using the above-mentioned methods. It should be noted that the evaluation of the layered product (37) was not performed. Further, the stretched polyethylene terephthalate film (PET) and the stretched polyamide film (OPA) used as the bases of the layered products also were evaluated in the same manner as the layered products. Table 1 shows the production conditions of the layered products.

| Layered Product No. | Base | Coated surface | Thickness of coating layer (*1) | Inorganic component/ Organic component [weight ratio] (*2) | Metal atom of compound (A) | Compound expressed by Formula (II)/ Compound expressed by Formula (III) [molar ratio] (*3) | Compound (A)/ Compound (B) [molar ratio] (*4) | Compound (D) | Polyvalent metal ion Ion type | Neutralization degree [%] |
|---|---|---|---|---|---|---|---|---|---|---|
| (1) | PET | Both sides | 0.4 μm | 40.2/59.8 | Al | 100/0 | 1.2/98.8 | Acetic acid | Ca | 91 |
| (2) | PET | Both sides | 0.4 μm | 25.5/74.5 | Al | 100/0 | 30.1/69.9 | Acetic acid | Ca | 90 |
| (3) | PET | Both sides | 0.4 μm | 40.2/59.8 | Al | 100/0 | 1.2/98.8 | Acetic acid | Ca | 91 |
| (4) | PET | Both sides | 0.4 μm | 40.4/59.6 | Ti | 100/0 | 1.2/98.8 | Acetic acid | Ca | 90 |
| (5) | PET | Both sides | 0.4 μm | 40.6/59.4 | Zr | 100/0 | 1.2/98.8 | Acetic acid | Ca | 92 |
| (6) | PET | Both sides | 0.4 μm | 30.2/69.8 | Al | 100/0 | 1.2/98.8 | Acetic acid | Ca | 91 |
| (7) | PET | Both sides | 0.4 μm | 30.4/69.6 | Al | 100/0 | 1.9/98.1 | Acetic acid | Ca | 90 |
| (8) | PET | Both sides | 0.4 μm | 30.5/69.5 | Al | 100/0 | 2.8/97.2 | Acetic acid | Ca | 91 |
| (9) | PET | Both sides | 0.4 μm | 25.5/74.5 | Al | 100/0 | 30.1/69.9 | Acetic acid | Ca | 92 |
| (10) | PET | Both sides | 0.4 μm | 80.0/20.0 | Al | 100/0 | 0.1/99.9 | Acetic acid | Ca | 90 |
| (11) | PET | Both sides | 0.4 μm | 36.9/63.1 | Al | 100/0 | 29.9/70.1 | Acetic acid | Ca | 91 |
| (12) | PET | Both sides | 0.4 μm | 70.0/30.0 | Al | 100/0 | 0.1/99.9 | Acetic acid | Ca | 91 |
| (13) | PET | Both sides | 0.4 μm | 20.0/80.0 | Al | 100/0 | 3.0/97.0 | Acetic acid | Ca | 92 |
| (14) | PET | Both sides | 0.4 μm | 80.0/20.0 | Al | 100/0 | 3.0/97.0 | Acetic acid | Ca | 92 |
| (15) | PET | Both sides | 0.4 μm | 70.0/30.0 | Al | 100/0 | 3.0/97.0 | Acetic acid | Ca | 91 |
| (16) | PET | Both sides | 0.4 μm | 10.2/89.8 | Al | 100/0 | 2.9/97.1 | Acetic acid | Ca | 90 |
| (17) | PET | Both sides | 0.4 μm | 90.2/9.8 | Al | 100/0 | 3.0/97.0 | Acetic acid | Ca | 91 |
| (18) | PET | Both sides | 0.4 μm | 30.5/69.5 | Al | 99.5/0.5 | 2.8/97.2 | Acetic acid | Ca | 90 |

-continued

| Layered Product No. | Base | Coated surface | Thickness of coating layer (*1) | Inorganic component/ Organic component [weight ratio] (*2) | Metal atom of compound (A) | Compund expressed by Formula (II)/ Compund expressed by Formula (III) [molar ratio] (*3) | Compund (A)/ Compund (B) [molar ratio] (*4) | Compund (D) | Polyvalent metal ion Ion type | Neutralization degree [%] |
|---|---|---|---|---|---|---|---|---|---|---|
| (19) | PET | Both sides | 0.4 μm | 30.5/69.5 | Al | 80.0/20.0 | 3.1/96.9 | Acetic acid | Ca | 92 |
| (20) | PET | Both sides | 0.4 μm | 31.5/68.5 | Al | 89.9/10.1 | 3.1/96.9 | Acetic acid | Ca | 92 |
| (21) | PET | Both sides | 0.4 μm | 30.5/69.5 | Al | 98.0/2.0 | 2.8/97.2 | Acetic acid | Ca | 91 |
| (22) | PET | Both sides | 0.4 μm | 30.5/69.5 | Al | 99.9/0.1 | 3.0/97.0 | Acetic acid | Ca | 90 |
| (23) | PET | Both sides | 0.4 μm | 30.5/69.5 | Al | 70.0/30.0 | 3.0/97.0 | Acetic acid | Ca | 91 |
| (24) | PET | Both sides | 0.4 μm | 30.5/69.5 | Al | 98.0/2.0 | 2.8/97.2 | Acetic acid | Ca | 51 |
| (25) | PET | Both sides | 0.4 μm | 30.5/69.5 | Al | 98.0/2.0 | 2.8/97.2 | Acetic acid | Ca | 60 |
| (26) | PET | Both sides | 0.4 μm | 30.5/69.5 | Al | 98.0/2.0 | 2.8/97.2 | Acetic acid | Ca | 82 |
| (27) | PET | Both sides | 0.4 μm | 30.5/69.5 | Al | 98.0/2.0 | 2.8/97.2 | Acetic acid | Mg | 90 |
| (28) | PET | Both sides | 0.4 μm | 30.5/69.5 | Al | 98.0/2.0 | 2.8/97.2 | Acetic acid | Zn | 90 |
| (29) (*5) | PET | Both sides | 0.4 μm | 30.4/69.6 | Al | 100/0 | 1.9/98.1 | Acetic acid | Ca | 91 |
| (30) (*6) | PET | Both sides | 0.4 μm | 30.4/69.6 | Al | 100/0 | 1.9/98.1 | Acetic acid | Ca | 90 |
| (31) | PET | Both sides | 0.4 μm | 30.5/69.5 | Al | 98.0/2.0 | 2.8/97.2 | Propionic acid | Ca | 92 |
| (32) | PET | Both sides | 0.4 μm | 30.5/69.5 | Al | 98.0/2.0 | 2.8/97.2 | Hexanoic acid | Ca | 90 |
| (33) | PET | One side | 0.4 μm | 30.5/69.5 | Al | 98.0/2.0 | 2.8/97.2 | Acetic acid | Ca | 92 |
| (34) | OPA | Both sides | 0.4 μm | 30.5/69.5 | Al | 100/0 | 2.8/97.2 | Acetic acid | Ca | 91 |
| (35) | OPA | Both sides | 0.4 μm | 30.5/69.5 | Al | 98.0/2.0 | 2.8/97.2 | Acetic acid | Ca | 92 |
| (36) | OPA | Both sides | 0.4 μm | 30.5/69.5 | Al | 100/0 | 2.8/97.2 | Acetic acid | Ca | 91 |
| (37) | OPA$_{25}$ | Both sides | 0.4 μm | 30.5/69.5 | Al | 98.0/2.0 | 2.8/97.2 | Acetic acid | Ca | 90 |
| (38) | OPA | One side | 0.4 μm | 30.5/69.5 | Al | 98.0/2.0 | 2.8/97.2 | Acetic acid | Ca | 91 |
| (39) | PET | Both sides | 1.0 μm | 31.5/68.5 | — | 89.9/10.1 | 0/100 | — | Ca | 60 |
| (40) | OPA | Both sides | 1.0 μm | 31.5/68.5 | — | 89.9/10.1 | 0/100 | — | Ca | 60 |
| (41) | PET | Both sides | 0.4 μm | 31.5/68.5 | — | 89.9/10.1 | 0/100 | — | Ca | 60 |
| (42) | OPA | Both sides | 0.4 μm | 31.5/68.5 | — | 89.9/10.1 | 0/100 | — | Ca | 60 |
| (43) | PET | Both sides | 0.4 μm | 1.0/99.0 | Al | — | 100/0 | Acetic acid | Ca | 90 |
| (44) | PET | Both sides | 0.4 μm | 0.9/99.1 | Ti | — | 100/0 | — | Ca | 90 |
| (45) | PET | Both sides | 0.4 μm | 40.3/59.7 | Al | 100/0 | 40.4/59.6 | Acetic acid | Ca | 92 |
| (46) | PET | Both sides | 0.4 μm | 70.0/30.0 | Al | 100/0 | 0.06/99.94 | Acetic acid | Ca | 90 |
| (47) | PET | Both sides | 0.4 μm | 70.0/30.0 | Al | 100/0 | 0.06/99.94 | Acetic acid | Ca | 90 |
| (48) | PET | Both sides | 0.4 μm | 30.5/69.5 | Al | 98.0/2.0 | 2.8/97.2 | Acetic acid | — | 0 |

(*1) The thickness of the gas barrier layer on one side
(*2) The inorganic component is the inorganic component derived from the compound (L). The organic component is the total of the organic component derived from the compound (L) and the organic component derived from the polymer (X), and it includes the organic component of GPTMOS.
(*3) Compound expressed by Formula (II): TMOS; and Compound expressed by Formula (III): GPTMOS
(*4) The molar ratio of: [the metal atom derived from the compound (A)]/[Si atom derived from the compound (B)]
(*5) Ethylenediamine is contained.
(*6) Polyvinyl alcohol is contained.

Table 2 shows the evaluation results of the layered products and bases.

TABLE 2

| Layered product No. | Oxygen permeability [cm$^3$/(m$^2$·day·atm)] Before retorting | After 10% elongation | Contact angle [°] | Tensile strength [MPa] MD | TD | Tensile elongation [%] MD | TD | Young's modulus [MPa] MD | TD | Dry heat shrinkage ratio [%] MD | TD |
|---|---|---|---|---|---|---|---|---|---|---|---|
| (1) | 0.22 | — | 17 | 210 | 170 | 120 | 180 | 5500 | 5200 | 0.3 | 0.4 |
| (2) | 0.63 | — | 18 | 210 | 160 | 110 | 170 | 5600 | 5100 | 0.4 | 0.3 |
| (3) | 0.21 | — | 22 | 210 | 170 | 120 | 180 | 5500 | 5200 | 0.3 | 0.4 |
| (4) | 0.33 | — | 21 | 210 | 180 | 130 | 180 | 5600 | 5300 | 0.3 | 0.4 |
| (5) | 0.29 | — | 22 | 220 | 170 | 120 | 180 | 5600 | 5200 | 0.4 | 0.4 |
| (6) | 0.24 | — | 21 | 210 | 170 | 120 | 180 | 5400 | 5200 | 0.4 | 0.4 |
| (7) | 0.12 | 0.28 | 21 | 210 | 180 | 120 | 190 | 5500 | 5300 | 0.3 | 0.3 |
| (8) | 0.05 | — | 22 | 220 | 170 | 130 | 180 | 5500 | 5300 | 0.4 | 0.4 |
| (9) | 0.63 | — | 21 | 210 | 170 | 110 | 170 | 5600 | 5100 | 0.4 | 0.3 |
| (10) | 0.58 | — | 22 | 200 | 170 | 120 | 180 | 5500 | 5200 | 0.3 | 0.4 |
| (11) | 0.42 | — | 22 | 210 | 170 | 120 | 180 | 5500 | 5300 | 0.4 | 0.4 |
| (12) | 0.43 | — | 21 | 210 | 160 | 120 | 180 | 5400 | 5300 | 0.3 | 0.4 |
| (13) | 0.64 | — | 22 | 210 | 170 | 110 | 190 | 5500 | 5200 | 0.3 | 0.4 |
| (14) | 0.59 | — | 22 | 210 | 170 | 110 | 180 | 5500 | 5300 | 0.4 | 0.4 |

TABLE 2-continued

| Layered product No. | Oxygen permeability [cm³/(m²·day·atm)] Before retorting | Oxygen permeability [cm³/(m²·day·atm)] After 10% elongation | Contact angle [°] | Tensile strength [MPa] MD | Tensile strength [MPa] TD | Tensile elongation [%] MD | Tensile elongation [%] TD | Young's modulus [MPa] MD | Young's modulus [MPa] TD | Dry heat shrinkage ratio [%] MD | Dry heat shrinkage ratio [%] TD |
|---|---|---|---|---|---|---|---|---|---|---|---|
| (15) | 0.32 | — | 21 | 210 | 160 | 120 | 180 | 5400 | 5300 | 0.3 | 0.4 |
| (16) | 0.78 | — | 21 | 220 | 170 | 120 | 190 | 5500 | 5200 | 0.4 | 0.4 |
| (17) | 0.82 | — | 22 | 210 | 170 | 130 | 190 | 5400 | 5100 | 0.4 | 0.4 |
| (18) | 0.05 | — | 23 | 210 | 180 | 120 | 180 | 5600 | 5200 | 0.4 | 0.4 |
| (19) | 0.05 | 0.11 | 51 | 220 | 170 | 110 | 190 | 5500 | 5300 | 0.3 | 0.4 |
| (20) | 0.05 | 0.20 | 46 | 210 | 160 | 120 | 180 | 5500 | 5100 | 0.4 | 0.4 |
| (21) | 0.05 | 0.28 | 26 | 210 | 170 | 120 | 170 | 5600 | 5200 | 0.3 | 0.4 |
| (22) | 0.05 | — | 21 | 220 | 170 | 130 | 190 | 5500 | 5200 | 0.4 | 0.3 |
| (23) | 0.83 | 0.84 | 55 | 210 | 170 | 120 | 180 | 5400 | 5300 | 0.4 | 0.4 |
| (24) | 0.62 | — | 24 | 200 | 170 | 120 | 170 | 5500 | 5100 | 0.3 | 0.4 |
| (25) | 0.42 | — | 25 | 220 | 170 | 130 | 190 | 5400 | 5200 | 0.4 | 0.4 |
| (26) | 0.05 | — | 26 | 210 | 170 | 120 | 170 | 5500 | 5200 | 0.3 | 0.4 |
| (27) | 0.05 | — | 25 | 200 | 170 | 110 | 180 | 5600 | 5300 | 0.3 | 0.4 |
| (28) | 0.05 | — | 25 | 210 | 170 | 120 | 190 | 5400 | 5100 | 0.4 | 0.3 |
| (29) | 0.05 | — | 21 | 220 | 170 | 120 | 180 | 5500 | 5200 | 0.4 | 0.4 |
| (30) | 0.05 | 0.05 | 22 | 200 | 170 | 130 | 190 | 5600 | 5300 | 0.4 | 0.4 |
| (31) | 0.11 | — | 26 | 210 | 170 | 110 | 180 | 5500 | 5300 | 0.4 | 0.3 |
| (32) | 0.62 | — | 25 | 200 | 170 | 120 | 180 | 5500 | 5200 | 0.4 | 0.4 |
| (33) | 0.13 | 0.45 | 25 | 230 | 190 | 140 | 200 | 5200 | 5000 | 0.2 | 0.2 |
| (34) | 0.09 | 0.47 | 21 | 230 | 220 | 120 | 130 | 2800 | 2400 | 0.4 | 0.6 |
| (35) | 0.11 | 0.44 | 25 | 230 | 220 | 110 | 120 | 2900 | 2500 | 0.4 | 0.6 |
| (36) | 0.14 | — | 22 | 240 | 230 | 120 | 130 | 2800 | 2600 | 0.5 | 0.6 |
| (38) | 0.23 | — | 25 | 260 | 240 | 140 | 150 | 2600 | 2300 | 0.3 | 0.3 |
| (39) | 0.41 | 0.85 | 45 | 180 | 150 | 100 | 170 | 6200 | 5600 | 1.0 | 1.5 |
| (40) | 0.62 | 1.03 | 45 | 200 | 210 | 100 | 80 | 3300 | 3000 | 1.5 | 2.1 |
| (41) | 5.03 | — | 45 | 210 | 170 | 120 | 180 | 5500 | 5200 | 0.4 | 0.4 |
| (42) | 6.14 | — | 45 | 260 | 240 | 140 | 150 | 2600 | 2300 | 0.5 | 0.6 |
| (43) | 1.84 | 4.72 | 15 | 210 | 160 | 110 | 170 | 5600 | 5100 | 0.4 | 0.3 |
| (44) | 2.02 | 5.04 | 14 | 210 | 160 | 110 | 170 | 5600 | 5100 | 0.4 | 0.4 |
| (45) | 1.57 | — | 22 | 210 | 160 | 110 | 170 | 5600 | 5100 | 0.4 | 0.3 |
| (46) | 0.58 | — | 21 | 200 | 170 | 120 | 180 | 5500 | 5200 | 0.3 | 0.4 |
| (47) | 0.58 | — | 16 | 200 | 170 | 120 | 180 | 5500 | 5200 | 0.3 | 0.4 |
| (48) | 40< | — | 45 | 210 | 170 | 130 | 180 | 5400 | 5100 | 0.4 | 0.4 |
| PET | — | — | — | 250 | 230 | 110 | 130 | 4800 | 4700 | 0.2 | 0.2 |
| OPA | — | — | — | 220 | 260 | 90 | 100 | 2400 | 2200 | 0.3 | 0.3 |

The layered product (39) had a total thickness of gas barrier layers of 2.0 μm. Such a layered product that has a large total thickness (for example, more than 1.0 μm) of the gas barrier layer(s) has physical properties that are significantly different from the physical properties of the base (PET), resulting in a decrease in workability. Therefore, an increase in thickness of the gas barrier layer(s) causes the productivity to be reduced, which is a problem. On the other hand, as were the layered products (1) to (33), the layered product having a small total thickness of the gas barrier layer(s) exhibits physical properties that are close to those of the base (PET), and thus has good workability. Therefore, it is important that the total thickness of the gas barrier layer(s) be small (for example, 1.0 μm or less) in order to achieve good productivity in the production of formed products.

<Production Of Laminates>

A laminate was produced using the layered product (1). First, a stretched polyamide film (OPA) and an unstretched polypropylene film (CPP) each are coated with a two-component adhesive agent (A-385 (product name) and A-50 (product name), manufactured by MITSUI TAKEDA CHEMICALS INC.), followed by drying. Then, these were laminated with the layered product (1). Thus, a laminate (1) having a structure of layered product (1)/adhesive agent/OPA/adhesive agent/CPP was obtained. Further, using each of other layered products, a laminate was produced in the same manner as the laminate (1) to be evaluated. Table 3 shows the layered products used for producing the laminates and the evaluation results of the laminates.

TABLE 3

| Laminate No. | Lamination structure | Oxygen permeability after retorting [cm³/(m²·day·atm)] | Appearance after retorting at 135° C. for 60 minutes |
|---|---|---|---|
| Laminate (1) | Layered product (1)/OPA/CPP | 0.62 | S |
| Laminate (2) | Layered product (2)/OPA/CPP | 0.82 | S |
| Laminate (3) | Layered product (3)/OPA/CPP | 0.62 | S |
| Laminate (4) | Layered product (4)/OPA/CPP | 0.79 | S |
| Laminate (5) | Layered product (5)/OPA/CPP | 0.82 | S |
| Laminate (6) | Layered product (6)/OPA/CPP | 0.63 | S |
| Laminate (7) | Layered product (7)/OPA/CPP | 0.49 | S |
| Laminate (8) | Layered product (8)/OPA/CPP | 0.31 | S |

TABLE 3-continued

| Laminate No. | Lamination structure | Oxygen permeability after retorting [cm$^3$/(m$^2$ · day · atm)] | Appearance after retorting at 135° C. for 60 minutes |
|---|---|---|---|
| Laminate (9) | Layered product (9)/OPA/CPP | 0.82 | S |
| Laminate (10) | Layered product (10)/OPA/CPP | 0.84 | S |
| Laminate (11) | Layered product (11)/OPA/CPP | 0.61 | S |
| Laminate (12) | Layered product (12)/OPA/CPP | 0.58 | S |
| Laminate (13) | Layered product (13)/OPA/CPP | 0.81 | S |
| Laminate (14) | Layered product (14)/OPA/CPP | 0.83 | S |
| Laminate (15) | Layered product (15)/OPA/CPP | 0.45 | S |
| Laminate (16) | Layered product (16)/OPA/CPP | 0.99 | S |
| Laminate (17) | Layered product (17)/OPA/CPP | 0.97 | S |
| Laminate (18) | Layered product (18)/OPA/CPP | 0.21 | S |
| Laminate (19) | Layered product (19)/OPA/CPP | 0.23 | S |
| Laminate (20) | Layered product (20)/OPA/CPP | 0.13 | S |
| Laminate (21) | Layered product (21)/OPA/CPP | 0.09 | S |
| Laminate (22) | Layered product (22)/OPA/CPP | 0.29 | S |
| Laminate (23) | Layered product (23)/OPA/CPP | 0.98 | S |
| Laminate (24) | Layered product (24)/OPA/CPP | 0.42 | S |
| Laminate (25) | Layered product (25)/OPA/CPP | 0.31 | S |
| Laminate (26) | Layered product (26)/OPA/CPP | 0.12 | S |
| Laminate (27) | Layered product (27)/OPA/CPP | 0.13 | S |
| Laminate (28) | Layered product (28)/OPA/CPP | 0.11 | S |
| Laminate (29) | Layered product (29)/OPA/CPP | 0.13 | S |
| Laminate (30) | Layered product (30)/OPA/CPP | 0.12 | S |
| Laminate (31) | Layered product (31)/OPA/CPP | 0.19 | S |
| Laminate (32) | Layered product (32)/OPA/CPP | 0.88 | S |
| Laminate (33) | Layered product (33)/OPA/CPP | 0.45 | S |
| Laminate (39) | Layered product (39)/OPA/CPP | 0.18 | A |
| Laminate (41) | Layered product (41)/OPA/CPP | 3.07 | A |
| Laminate (43) | Layered product (43)/OPA/CPP | 3.56 | B |
| Laminate (44) | Layered product (44)/OPA/CPP | 5.13 | B |
| Laminate (45) | Layered product (45)/OPA/CPP | 2.05 | A |
| Laminate (46) | Layered product (46)/OPA/CPP | 2.15 | A |
| Laminate (47) | Layered product (47)/OPA/CPP | 2.09 | A |
| Laminate (48) | Layered product (48)/OPA/CPP | 40< | B |

<Production and Evaluation of Vertical Form Fill Seal Pouches>

Vertical form fill seal pouches were produced using the above-mentioned layered products, and were evaluated. The evaluation of the vertical form fill seal pouches was performed using the following methods (1) to (4).

(1) Oxygen Permeability

Samples for the measurement of oxygen permeability were cut from the vertical form fill seal pouches, which had been obtained in the examples and comparative examples, before and after retort sterilization, and after a transportation test. It should be noted that samples for the measurement of oxygen permeability after retorting were cut from the vertical form fill seal pouches that had been allowed to stand in an atmosphere of room temperature (at 20° C. and 65% RH) for at least 24 hours. The oxygen permeability was measured using the oxygen permeability tester ("MOCON OX-TRAN 2/20", manufactured by Modern Controls, Inc.). Specifically, the sample was placed in the tester such that the outer layer of the layered product that constitutes each vertical form fill seal pouch faced the oxygen supply side while the inner layer of the layered product faced the carrier gas side. Then, the oxygen permeability (unit: cm$^3$/(m$^2$·day·atm)) was measured under conditions of a temperature of 20° C., a humidity on the oxygen supply side of 85% RH and a humidity on the carrier gas side of 100% RH, an oxygen pressure of 1 atm and a career gas pressure of 1 atm.

(2) Change in Appearance

The vertical form fill seal pouches obtained in the examples and comparative examples each were filled with water and subjected to retort sterilization. Thereafter, the appearance thereof before and after the retort sterilization was observed by visual inspection. Then, the change in appearance before and after retort sterilization was evaluated by the following criteria.

Evaluation 5: There was no change in appearance before and after retort sterilization.

Evaluation 4: Although there was no problem in practical use, whitening was observed to a slight extent by close inspection.

Evaluation 3: Although there was no problem in practical use, whitening was observed to a slight extent.

Evaluation 2: Whitening was observed to some extent, and there may be a problem in practical use.

Evaluation 1: Complete whitening was observed, and there was a problem in practical use.

(3) Retort Test

The vertical form fill seal pouches obtained in the examples and comparative examples each were placed on the tray of a retort sterilization apparatus (RCS-60-10RSTXG-FAM, manufactured by HISAKA WORKS, LTD.). Then, hot water retort sterilization in which the vertical form fill seal pouch was completely immersed in hot water was performed under the following conditions: (a) Retort temperature, time and pressure: 135° C., 60 minutes and 0.25 MPa.

(4) Transportation Test

The vertical form fill seal pouches obtained in the examples and comparative examples each were subjected to retort sterilization under the above-mentioned conditions (a). 10 vertical form fill seal pouches after retort sterilization were put into a cardboard box (15×35×45 cm). The gap between the cardboard box and the vertical form fill seal pouches was filled with cushioning materials. Then, the cardboard box containing the vertical form fill seal pouches was loaded on a truck to be subjected to a transportation test of making 10 round trips between Okayama and Tokyo (about 700 km).

Example 1

The layered product (9) coated with a two-component adhesive agent (A-520 (product name) and A-50 (product name), manufactured by MITSUI TAKEDA CHEMICALS INC.), followed by drying, was prepared. Then, it was laminated with a stretched polyamide film (OPA). Thus, a laminate was obtained. Subsequently, the OPA in the laminate was coated with a two-component adhesive agent (A-520 (product name) and A-50 (product name), manufactured by MITSUI TAKEDA CHEMICALS INC.), followed by drying. Then, this was laminated with a polypropylene film (with a thickness of 70 μm, RXC-21 (product name), manufactured by TOHCELLO CO., LTD., which may hereinafter be abbreviated as "$CPP_{70}$"). Thus, a laminate (A1) having a structure of layered product (9)/adhesive agent/OPA/adhesive agent/$CPP_{70}$ was obtained. The laminate (A1) was cut to a width of 400 mm, and was fed into a vertical pouch form fill package machine (manufactured by ORIHIRO Co., Ltd.). Then, a vertical form fill seal pouch of butt seam type (with a width of 160 mm and a length of 470 mm) was produced from the laminate (A1) using the pouch form fill package machine. In the pouch form fill package machine, 2 kg of water was filled into the vertical form fill seal pouch made of the laminate (A1) (which was filled in the same manner also in the following examples and comparative examples). Thus, the vertical form fill seal pouch of Example 1 was obtained. Defects such as wrinkles and streaks were not observed in the appearance of the obtained vertical form fill seal pouch. The laminate (A1) showed good workability in the pouch form fill package machine. Defects such as wrinkles and streaks were not observed also in the appearance of the vertical form fill seal pouches produced in the following examples. Further, the laminates of the following examples also showed good workability in the pouch form fill package machine.

Examples 2 to 4

Laminates (A2), (A3) and (A4) each having a structure of layered product/adhesive agent/OPA/adhesive agent/$CPP_{70}$ were obtained in the same manner as in Example 1 except that the layered products (8), (21) and (35) were used instead of the layered product (9). The vertical form fill seal pouches of butt seam type of Examples 2 to 4 were produced in the same manner as in Example 1 except that the laminates (A2), (A3) and (A4) were used instead of the laminate (A1). Defects such as wrinkles and streaks were not observed in the appearance of the obtained vertical form fill seal pouches.

Example 5

The layered product (35) coated with a two-component adhesive agent (A-520 (product name) and A-50 (product name), manufactured by MITSUI TAKEDA CHEMICALS INC.), followed by drying, was prepared. Then, it was laminated with a polypropylene film ($CPP_{70}$). Thus, a laminate (A5) having a structure of layered product (35)/adhesive agent/$CPP_{70}$ was obtained. The vertical form fill seal pouch of butt seam type of Example 5 was produced in the same manner as in Example 1 except that the laminate (A5) was used instead of the laminate (A1).

Example 6

A laminate (A6) having a structure of layered product (37)/adhesive agent/$CPP_{70}$ was obtained in the same manner as in Example 5 except that the layered product (37) was used instead of the layered product (35). The vertical form fill seal pouch of butt seam type of Example 6 was produced in the same manner as in Example 1 except that the laminate (A6) was used instead of the laminate (A1).

Example 7

The layered product (21) coated with a two-component adhesive agent (A-520 (product name) and A-50 (product name), manufactured by MITSUI TAKEDA CHEMICALS INC.), followed by drying, was prepared. Then, it was laminated with a polypropylene film (with a thickness of 50 μm, RXC-21 (product name), manufactured by TOHCELLO CO., LTD., which may be hereinafter abbreviated as "$CPP_{50}$"). Thus, a laminate was obtained. Subsequently, the layered product (21) in the laminate was coated with a two-component adhesive agent (A-520 (product name) and A-50 (product name), manufactured by MITSUI TAKEDA CHEMICALS INC.), followed by drying. Then, this was laminated with $CPP_{50}$. Thus, a laminate (A7) having a structure of $CPP_{50}$/adhesive agent/layered product (21)/adhesive agent/$CPP_{50}$ was obtained.

The laminate (A7) was cut to a width of 400 mm, and was fed into a vertical pouch form fill package machine (manufactured by ORIHIRO Co., Ltd.). Then, a vertical form fill seal pouch of envelope seam type (with a width of 160 mm and a length of 470 mm) was produced from the laminate (A7) using the pouch form fill package machine. In the pouch form fill package machine, 2 kg of water was packed in the vertical form fill seal pouch. Thus, the vertical form fill seal pouch of envelope seam type of Example 7 was obtained. cl Example 8

A laminate (A8) having a structure of $CPP_{50}$/adhesive agent/layered product (35)/adhesive agent/$CPP_{50}$ was obtained in the same manner as in Example 7 except that the layered product (35) was used instead of the layered product (21). The vertical form fill seal pouch of envelope seam type of Example 8 was obtained in the same manner as in Example 7 except that the laminate (A8) was used instead of the laminate (A7).

Example 9

A laminate having a structure of layered product (21)/adhesive agent/OPA/adhesive agent/$CPP_{50}$ was produced in the same manner as in Example 3 except that $CPP_{50}$ was used instead of $CPP_{70}$. Subsequently, the layered product (21) in the laminate was coated with a two-component adhesive agent (A-520 (product name) and A-50 (product name), manufactured by MITSUI TAKEDA CHEMICALS INC.), followed by drying. Then, this was laminated with $CPP_{50}$. Thus, a laminate (A9) having a structure of $CPP_{50}$/adhesive agent/layered product (21)/adhesive agent/OPA/adhesive agent/$CPP_{50}$ was obtained. The vertical form fill seal pouch of envelope seam type of Example 9 was obtained in the same manner as in Example 7 except that the laminate (A9) was used instead of the laminate (A7).

Example 10

An inorganic material-deposited film (TECHBARRIER TXR (product name), manufactured by Mitsubishi Plastics, Inc.) having an inorganic material-deposited surface coated with a two-component adhesive agent (A-520 (product name) and A-50 (product name), manufactured by MITSUI TAKEDA CHEMICALS INC.), followed by drying, was prepared. Then, it was laminated with the layered product (35). Thus, a laminate was obtained. Subsequently, the layered product (35) in the laminate was coated with a two-component adhesive agent (A-520 (product name) and A-50 (product name), manufactured by MITSUI TAKEDA CHEMICALS INC.), followed by drying. Then, this was laminated with $CPP_{70}$. Thus, a laminate (A10) having a structure of inorganic material-deposited film/adhesive agent/layered product (35)/adhesive agent/$CPP_{70}$ was obtained. The vertical form fill seal pouch of butt seam type of Example 10 was produced in the same manner as in Example 1 except that the laminate (A10) was used instead of the laminate (A1).

A sample was cut from the vertical form fill seal pouch of Example 10 after retorting, and the water vapor permeability was measured using a water vapor permeability tester ("PERMATRAN C-IV", manufactured by Modern Controls, Inc.). Specifically, the sample was placed in the tester so that the CPP layer faced the water vapor supply side. Then, the water vapor permeability (unit: g/($m^2$·day)) was measured in an atmosphere of a temperature of 40° C., a humidity on the water vapor supply side of 90% RH, and a humidity on the carrier gas side of 0% RH. The water vapor permeability was 1.8 g/($m^2$·day), which was a good result.

Example 11

A stretched polyethylene terephthalate film (PET) having a surface coated with a two-component adhesive agent (A-520 (product name) and A-50 (product name), manufactured by MITSUI TAKEDA CHEMICALS INC.), followed by drying, was prepared. Then, it was laminated with the layered product (35). Thus, a laminate was obtained. Subsequently, the layered product (35) in the laminate was coated with a two-component adhesive agent (A-520 (product name) and A-50 (product name), manufactured by MITSUI TAKEDA CHEMICALS INC.), followed by drying. Then, this was laminated with $CPP_{70}$. Thus, a laminate (A11) having a structure of PET/adhesive agent/layered product (35)/adhesive agent/$CPP_{70}$ was obtained. The vertical form fill seal pouch of butt seam type of Example 11 was produced in the same manner as in Example 1 except that the laminate (A11) was used instead of the laminate (A1).

Examples 12 to 18

Laminates (A12) to (A18) each having a structure of layered product/adhesive agent/OPA/adhesive agent/$CPP_{70}$ were obtained in the same manner as in Example 1 except that the layered products (12) to (18) were used instead of the layered product (9). The vertical form fill seal pouches of butt seam type of Examples 12 to 18 were produced in the same manner as in Example 1 except that the laminates (A12) to (A18), respectively, were used instead of the laminate (A1).

Comparative Examples 1, 2 and 4 to 6

Laminates (C1), (C2) and (C4) to (C6) each having a structure of layered product/adhesive agent/OPA/adhesive agent/$CPP_{70}$ were obtained in the same manner as in Example 1 except that the layered products (39), (40) and (45) to (47) were used instead of the layered product (9). The vertical form fill seal pouches of butt seam type of Comparative Examples 1, 2 and 4 to 6 were produced in the same manner as in Example 1 except that the laminates (C1), (C2) and (C4) to (C6) were used instead of the laminate (A1).

In some of a plurality of the vertical form fill seal pouches of Comparative Example 1, linear streaks slightly appeared. In some of a plurality of the vertical form fill seal pouches of Comparative Example 2, linear streaks slightly appeared, though not so often compared to Comparative Example 1.

Comparative Example 3

A laminate (C3) having a structure of layered product (40)/adhesive agent/$CPP_{70}$ was obtained in the same manner as in Example 5 except that the layered product (40) was used instead of the layered product (35). The vertical form fill seal pouch of butt seam type of Comparative Example 3 was produced in the same manner as in Example 1 except that the laminate (C3) was used instead of the laminate (A1). Defects such as wrinkles and streaks were not observed in the appearance of the obtained vertical form fill seal pouch. The laminate (C3) showed good workability in the pouch form fill package machine.

Table 4 shows the structures of the vertical form fill seal pouches of the examples and comparative examples.

TABLE 4

| | Lamination structure | Base of layered product | Gas barrier layer | | | |
|---|---|---|---|---|---|---|
| | | | Total thickness [μm] | Al/Si [molar ratio] | TMOS/ GPTMOS [molar ratio] | Inorganic component/ Organic component [weight ratio] |
| Ex. 1 | Layered product (9)/ OPA/$CPP_{70}$ | PET | 0.8 | 30.1/69.9 | 100/0 | 25.5/74.5 |
| Ex. 2 | Layered product (8)/ OPA/$CPP_{70}$ | PET | 0.8 | 2.8/97.2 | 100/0 | 30.5/69.5 |
| Ex. 3 | Layered product (21)/ OPA/$CPP_{70}$ | PET | 0.8 | 2.8/97.2 | 98.0/2.0 | 30.5/69.5 |
| Ex. 4 | Layered product (35)/ OPA/$CPP_{70}$ | OPA | 0.8 | 2.8/97.2 | 98.0/2.0 | 30.5/69.5 |
| Ex. 5 | Layered product (35)/$CPP_{70}$ | OPA | 0.8 | 2.8/97.2 | 98.0/2.0 | 30.5/69.5 |
| Ex. 6 | Layered product (37)/$CPP_{70}$ | $OPA_{25}$ | 0.8 | 2.8/97.2 | 98.0/2.0 | 30.5/69.5 |
| Ex. 7 | $CPP_{50}$/Layered product (21)/ $CPP_{50}$ | OPA | 0.8 | 2.8/97.2 | 98.0/2.0 | 30.5/69.5 |
| Ex. 8 | $CPP_{50}$/Layered product (35)/ $CPP_{50}$ | OPA | 0.8 | 2.8/97.2 | 98.0/2.0 | 30.5/69.5 |
| Ex. 9 | $CPP_{50}$/Layered product (21)/ OPA/$CPP_{50}$ | PET | 0.8 | 2.8/97.2 | 98.0/2.0 | 30.5/69.5 |
| Ex. 10 | Inorganic material-deposited layer/Layered | OPA | 0.8 | 2.8/97.2 | 98.0/2.0 | 30.5/69.5 |

TABLE 4-continued

|   | Lamination structure | Base of layered product | Total thickness [μm] | Al/Si [molar ratio] | TMOS/ GPTMOS [molar ratio] | Inorganic component/ Organic component [weight ratio] |
|---|---|---|---|---|---|---|
|   | product (35)/CPP$_{70}$ |   |   |   |   |   |
| Ex. 11 | PET/Layered product (35)/ CPP$_{70}$ | OPA | 0.8 | 2.8/97.2 | 98.0/2.0 | 30.5/69.5 |
| Ex. 12 | Layered product (12)/OPA/ CPP$_{70}$ | PET | 0.8 | 0.1/99.9 | 100/0 | 70.0/30.0 |
| Ex. 13 | Layered product (13)/OPA/ CPP$_{70}$ | PET | 0.8 | 3.0/97.0 | 100/0 | 20.0/80.0 |
| Ex. 14 | Layered product (14)/OPA/ CPP$_{70}$ | PET | 0.8 | 3.0/97.0 | 100/0 | 80.0/20.0 |
| Ex. 15 | Layered product (15)/OPA/ CPP$_{70}$ | PET | 0.8 | 3.0/97.0 | 100/0 | 70.0/30.0 |
| Ex. 16 | Layered product (16)/OPA/ CPP$_{70}$ | PET | 0.8 | 2.9/97.1 | 100/0 | 10.2/89.8 |
| Ex. 17 | Layered product (17)/OPA/ CPP$_{70}$ | PET | 0.8 | 3.0/97.0 | 100/0 | 90.2/9.8 |
| Ex. 18 | Layered product (18)/OPA/ CPP$_{70}$ | PET | 0.8 | 2.8/97.2 | 99.5/0.5 | 30.5/69.5 |
| C. Ex. 1 | Layered product (39)/OPA/ CPP$_{70}$ | PET | 2.0 | 0/100 | 89.9/10.1 | 31.5/68.5 |
| C. Ex. 2 | Layered product (40)/OPA/ CPP$_{70}$ | OPA | 2.0 | 0/100 | 89.9/10.1 | 31.5/68.5 |
| C. Ex. 3 | Layered product (40)/CPP$_{70}$ | OPA | 2.0 | 0/100 | 89.9/10.1 | 31.5/68.5 |
| C. Ex. 4 | Layered product (45)/OPA/ CPP$_{70}$ | PET | 0.8 | 40.4/59.6 | 100/0 | 40.3/59.7 |
| C. Ex. 5 | Layered product (46)/OPA/ CPP$_{70}$ | PET | 0.8 | 0.06/99.94 | 100/0 | 70.0/30.0 |
| C. Ex. 6 | Layered product (47)/OPA/ CPP$_{70}$ | PET | 0.8 | 0.06/99.94 | 100/0 | 70.0/30.0 |

Table 5 shows the evaluation results of the vertical form fill seal pouches of the examples and comparative examples.

TABLE 5

|   | Oxygen permeability [cm$^3$/(m$^2$ · day · atm)] | | | Appearance after retorting |
|---|---|---|---|---|
|   | Before retorting | After retorting | After retorting and transportation test |   |
| Ex. 1 | 0.1 | 0.4 | 0.5 | 5 |
| Ex. 2 | 0.1 | 0.2 | 0.3 | 5 |
| Ex. 3 | <0.1 | <0.1 | <0.1 | 5 |
| Ex. 4 | <0.1 | <0.1 | <0.1 | 5 |
| Ex. 5 | <0.1 | <0.1 | <0.1 | 5 |
| Ex. 6 | <0.1 | <0.1 | <0.1 | 5 |
| Ex. 7 | <0.1 | <0.1 | <0.1 | 5 |
| Ex. 8 | <0.1 | <0.1 | <0.1 | 5 |
| Ex. 9 | <0.1 | <0.1 | <0.1 | 5 |
| Ex. 10 | <0.1 | <0.1 | <0.1 | 4 |
| Ex. 11 | <0.1 | <0.1 | <0.1 | 5 |
| Ex. 12 | 0.4 | 0.7 | 0.9 | 5 |
| Ex. 13 | 0.5 | 0.8 | 1.1 | 5 |
| Ex. 14 | 0.7 | 0.9 | 1.2 | 5 |
| Ex. 15 | 0.2 | 0.4 | 0.6 | 5 |
| Ex. 16 | 0.8 | 1.0 | 1.2 | 5 |
| Ex. 17 | 1.0 | 1.0 | 1.4 | 5 |
| Ex. 18 | <0.1 | 0.3 | 0.4 | 5 |
| C. Ex. 1 | 0.5 | 0.7 | 1.2 | 3 |
| C. Ex. 2 | 0.3 | 0.8 | 1.2 | 3 |
| C. Ex. 3 | 0.2 | 0.6 | 1.1 | 3 |
| C. Ex. 4 | 1.2 | 2.4 | 2.5 | 5 |
| C. Ex. 5 | 0.8 | 2.6 | 2.8 | 3 |
| C. Ex. 6 | 0.8 | 2.6 | 2.9 | 3 |

The vertical form fill seal pouches of the examples had high oxygen barrier properties after retorting and after the transportation test. In particular, the vertical form fill seal pouches of Examples 3 to 11 had higher oxygen barrier properties after retorting and after the transportation test than the other examples. Further, the vertical form fill seal pouches of the examples had good appearance after retorting.

Despite the small number of layers constituting the laminate that was used in Example 5, the vertical form fill seal pouch of Example 5 showed oxygen barrier properties equivalent to those of Example 4. The laminate of Example 5 has a reduced weight compared to the laminate of Example 4, and the amount of the waste generated in the production process also is small. Therefore, it is preferred in view of the environment. Further, the laminate of Example 5 requires less number of lamination steps in the production, thus allowing high productivity.

Similarly to Example 5, the vertical form fill seal pouch of Example 6 is preferred in view of the environment and productivity. Moreover, the vertical form fill seal pouch of Example 6 had excellent mechanical properties such as puncture strength and impact strength, compared to Example 5.

Similarly to the evaluation of the gas barrier layered product by itself, vertical form fill seal pouches using the specific gas barrier layer showed excellent properties.

<Production and Evaluation of Container Covers>

Container covers were produced using the above-mentioned layered products, which were evaluated. The evaluation of the container covers was performed using the following methods (1) to (4).

(1) Oxygen Permeability

The oxygen permeability was measured for each of the covers before and after retort sterilization and the covers after the transportation test that were obtained in the examples and comparative examples. A covered container after retorting was allowed to stand in an atmosphere of room temperature (at 20° C. and 65% RH) for at least 24 hours. Thereafter, a hole was made at the bottom of the container (Hi-Retroflex HR78-84, manufactured by TOYO SEIKAN KAISHA, LTD.) to remove water, and it was allowed to stand in an atmosphere of room temperature (at 20° C. and 65% RH) for at least 48 hours. Thereafter, a metal jig to which two metal pipes for carrier gas were connected was fitted in the hole made in the above-mentioned container, and the metal jig was fixed to the container with an epoxy adhesive agent so as to prevent gas leakage through the gap between the metal jig and the container. The opposite ends of the metal pipes for carrier gas were connected to the oxygen permeability tester ("MOCON OX-TRAN 2/20", manufactured by Modern Controls, Inc.). The periphery of the covered container to which the metal pipes were attached was covered with a pouch obtained by heat sealing a laminate film having a structure of polyester layer/adhesive layer/EVOH layer/PO layer, and this pouch was fixed to the two metal pipes with a band. The gap between the pouch and each metal pipe was filled with an epoxy resin so that the air tightness was enhanced. Next, a hole was made in one portion of the pouch, and a pipe for supplying nitrogen gas and oxygen gas was inserted into the hole. An adhesive tape was used to enhance the air tightness so that the air from the outside should be prevented from flowing thereinto through the hole.

First, humidified nitrogen gas was allowed to flow into the pouch through the pipe as a carrier gas. One part of the nitrogen gas flowing into the pouch permeated through the cover so as to move into the covered container, another part thereof permeated through the pouch so as to move to the outside, and still another part thereof leaked to the outside through the two connection portions. The oxygen gas contained in the carrier gas was carried by the carrier gas to the sensor section, and the oxygen concentration was then measured. The nitrogen gas was kept flowing, until the oxygen concentration was decreased to a constant value. The oxygen concentration at the time when the oxygen concentration became constant was taken as the zero point of the oxygen permeability. After the oxygen concentration reached the constant value, the gas flowing into the pipe inserted in the pouch was changed from the humidified nitrogen gas to humidified oxygen gas, thereby supplying oxygen to the outside of the covered container. Then, the concentration of the oxygen that had permeated through the cover and carried to the sensor section by the carrier gas was measured. The oxygen permeability (unit: $cm^3/(m^2 \cdot day \cdot atm)$) was measured in an atmosphere of a temperature of 20° C., a humidity on the oxygen supply side of 65% RH, a humidity on the carrier gas side of 65% RH, an oxygen pressure of 1 atm and a career gas pressure of 1 atm.

(2) Change in Appearance

With respect to the covered containers obtained in the examples and comparative examples, the appearance of the covers before and after retort sterilization was observed. Then, the change in appearance before and after retort sterilization was evaluated by the following criteria. The appearance of the cover was evaluated by the observation of the cover portion by visual inspection in the state where the covered container was filled with water.

Evaluation 5: There was no change in appearance before and after retort sterilization.
Evaluation 4: Although there was no problem in practical use, whitening was observed to a slight extent by close inspection.
Evaluation 3: Although there was no problem in practical use, whitening was observed to a slight extent.
Evaluation 2: Whitening was observed to some extent, and there may be a problem in practical use.
Evaluation 1: Complete whitening was observed, and there was a problem in practical use.

(3) Retort Test

The covered containers obtained in the examples and comparative examples each were placed on the tray of a retort sterilization apparatus (RCS-60-RSTXG-FAM, manufactured by HISAKA WORKS, LTD.). Then, hot water retort sterilization in which the covered container was completely immersed in hot water was performed under the following conditions:

(a) Retort temperature, time and pressure: 135° C., 60 minutes and 0.25 MPa.

(4) Transportation Test

The covered containers obtained in the examples and comparative examples each were subjected to retort sterilization under the above-mentioned conditions (a). 50 containers after retort sterilization were put into a cardboard box (15×35×45 cm). The gap between the cardboard box and the covered containers was filled with cushioning materials. Then, the cardboard box containing the covered containers was loaded on a truck to be subjected to a transportation test of making 10 round trips between Okayama and Tokyo.

Example 19

The layered product (9) coated with a two-component adhesive agent (A-520 (product name) and A-50 (product name), manufactured by MITSUI TAKEDA CHEMICALS INC.), followed by drying, was prepared. Then, it was laminated with a stretched polyamide film (OPA). Thus, a laminate was obtained. Subsequently, the OPA in the laminate was coated with a two-component adhesive agent (A-520 (product name) and A-50 (product name), manufactured by MITSUI TAKEDA CHEMICALS INC.), followed by drying. Then, this was laminated with a polypropylene film (with a thickness of 70 μm, RXC-21 (product name), manufactured by TOHCELLO CO., LTD., which may hereinafter be abbreviated as "CPP"). Thus, a laminate (A19) having a structure of layered product (9)/adhesive agent layer/OPA layer/adhesive agent layer/CPP layer was obtained.

A circular layered product having a diameter of 88 mm was cut from the laminate (A19) as a container cover. A cylindrical container having a diameter of 78 mm and a height of 30 mm, with a flange having a width of 6.5 mm (Hi-Retroflex HR78-84, manufactured by TOYO SEIKAN KAISHA, LTD.) was prepared. This container was composed of three layers of olefin layer/steel layer/olefin layer. The container was almost fully filled with water, and a cover composed of the laminate (A19) was heat sealed to the flange. Thus, the covered container of Example 19 was obtained.

Examples 20 to 22

The covered containers of Examples 20, 21 and 22 were produced in the same manner as in Example 19 except that the layered products (8), (21) and (35) were used instead of the layered product (9).

Example 23

A stretched polyethylene terephthalate film (with a thickness of 12 μm, Lumirror P60, manufactured by Toray Industries, Inc. (the above-mentioned PET)) coated with a two-component adhesive agent (A-520 (product name) and A-50 (product name), manufactured by MITSUI TAKEDA CHEMICALS INC.), followed by drying, was prepared. Then, it was laminated with the layered product (21). Thus, a laminate was obtained. Subsequently, the layered product (21) in the laminate was coated with a two-component adhesive agent (A-520 (product name) and A-50 (product name), manufactured by MITSUI TAKEDA CHEMICALS INC.), followed by drying. Then, this was laminated with a polypropylene film (CPP). Thus, a laminate (A23) having a structure of PET layer/adhesive agent layer/layered product (21)/adhesive agent layer/CPP layer was obtained. The covered container of Example 23 was produced in the same manner as in Example 19 except that the laminate (A23) was used instead of the laminate (A19).

Example 24

The layered product (21) coated with a two-component adhesive agent (A-520 (product name) and A-50 (product name), manufactured by MITSUI TAKEDA CHEMICALS INC.), followed by drying, was prepared. Then, it was laminated with a polypropylene film (CPP). Thus, a laminate (A24) having a structure of layered product (21)/adhesive agent layer/CPP layer was obtained. The covered container of Example 24 was produced in the same manner as in Example 19 except that the laminate (A24) was used instead of the laminate (A19).

Examples 25 and 26

The covered containers of Examples 25 and 26 were produced in the same manner as in Example 24 except that the layered products (35) and (37) were used instead of the layered product (21).

Example 27

The covered container of Example 27 was produced in the same manner as in Example 23 except that the layered product (35) was used instead of the layered product (21).

Example 28

An inorganic material-deposited film (TECHBARRIER TXR (product name), manufactured by Mitsubishi Plastics, Inc.) having an inorganic material-deposited surface coated with a two-component adhesive agent (A-520 (product name) and A-50 (product name), manufactured by MITSUI TAKEDA CHEMICALS INC.), followed by drying, was prepared. Then, it was laminated with the layered product (35). Thus, a laminate was obtained. Subsequently, the layered product (35) in the laminate was coated with a two-component adhesive agent (A-520 (product name) and A-50 (product name), manufactured by MITSUI TAKEDA CHEMICALS INC.), followed by drying. Then, this was laminated with a polypropylene film (CPP). Thus, a laminate (A28) having a structure of inorganic material-deposited film layer/adhesive agent layer/layered product (35)/adhesive agent layer/CPP layer was obtained. The covered container of Example 28 was produced in the same manner as in Example 19 except that the laminate (A28) was used instead of the laminate (A19).

After the covered container of Example 28 was subjected to the above-mentioned retort test, the cover was cut from the covered container after retorting, and then the water vapor permeability of the cover was measured. The measurement was performed using the water vapor permeability tester ("PERMATRAN C-IV", manufactured by Modern Controls, Inc.). Specifically, the layered product was placed therein so that the CPP layer faced the water vapor supply side. Then, the water vapor permeability (unit: $g/(m^2 \cdot day)$) was measured in an atmosphere of a temperature of 40° C., a humidity on the water vapor supply side of 90% RH, and a humidity on the carrier gas side of 0% RH. The water vapor permeability of the cover of Example 28 was 1.2 $g/(m^2 \cdot day)$, which was a good result.

Examples 29 to 33

The covered containers of Examples 29 to 33 were produced in the same manner as in Example 19 except that the layered products (6), (7), (11), (18) and (19) were used instead of the layered product (9).

Examples 34 to 39

The covered containers of Examples 34 to 39 were produced in the same manner as in Example 19 except that the layered products (12) to (17) were used instead of the layered product (9).

Comparative Examples 7 and 8

The covered containers of Comparative Examples 7 and 8 were produced in the same manner as in Example 19 except that the layered products (39) and (40) were used instead of the layered product (9).

Comparative Examples 9 and 10

The covered containers of Comparative Examples 9 and 10 were produced in the same manner as in Example 24 except that the layered products (39) and (40) were used instead of the layered product (21).

Comparative Examples 11 to 15

The covered containers of Comparative Examples 11 and 12 were produced in the same manner as in Example 19 except that the layered products (41) and (42) were used instead of the layered product (9). The covered containers of Comparative Examples 13, 14 and 15 were produced in the same manner as in Example 19 except that the layered products (45) to (47) were used instead of the layered product (9).

Table 6 shows the structures of the covers of the examples and comparative examples.

TABLE 6

| | Lamination structure | Base of layered product | Total thickness [μm] | Al/Si [molar ratio] | TMOS/ GPTMOS [molar ratio] | Inorganic component/ Organic component [weight ratio] |
|---|---|---|---|---|---|---|
| Ex. 19 | Layered product (9)/OPA/CPP | PET | 0.8 | 30.1/69.9 | 100/0 | 25.5/74.5 |
| Ex. 20 | Layered product (8)/OPA/CPP | PET | 0.8 | 2.8/97.2 | 100/0 | 30.5/69.5 |
| Ex. 21 | Layered product (21)/OPA/CPP | PET | 0.8 | 2.8/97.2 | 98.0/2.0 | 30.5/69.5 |
| Ex. 22 | Layered product (35)/OPA/CPP | OPA | 0.8 | 2.8/97.2 | 98.0/2.0 | 30.5/69.5 |
| Ex. 23 | PET/Layered product (21)/CPP | PET | 0.8 | 2.8/97.2 | 98.0/2.0 | 30.5/69.5 |
| Ex. 24 | Layered product (21)/CPP | PET | 0.8 | 2.8/97.2 | 98.0/2.0 | 30.5/69.5 |
| Ex. 25 | Layered product (35)/CPP | OPA | 0.8 | 2.8/97.2 | 98.0/2.0 | 30.5/69.5 |
| Ex. 26 | Layered product (37)/CPP | OPA$_{25}$ | 0.8 | 2.8/97.2 | 98.0/2.0 | 30.5/69.5 |
| Ex. 27 | PET/Layered product (35)/CPP | OPA | 0.8 | 2.8/97.2 | 98.0/2.0 | 30.5/69.5 |
| Ex. 28 | Inorganic material-deposited layer/Layered product (35)/CPP | OPA | 0.8 | 2.8/97.2 | 98.0/2.0 | 30.5/69.5 |
| Ex. 29 | Layered product (6)/OPA/CPP | PET | 0.8 | 1.2/98.8 | 100/0 | 30.2/69.8 |
| Ex. 30 | Layered product (7)/OPA/CPP | PET | 0.8 | 1.9/98.1 | 100/0 | 30.4/69.6 |
| Ex. 31 | Layered product (11)/OPA/CPP | PET | 0.8 | 29.9/70.1 | 100/0 | 36.9/63.1 |
| Ex. 32 | Layered product (18)/OPA/CPP | PET | 0.8 | 2.8/97.2 | 99.5/0.5 | 30.5/69.5 |
| Ex. 33 | Layered product (19)/OPA/CPP | PET | 0.8 | 3.1/96.9 | 80.0/20.0 | 30.5/69.5 |
| Ex. 34 | Layered product (12)/OPA/CPP | PET | 0.8 | 0.1/99.9 | 100/0 | 70.0/30.0 |
| Ex. 35 | Layered product (13)/OPA/CPP | PET | 0.8 | 3.0/97.0 | 100/0 | 20.0/80.0 |
| Ex. 36 | Layered product (14)/OPA/CPP | PET | 0.8 | 3.0/97.0 | 100/0 | 80.0/20.0 |
| Ex. 37 | Layered product (15)/OPA/CPP | PET | 0.8 | 3.0/97.0 | 100/0 | 70.0/30.0 |
| Ex. 38 | Layered product (16)/OPA/CPP | PET | 0.8 | 2.9/97.1 | 100/0 | 10.2/89.8 |
| Ex. 39 | Layered product (17)/OPA/CPP | PET | 0.8 | 3.0/97.0 | 100/0 | 90.2/9.8 |
| C. Ex. 7 | Layered product (39)/OPA/CPP | PET | 2.0 | 0/100 | 89.9/10.1 | 31.5/68.5 |
| C. Ex. 8 | Layered product (40)/OPA/CPP | OPA | 2.0 | 0/100 | 89.9/10.1 | 31.5/68.5 |
| C. Ex. 9 | Layered product (39)/CPP | PET | 2.0 | 0/100 | 89.9/10.1 | 31.5/68.5 |
| C. Ex. 10 | Layered product (40)/CPP | OPA | 2.0 | 0/100 | 89.9/10.1 | 31.5/68.5 |
| C. Ex. 11 | Layered product (41)/OPA/CPP | PET | 0.8 | 0/100 | 89.9/10.1 | 31.5/68.5 |
| C. Ex. 12 | Layered product (42)/OPA/CPP | OPA | 0.8 | 0/100 | 89.9/10.1 | 31.5/68.5 |
| C. Ex. 13 | Layered product (45)/OPA/CPP | PET | 0.8 | 40.4/59.6 | 100/0 | 40.3/59.7 |
| C. Ex. 14 | Layered product (46)/OPA/CPP | PET | 0.8 | 0.06/99.94 | 100/0 | 70.0/30.0 |
| C. Ex. 15 | Layered product (47)/OPA/CPP | PET | 0.8 | 0.06/99.94 | 100/0 | 70.0/30.0 |

Table 7 shows the evaluation results of the covers of the examples and comparative examples.

TABLE 7

| | Oxygen permeability [cm$^3$/(m$^2$ · day · atm)] | | | |
|---|---|---|---|---|
| | Before retorting | After retorting | After retorting and transportation test | Appearance after retorting |
| Ex. 19 | 0.3 | 0.3 | 0.7 | 5 |
| Ex. 20 | <0.1 | 0.3 | 0.6 | 5 |
| Ex. 21 | <0.1 | <0.1 | <0.1 | 5 |
| Ex. 22 | <0.1 | <0.1 | <0.1 | 5 |
| Ex. 23 | <0.1 | <0.1 | <0.1 | 5 |
| Ex. 24 | <0.1 | <0.1 | <0.1 | 5 |
| Ex. 25 | <0.1 | <0.1 | <0.1 | 5 |
| Ex. 26 | <0.1 | <0.1 | <0.1 | 5 |
| Ex. 27 | <0.1 | <0.1 | <0.1 | 5 |
| Ex. 28 | <0.1 | <0.1 | <0.1 | 5 |
| Ex. 29 | <0.1 | 0.5 | 0.7 | 5 |
| Ex. 30 | <0.1 | 0.3 | 0.5 | 5 |
| Ex. 31 | 0.2 | 0.3 | 0.3 | 5 |
| Ex. 32 | <0.1 | 0.2 | 0.3 | 5 |
| Ex. 33 | 0.3 | 0.3 | 0.3 | 5 |
| Ex. 34 | 0.3 | 0.7 | 0.9 | 5 |
| Ex. 35 | 0.6 | 0.8 | 1.1 | 5 |
| Ex. 36 | 0.6 | 0.9 | 1.1 | 5 |
| Ex. 37 | 0.2 | 0.5 | 0.7 | 5 |
| Ex. 38 | 0.7 | 1.0 | 1.2 | 5 |
| Ex. 39 | 0.7 | 1.1 | 1.3 | 5 |
| C. Ex. 7 | 0.1 | 0.4 | 1.1 | 3 |
| C. Ex. 8 | 0.2 | 0.7 | 1.0 | 3 |
| C. Ex. 9 | 0.1 | 0.4 | 1.2 | 3 |
| C. Ex. 10 | 0.2 | 0.8 | 0.9 | 3 |
| C. Ex. 11 | 4.8 | 4.2 | 5.2 | 3 |
| C. Ex. 12 | 5.4 | 4.3 | 4.9 | 3 |
| C. Ex. 13 | 1.4 | 2.4 | 2.5 | 5 |
| C. Ex. 14 | 0.8 | 2.3 | 2.5 | 3 |
| C. Ex. 15 | 0.8 | 2.3 | 2.6 | 3 |

The covers of the examples had high oxygen barrier properties after retorting and after the transportation test. In particular, the covers of Examples 21 to 28 had higher oxygen barrier properties after retorting and after the transportation test compared to other examples. Further, the covers of the examples had good appearance after retorting.

Despite the small number of layers constituting each of the laminates that were used in Examples 24 to 26, the laminates showed high oxygen barrier properties. The laminates of Examples 24 to 26 have a reduced weight, and the amount of the waste generated in the production process also is small. Therefore, they are preferred in view of the environment. Further, the laminates of Examples 24 to 26 require less number of lamination steps in the production, thus allowing high productivity.

None of the covers of the comparative examples showed excellent properties both in oxygen barrier properties and appearance. Although Comparative Examples 7 to 10 showed high oxygen barrier properties, this was because the thickness of the gas barrier layers in Comparative Examples 7 to 10 was at least twice the thickness of the gas barrier layers in the examples. Comparative Examples 11 to 15 in which the thickness of the gas barrier layers was the same as in the examples had lower oxygen barrier properties than the examples, and their gas barrier properties after retorting and after the transportation test were particularly low. The covers of the comparative examples except Comparative Example 13 were slightly whitened due to retorting.

As described above, similarly to the evaluation of the gas barrier layered product by itself, the covers using the specific gas barrier layer showed excellent properties.

<Production and Evaluation of Vacuum Packaging Pouches>

Vacuum packaging pouches were produced using the above-mentioned layered products, which were evaluated. The evaluation of the vacuum packaging pouches was performed using the following methods (1) to (4).

(1) Oxygen Permeability

Samples for the measurement of oxygen permeability were cut from the vacuum packaging pouches, which had been obtained in the examples and comparative examples, before and after retort sterilization, and after a transportation test. It should be noted that, as the vacuum packaging pouches after retorting, samples were cut for the measurement of oxygen permeability from the vacuum packaging pouches that had been allowed to stand in an atmosphere of room temperature (at 20° C. and 65% RH) for at least 24 hours. The oxygen permeability was measured using the oxygen permeability tester ("MOCON OX-TRAN 2/20", manufactured by Modern Controls, Inc.). Specifically, the layered product was placed in the tester such that the outer layer of the layered product that constitutes each vacuum packaging pouch faced the oxygen supply side while the inner layer of the layered product faced the carrier gas side. Then, the oxygen permeability (unit: $cc/m^2/day/atm$) was measured in an atmosphere of a temperature of 20° C., a humidity on the oxygen supply side of 85% RH, a humidity on the carrier gas side of 85% RH, an oxygen pressure of 1 atm and a career gas pressure of 1 atm.

(2) Change in Appearance

The heat sealed portion was cut away from the vacuum packaging pouches, which had been obtained in the examples and comparative examples, before and after retort sterilization, and the appearance before and after the retorting was observed by visual inspection. Then, the degree of change in appearance was evaluated by the following criteria. The vacuum packaging pouches after retort sterilization were allowed to stand in an atmosphere of room temperature (at 20° C. and 65% RH) for at least 24 hours. Thereafter, a sample was cut therefrom, which was immediately subjected to evaluation by visual inspection.

Evaluation 5: There was no change in appearance before and after retort sterilization.

Evaluation 4: Although there was no problem in practical use, whitening was observed to a slight extent by close inspection.

Evaluation 3: Although there was no problem in practical use, whitening was observed to a slight extent.

Evaluation 2: Whitening was observed to some extent, and there may be a problem in practical use.

Evaluation 1: Complete whitening was observed, and there was a problem in practical use.

(3) Retort Test

The vacuum packaging pouches obtained in the examples and comparative examples were placed on the tray of a retort sterilization apparatus (RCS-60-RSTXG-FAM, manufactured by HISAKA WORKS, LTD.). Then, hot water retort sterilization in which the vacuum packaging pouches were completely immersed in hot water was performed under the following two types of conditions.

(a) Retort temperature, time and pressure: 135° C., 30 minutes and 0.25 MPa (b) Retort temperature, time and pressure: 135° C., 60 minutes and 0.25 MPa (4) Transportation Test In the examples and comparative examples, 8 vacuum packaging pouches that had been subjected to retort sterilization under the above-mentioned conditions (a) were put into a cardboard box (size: 15×35×45 cm). The gap between the cardboard box and the vacuum packaging pouches was filled with cushioning materials. Then, the cardboard box containing the vacuum packaging pouches was loaded on a truck to be subjected to a transportation test of making 10 round trips between Okayama and Tokyo.

Example 40

The layered product (9) coated with a two-component adhesive agent (A-520 (product name) and A-50 (product name), manufactured by MITSUI TAKEDA CHEMICALS INC.), followed by drying, was prepared. Then, it was laminated with a stretched polyamide film (OPA). Thus, a laminate was obtained. Subsequently, the OPA in the laminate was coated with a two-component adhesive agent (A-520 (product name) and A-50 (product name), manufactured by MITSUI TAKEDA CHEMICALS INC.), followed by drying. Then, this was laminated with a polypropylene film (with a thickness of 70 µm, RXC-21 (product name), manufactured by TOHCELLO CO., LTD., which may hereinafter be abbreviated as "CPP"). Thus, a laminate (A40) having a structure of layered product (9)/adhesive agent layer/OPA layer/adhesive agent layer/CPP layer was obtained.

Next, two rectangular pieces of layered products with dimensions of 22 cm×30 cm were cut from the laminate (A40). Then, the two pieces of layered products were stacked together so that their CPP layers were present inside, and then three sides of the rectangle were heat sealed to form a pouch. The pouch was filled with wood spheres (diameter: 30 mm), as a model of solid foods, in the state where the spheres were arranged flat and in contact with each other. Thereafter, the inside of the packaging pouch was degassed to remove the air, followed by heat sealing of the last side. The spheres were vacuum packed in the state where the packaging pouch was adhered closely thereto along the irregularity caused by the spheres (which was the same in the following examples). Thus, the vacuum packaging pouch of Example 40 was obtained.

Examples 41 to 43

The vacuum packaging pouches of Examples 41, 42 and 43 were produced in the same manner as in Example 40 except that the layered products (8), (21) and (35) were used instead of the layered product (9). The packaging pouch of Example 43 was adhered more closely to the spheres as compared to the packaging pouch of Example 42. Therefore, the air remaining inside the packaging pouch was reduced in Example 43.

Example 44

A stretched polyamide film (OPA) coated with a two-component adhesive agent (A-520 (product name) and A-50 (product name), manufactured by MITSUI TAKEDA CHEMICALS INC.), followed by drying, was prepared. Then, it was laminated with the layered product (21). Thus, a laminate was obtained. Subsequently, the layered product (21) in the laminate was coated with a two-component adhesive agent (A-520 (product name) and A-50 (product name), manufactured by MITSUI TAKEDA CHEMICALS INC.), followed by drying. Then, this was laminated with CPP. Thus, a laminate (A44) having a structure of OPA layer/adhesive agent layer/layered product (21)/adhesive agent layer/CPP layer was obtained.

The vacuum packaging pouch of Example 44 was produced in the same manner as in Example 40 except that the laminate (A44) was used instead of the laminate (A40).

Example 45

An inorganic material-deposited film (TECHBARRIER TXR (product name), manufactured by Mitsubishi Plastics, Inc.) having an inorganic material-deposited surface coated with a two-component adhesive agent (A-520 (product name) and A-50 (product name), manufactured by MITSUI TAKEDA CHEMICALS INC.), followed by drying, was prepared. Then, it was laminated with the layered product (21). Thus, a laminate was obtained. Subsequently, the layered product (21) in the laminate was coated with a two-component adhesive agent (A-520 (product name) and A-50 (product name), manufactured by MITSUI TAKEDA CHEMICALS INC.), followed by drying. Then, this was laminated with CPP. Thus, a laminate (A45) having a structure of inorganic material-deposited film layer/adhesive agent layer/layered product (21)/adhesive agent layer/CPP layer was obtained. The vacuum packaging pouch of Example 45 was produced in the same manner as in Example 40 except that the laminate (A45) was used instead of the laminate (A40).

Example 46

The layered product (35) coated with a two-component adhesive agent (A-520 (product name) and A-50 (product name), manufactured by MITSUI TAKEDA CHEMICALS INC.), followed by drying, was prepared. Then, it was laminated with CPP. Thus, a laminate (A46) having a structure of layered product (35)/adhesive agent/CPP was obtained. The vacuum packaging pouch of Example 46 was produced in the same manner as in Example 40 except that the laminate (A46) was used instead of the laminate (A40). Even when compared to Examples 40 to 45, the packaging pouch of Example 46 showed a higher degree of adhesion to the spheres, and thus the air remaining inside the packaging pouch was most reduced.

Examples 47 to 57

The vacuum packaging pouches of Examples 47 to 51 were produced in the same manner as in Example 40 except that the layered products (6), (7), (11), (18) and (19) were used instead of the layered product (9). The vacuum packaging pouches of Examples 52 to 57 were produced in the same manner as in Example 40 except that the layered products (12) to (17) were used instead of the layered product (9).

Comparative Example 16

The vacuum packaging pouch of Comparative Example 16 was produced in the same manner as in Example 40 except that the layered product (39) was used instead of the layered product (9). The spheres were vacuum packed in the state where the packaging pouch of Comparative Example 16 was adhered closely thereto along the irregularity caused by the packed spheres. However, as compared to the packaging pouches of Examples 40 to 43, the packaging pouch of Comparative Example 16 had insufficient adhesion to the spheres, and thus the air largely remained inside the packaging pouch.

Comparative Example 17

The vacuum packaging pouch of Comparative Example 17 was produced in the same manner as in Example 44 except that the layered product (39) was used instead of the layered product (21). The spheres were vacuum packed in the state where the packaging pouch of Comparative Example 17 was adhered closely thereto along the irregularity caused by the packed spheres. However, as compared to the packaging pouch of Example 44, the packaging pouch of Comparative Example 17 had insufficient adhesion to the spheres, and thus the air largely remained inside the packaging pouch.

Comparative Example 18

The vacuum packaging pouch of Comparative Example 18 was produced in the same manner as in Example 45 except that the layered product (39) was used instead of the layered product (21). The spheres were vacuum packed in the state where the packaging pouch of Comparative Example 18 was adhered closely thereto along the irregularity caused by the packed spheres.

Comparative Example 19

The vacuum packaging pouch of Comparative Example 19 was produced in the same manner as in Example 46 except that the layered product (40) was used instead of the layered product (35). The spheres were vacuum packed in the state where the packaging pouch of Comparative Example 19 was adhered closely thereto along the irregularity caused by the packed spheres. However, as compared to the packaging pouch of Example 46, the packaging pouch of Comparative Example 19 had low adhesion to the spheres.

Comparative Examples 20 to 22

The vacuum packaging pouches of Comparative Examples 20, 21 and 22 were produced in the same manner as in Example 40 except that the layered products (45), (46) and (47) were used instead of the layered product (9).

Table 8 shows the structures of the vacuum packaging pouches of the examples and comparative examples.

TABLE 8

|  | Lamination structure | Base of layered product | Total thickness [μm] | Al/Si [molar ratio] | TMOS/ GPTMOS [molar ratio] | Inorganic component/ Organic component [weight ratio] |
|---|---|---|---|---|---|---|
| Ex. 40 | Layered product (9)/OPA/CPP | PET | 0.8 | 30.1/69.9 | 100/0 | 25.5/74.5 |
| Ex. 41 | Layered product (8)/OPA/CPP | PET | 0.8 | 2.8/97.2 | 100/0 | 30.5/69.5 |
| Ex. 42 | Layered product (21)/OPA/CPP | PET | 0.8 | 2.8/97.2 | 98.0/2.0 | 30.5/69.5 |
| Ex. 43 | Layered product (35)/OPA/CPP | OPA | 0.8 | 2.8/97.2 | 98.0/2.0 | 30.5/69.5 |
| Ex. 44 | OPA/Layered product (21)/CPP | PET | 0.8 | 2.8/97.2 | 98.0/2.0 | 30.5/69.5 |
| Ex. 45 | Inorganic material-deposited layer/Layered product (21)/CPP | PET | 0.8 | 2.8/97.2 | 98.0/2.0 | 30.5/69.5 |
| Ex. 46 | Layered product (35)/CPP | OPA | 0.8 | 2.8/97.2 | 98.0/2.0 | 30.5/69.5 |
| Ex. 47 | Layered product (6)/OPA/CPP | PET | 0.8 | 1.2/98.8 | 100/0 | 30.2/69.8 |
| Ex. 48 | Layered product (7)/OPA/CPP | PET | 0.8 | 1.9/98.1 | 100/0 | 30.4/69.6 |
| Ex. 49 | Layered product (11)/OPA/CPP | PET | 0.8 | 29.9/70.1 | 100/0 | 36.9/63.1 |
| Ex. 50 | Layered product (18)/OPA/CPP | PET | 0.8 | 2.8/97.2 | 99.5/0.5 | 30.5/69.5 |
| Ex. 51 | Layered product (19)/OPA/CPP | PET | 0.8 | 3.1/96.9 | 80.0/20.0 | 30.5/69.5 |
| Ex. 52 | Layered product (12)/OPA/CPP | PET | 0.8 | 0.1/99.9 | 100/0 | 70.0/30.0 |
| Ex. 53 | Layered product (13)/OPA/CPP | PET | 0.8 | 3.0/97.0 | 100/0 | 20.0/80.0 |
| Ex. 54 | Layered product (14)/OPA/CPP | PET | 0.8 | 3.0/97.0 | 100/0 | 80.0/20.0 |
| Ex. 55 | Layered product (15)/OPA/CPP | PET | 0.8 | 3.0/97.0 | 100/0 | 70.0/30.0 |
| Ex. 56 | Layered product (16)/OPA/CPP | PET | 0.8 | 2.9/97.1 | 100/0 | 10.2/89.8 |
| Ex. 57 | Layered product (17)/OPA/CPP | PET | 0.8 | 3.0/97.0 | 100/0 | 90.2/9.8 |
| C. Ex. 16 | Layered product (39)/OPA/CPP | PET | 2.0 | 0/100 | 89.9/10.1 | 31.5/68.5 |
| C. Ex. 17 | OPA/Layered product (39)/CPP | PET | 2.0 | 0/100 | 89.9/10.1 | 31.5/68.5 |
| C. Ex. 18 | Inorganic material-deposited layer/Layered product (39)/CPP | PET | 2.0 | 0/100 | 89.9/10.1 | 31.5/68.5 |
| C. Ex. 19 | Layered product (40)/CPP | OPA | 2.0 | 0/100 | 89.9/10.1 | 31.5/68.5 |
| C. Ex. 20 | Layered product (45)/OPA/CPP | PET | 0.8 | 40.4/59.6 | 100/0 | 40.3/59.7 |
| C. Ex. 21 | Layered product (46)/OPA/CPP | PET | 0.8 | 0.06/99.94 | 100/0 | 70.0/30.0 |
| C. Ex. 22 | Layered product (47)/OPA/CPP | PET | 0.8 | 0.06/99.94 | 100/0 | 70.0/30.0 |

Table 9 shows the evaluation results of the vacuum packaging pouches of the examples and comparative examples.

TABLE 9

| | Oxygen permeability [cm³/(m² · day · atm)] | | | | |
|---|---|---|---|---|---|
| | After vacuum pack- aging | After retor- ting at 135° C. for 30 minutes | After retor- ting at 135° C. for 60 minutes | After retorting and trans- portation | Appear- ance after retorting |
| Ex. 40 | 0.7 | 0.6 | 0.7 | 0.9 | 5 |
| Ex. 41 | <0.1 | 0.3 | 0.4 | 0.6 | 5 |
| Ex. 42 | <0.1 | <0.1 | <0.1 | <0.1 | 5 |
| Ex. 43 | <0.1 | <0.1 | <0.1 | <0.1 | 5 |
| Ex. 44 | <0.1 | <0.1 | <0.1 | <0.1 | 5 |
| Ex. 45 | <0.1 | <0.1 | <0.1 | <0.1 | 5 |
| Ex. 46 | <0.1 | <0.1 | <0.1 | <0.1 | 5 |
| Ex. 47 | 0.2 | 0.6 | 0.6 | 0.8 | 5 |
| Ex. 48 | 0.1 | 0.5 | 0.5 | 0.6 | 5 |
| Ex. 49 | 0.4 | 0.7 | 0.7 | 0.7 | 5 |
| Ex. 50 | <0.1 | 0.2 | 0.2 | 0.3 | 5 |
| Ex. 51 | 0.4 | 0.4 | 0.4 | 0.6 | 5 |
| Ex. 52 | 0.4 | 0.8 | 0.8 | 0.9 | 5 |
| Ex. 53 | 0.6 | 0.9 | 0.9 | 1.0 | 5 |
| Ex. 54 | 0.6 | 0.9 | 0.9 | 1.1 | 5 |
| Ex. 55 | 0.2 | 0.6 | 0.6 | 0.8 | 5 |
| Ex. 56 | 0.8 | 1.0 | 1.0 | 1.3 | 5 |
| Ex. 57 | 0.8 | 1.0 | 1.0 | 1.3 | 5 |
| C. Ex. 16 | 0.6 | 1.0 | 1.3 | 1.7 | 3 |
| C. Ex. 17 | 0.6 | 1.0 | 1.4 | 1.7 | 5 |
| C. Ex. 18 | 0.6 | 1.0 | 1.3 | 1.8 | 4 |
| C. Ex. 19 | 1.1 | 1.4 | 1.4 | 1.7 | 4 |
| C. Ex. 20 | 1.6 | 2.6 | 2.9 | 3.2 | 5 |
| C. Ex. 21 | 0.8 | 2.7 | 2.8 | 3.3 | 3 |
| C. Ex. 22 | 0.8 | 2.6 | 2.8 | 3.3 | 3 |

The vacuum packaging pouches of the examples showed good oxygen barrier properties not only before retorting but also after retorting and after the transportation test. Further, the vacuum packaging pouches of the examples had good appearance after retorting.

Although the packaging pouches of Comparative Examples 16 to 19 showed relatively high oxygen barrier properties, this was because the thickness of the gas barrier layers in Comparative Examples 16 to 19 was at least twice the thickness of the gas barrier layers in the examples. Nevertheless, Comparative Examples 16 and 17 showed lower oxygen barrier properties after retorting and after the transportation test than the examples. The vacuum packaging pouch of Comparative Example 16 was slightly whitened due to retorting.

Comparative Examples 20 to 22 in which the thickness of the gas barrier layers was the same as in the examples had lower oxygen barrier properties than the examples, and their gas barrier properties after retorting and after the transportation test were particularly low. The vacuum packaging pouches of the comparative examples except Comparative Examples 17 and 20 were slightly whitened due to retorting.

As described above, similarly to the evaluation of the gas barrier layered product by itself, the vacuum packaging pouches using the specific gas barrier layer showed excellent properties.

Industrial Applicability

The present invention can be applied to any one of formed products selected from a vertical form fill seal pouch, a container cover and a vacuum packaging pouch.

The vertical form fill seal pouch of the present invention can be applied to pouches for packaging, for example, foods and beverages in a form such as liquid, viscous body, powder, solid bulk, or a combination of these. The vertical form fill seal pouch of the present invention has excellent oxygen barrier properties and suppresses the deterioration of the oxygen barrier properties resulting from deformation such as bending and stretching. Therefore, the vertical form fill seal pouch of the present invention can suppress the deterioration in the quality of foods as a content over a long period.

The cover of the present invention can be applied to covered containers to be filled with foods, such as processed foods of meat, processed foods of vegetables, processed foods of marine products and fruits, for example. The cover of the present invention has excellent gas barrier properties, for example, with respect to oxygen, and thus can suppress the deterioration in the quality of foods as a content over a long period. The cover of the present invention is used preferably as a cover for containers to be used for storing a content such as foods, particularly as a cover for containers to be subjected to heat sterilization such as boiling sterilization and retort sterilization.

The invention claimed is:

1. A formed product, selected from the group consisting of a vertical form fill seal pouch, a container cover, and a vacuum packaging pouch,
   the formed product being formed with a gas barrier layered product, wherein the gas barrier layered product comprises:
   (a.1) a base; and
   (a.2) at least one layer with gas barrier properties,
   wherein the layer (a.2) is stacked on the base, and the layer (a.2) comprises a composition comprising:
   (a.2.i) a hydrolyzed condensate of at least one compound (L) comprising a hydrolyzable characteristic group and
   (a.2.ii) a neutralized product of a polymer (X) comprising at least one functional group selected from the group consisting of a carboxyl group and a carboxylic acid anhydride group,
   the compound (L) comprises:
   (L.1) a compound (A); and
   (L.2) a compound (B) that comprises Si to which the hydrolyzable characteristic group is bonded,
   the compound (A) is at least one compound of Formula (I):

$$M^1 X^1_m Y^1_{n-m} \quad (I),$$

wherein:
   $M^1$ denotes at least one selected from the group consisting of Al, Ti, and Zr;
   $X^1$ denotes at least one selected from the group consisting of F, Cl, Br, I, $OR^1$, $R^2COO$, $R^3COCHCOR^4$, and $NO_3$;
   $Y^1$ denotes at least one selected from the group consisting of F, Cl, Br, I, $OR^5$, $R^6COO$, $R^7COCHCOR^8$, $NO_3$, and $R^9$;
   $R^1$, $R^2$, $R^5$, and $R^6$ each denote a hydrogen atom or an alkyl group, independently;
   $R^3$, $R^4$, $R^7$, $R^8$, and $R^9$ each denote an alkyl group, independently;
   n is equal to the valence of $M^1$; and
   m denotes an integer of 1 to n,
   the compound (B) comprises at least one compound of Formula (II):

$$Si(OR^{10})_p R^{11}_{4-p-q} X^2_q \quad (II),$$

wherein:
   $R^{10}$ denotes an alkyl group;
   $R^{11}$ denotes an alkyl group, an aralkyl group, an aryl group, or an alkenyl group;
   $X^2$ denotes a halogen atom;
   p and q each denote an integer of 0 to 4, independently; and $1 \leq p+q \leq 4$,
   wherein at least part of —COO⁻ group comprised in the functional group of the polymer (X) is neutralized with a metal ion having a valence of at least two,
   wherein a percentage of the compound of Formula (II) in the compound (B) is at least 80 mol %, and
   wherein the composition has a ratio of [the number of moles of $M^1$ atom derived from the compound (A)]/[the number of moles of Si atom derived from the compound (B)] in a range of 0.1/99.9 to 35.0/65.0.

2. The formed product of claim 1, wherein a ratio of [weight of inorganic component derived from the compound (L)]/[total of weight of organic component derived from the compound (L) and weight of organic component derived from the polymer (X)] is in a range of 20.0/80.0 to 80.0/20.0.

3. The formed product of claim 1, wherein a ratio of [weight of inorganic component derived from the compound (L)]/[total of weight of organic component derived from the compound (L) and weight of organic component derived from the polymer (X)] is in a range of 30.5/69.5 to 70.0/30.0.

4. The formed product of claim 1, wherein the gas barrier layered product comprises a polyolefin layer disposed on one top surface of the gas barrier layered product.

5. The formed product of claim 1, wherein the formed product is a vertical form fill seal pouch, and
   the gas barrier layered product comprises a first polyolefin layer disposed on one top surface of the gas barrier layered product and a second polyolefin layer disposed on a different top surface of the gas-barrier layered product.

6. The formed product of claim 1, in the form of a vacuum packaging pouch, which is suitable for an application in which at least one food comprising a solid content is vacuum packed and subjected to heat sterilization.

7. The formed product of claim 1, wherein the compound (B) further comprises:
   at least one compound of Formula (III):

$$Si(OR^{12})_r X^3_s Z^3_{4-r-s} \quad (III),$$

wherein:
   $R^{12}$ denotes an alkyl group;
   $X^3$ denotes a halogen atom;
   $Z^3$ denotes an alkyl group substituted by a functional group having reactivity with a carboxyl group;
   r and s each denote an integer of 0 to 3, independently; and $1 \leq r+s \leq 3$, and
   wherein a ratio of [the number of moles of Si atom derived from the compound of Formula (II)]/[the number of moles of Si atom derived from the compound expressed by Formula (III)] is in a range of 99.5/0.5 to 80.0/20.0.

8. The formed product of claim 7, wherein the at least one layer with gas barrier properties has a total thickness of 1 μm or less.

9. The formed product of claim 7, wherein $M^1$ is Al.

10. The formed product of claim 7, wherein a ratio of [weight of inorganic component derived from the compound (L)]/[total of weight of organic component derived from the compound (L) and weight of organic component derived from the polymer (X)] is in a range of 20.0/80.0 to 80.0/20.0.

11. The formed product of claim 10, wherein the ratio the range of 30.5/69.5 to 70.0/30.0.

12. The formed product of claim 1, wherein the at least one layer with gas barrier properties has a total thickness of 1 μm or less.

13. The formed product of claim 12, wherein $M^1$ is Al.

14. The formed product of claim 12, wherein a ratio of [weight of inorganic component derived from the compound (L)]/[total of weight of organic component derived from the compound (L) and weight of organic component derived from the polymer (X)] is in a range of 20.0/80.0 to 80.0/20.0.

15. The formed product of claim 14, wherein the ratio the range of 30.5/69.5 to 70.0/30.0.

16. The formed product of claim 1, wherein $M^1$ is Al.

17. The formed product of claim 16, wherein a ratio of [weight of inorganic component derived from the compound (L)]/[total of weight of organic component derived from the compound (L) and weight of organic component derived from the polymer (X)] is in a range of 20.0/80.0 to 80.0/20.0.

18. The formed product of claim 17, wherein the ratio the range of 30.5/69.5 to 70.0/30.0.

19. The formed product of claim 1, wherein the base is a polyamide film.

20. The formed product of claim 19, wherein the polyamide film has a thickness of 20 μm or more.

* * * * *